US012675574B1

(12) United States Patent    (10) Patent No.:   US 12,675,574 B1

Jukic et al.      (45) Date of Patent:     Jul. 7, 2026

(54) NON-BYPASSABLE GOVERNANCE OF PARTITIONED CONTEXTUAL MEMORY FOR CONDITIONING EXECUTION

(71) Applicant: OneSource Solutions International, Inc., Sudbury, MA (US)

(72) Inventors: Vedran Jukic, Trieste (IT); Harold Arkoff, Sudbury, MA (US)

(73) Assignee: OneSource Solutions International, Inc., Sudbury, MA (US)

( * ) Notice: Subject to any disclaimer, the term of this patent is extended or adjusted under 35 U.S.C. 154(b) by 0 days.

(21) Appl. No.: 19/536,124

(22) Filed: Feb. 10, 2026

Related U.S. Application Data

(63) Continuation-in-part of application No. 19/433,438, filed on Dec. 26, 2025.

(51) Int. Cl.
| | |
|---|---|
| *G06F 21/57* | (2013.01) |
| *G06F 16/21* | (2019.01) |
| *G06F 21/62* | (2013.01) |
| *H04L 41/0894* | (2022.01) |

(52) U.S. Cl.
CPC .............. *G06F 21/57* (2013.01); *G06F 16/21* (2019.01); *G06F 21/6227* (2013.01); *H04L 41/0894* (2022.05)

(58) Field of Classification Search
CPC ...... G06F 16/21; G06F 21/57; G06F 21/6227; H04L 41/0894
See application file for complete search history.

(56) References Cited

U.S. PATENT DOCUMENTS

| | | | | |
|---|---|---|---|---|
| 10,069,629 | B2 * | 9/2018 | Bhat | ......................... H04L 9/14 |
| 10,103,878 | B1 * | 10/2018 | Sharifi Mehr | ........ H04L 9/3226 |
| 10,853,151 | B2 * | 12/2020 | Bryan | ..................... G06F 9/542 |
| 11,106,818 | B2 * | 8/2021 | Batchelor | ............... H04L 63/08 |
| 11,581,072 | B2 * | 2/2023 | Raul | .................... G06F 11/3006 |
| 12,489,633 | B1 * | 12/2025 | Arkoff | .................. H04L 9/3213 |

(Continued)

FOREIGN PATENT DOCUMENTS

| | | | | |
|---|---|---|---|---|
| WO | WO-2013142947 A1 * | 10/2013 | ........... | G06F 21/128 |
| WO | WO-2026024864 A1 * | 1/2026 | ........... | G06Q 20/405 |

*Primary Examiner* — Mark E Hershley
(74) *Attorney, Agent, or Firm* — IP Consulting Group; Michael Razavi; Alfred F. Hoyte

(57) ABSTRACT

Computer systems and methods are disclosed for governing use of patient scoped contextual information during execution of reasoning models, agentic systems, and orchestration workflows operating over regulated data. A patient partitioned contextual memory stores memory atoms associated with provenance metadata, temporal validity metadata, and governance attributes. In response to a task request associated with a patient identity, a retrieval engine selects a candidate set of memory atoms for evaluation by a non-bypassable memory gate under an applicable policy snapshot identifier (or policy digest) and one or more integrity criteria. The memory gate determines admissibility and authorized transformation of memory atoms, and a governed context bundle is deterministically assembled from admitted memory atoms subject to a context capacity constraint. Execution is permitted only through a constrained execution interface requiring the governed context bundle and a gate produced governance artifact. In some embodiments, downstream reliance is conditioned on verification of a readiness artifact.

10 Claims, 12 Drawing Sheets

(56)     References Cited

U.S. PATENT DOCUMENTS

2009/0328170  A1*  12/2009  Williams  ............. H04L 63/105
                                                                        718/1
2011/0283341  A1*  11/2011  Palekar  ............. H04L 63/0884
                                                                        726/4
2017/0026353  A1*   1/2017  Chen  .................... H04L 63/061
2017/0300708  A1*  10/2017  Gopshtein  .......... H04L 63/0823
2018/0337889  A1*  11/2018  Panchapakesan  ......... H04L 9/14
2020/0311192  A1*  10/2020  Kumar  ................. G06F 40/174
2021/0349743  A1*  11/2021  Panchomarthi  ....... H04L 9/0819
2022/0318312  A1*  10/2022  Atallah  ............. G06F 16/2228
2025/0103718  A1*   3/2025  Pennisi  ................. G06F 21/64
2025/0156122  A1*   5/2025  Yu  ........................... G06N 7/01
2025/0294061  A1*   9/2025  Arkoff  ................... H04L 63/20
2026/0010525  A1*   1/2026  Clark  ................. G06F 16/2272
2026/0019268  A1*   1/2026  Arkoff  ................. G16H 10/60
2026/0024639  A1*   1/2026  Arkoff  ................. G16H 10/60
2026/0024661  A1*   1/2026  Arkoff  ................. G16H 50/20
2026/0024668  A1*   1/2026  Arkoff  ................. G16H 50/30
2026/0037738  A1*   2/2026  Galvin  ................... G06F 40/30

* cited by examiner

ENGRAM GOVERNANCE SYSTEM
(100)

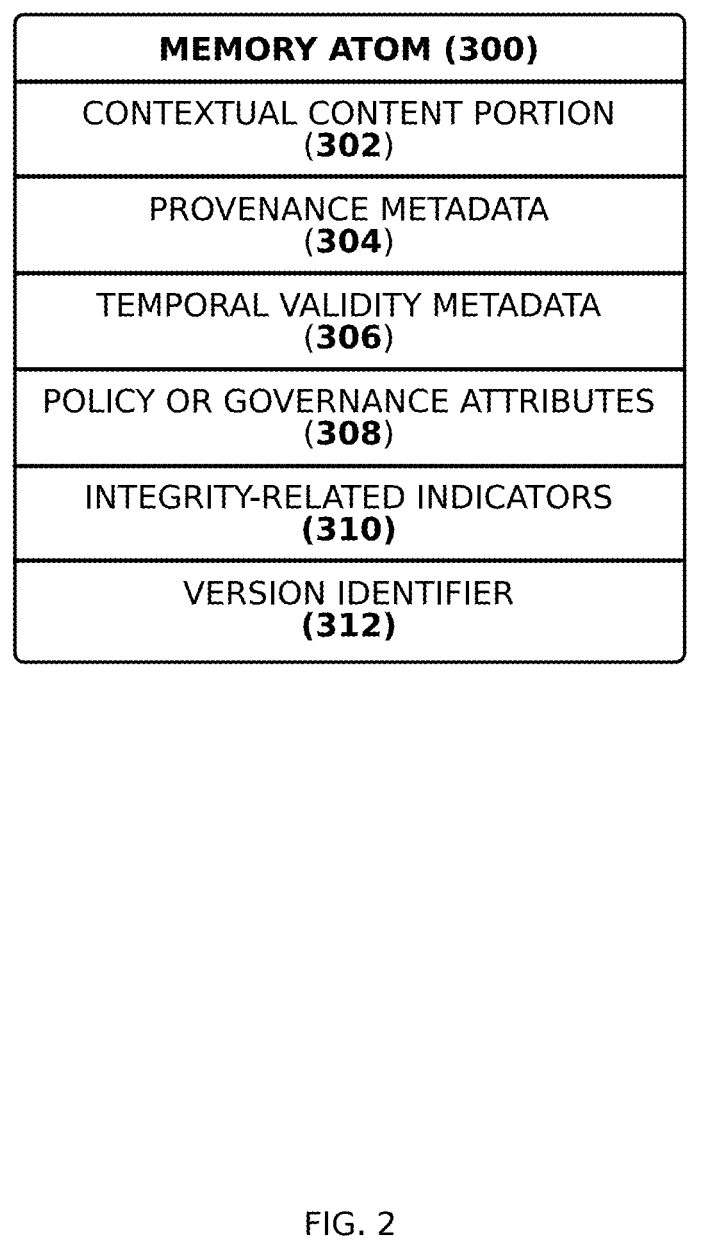

| MEMORY ATOM (300) |
| :---: |
| CONTEXTUAL CONTENT PORTION (302) |
| PROVENANCE METADATA (304) |
| TEMPORAL VALIDITY METADATA (306) |
| POLICY OR GOVERNANCE ATTRIBUTES (308) |
| INTEGRITY-RELATED INDICATORS (310) |
| VERSION IDENTIFIER (312) |

FIG. 2

ENGRAM STORE (130)

PATIENT PARTITION (502) (Patient A)

ATOM
STORAGE
STRUCTURE
(504)

PROVENANCE
METADATA
STORE
(506)

TEMPORAL
VALIDITY
INDEX
(508)

DETERMINISTIC
LOOKUP
INDEX
(510)

SIMILARITY-BASED
RETRIEVAL
INDEX
(512)

CONTRADICTION
OR CONFLICT
REPRESENTATION
(514)

PATIENT PARTITION (503)  (Patient B)

ADMITTED SET OF MEMORY ATOMS
(168)

GOVERNED CONTEXT BUNDLE ASSEMBLER
(180)

CONTEXT ASSEMBLY RULES
(802)

CONTEXT CAPACITY CONSTRAINT
(804)

CONTEXT COMPARTMENTS (806)

MANDATORY CONSTRAINT
COMPARTMENT (808)

OPTIONAL CONTEXTUAL
COMPARTMENT (810)

STEERING-ONLY COMPARTMENT
(812)

DETERMINISTIC ORDERING RULE
(814)

TOKENIZER SCHEME IDENTITY
(816)

GOVERNED CONTEXT BUNDLE
(190)

BUNDLE IDENTIFIER
(191)

NON-BYPASSABLE GOVERNANCE OF PARTITIONED CONTEXTUAL MEMORY FOR CONDITIONING EXECUTION

CROSS-REFERENCE TO RELATED APPLICATIONS

This application is a continuation-in-part of U.S. patent application Ser. No. 19/433,438, filed Dec. 26, 2025, entitled "Medical Data Governance and Deterministic Arbitration System for Evidence-Bound Artificial Intelligence Outputs", which is a continuation-in-part of U.S. patent application Ser. No. 18/520,430, filed Nov. 27, 2023, entitled "MEDICAL DATA GOVERNANCE SYSTEM", which is a continuation-in-part of U.S. patent application Ser. No. 16/940,477, filed Jul. 28, 2020, entitled "Medical Data Governance System", which claims the benefit of U.S. Provisional Patent Application No. 62/880,019, filed Jul. 29, 2019.

The disclosures of the foregoing applications are hereby incorporated by reference herein in their entirety.

The disclosures of the applications referenced are incorporated by reference herein in their entirety for all purposes, except that no subject matter is incorporated by reference to the extent that it is inconsistent with the express disclosure of this specification. In the event of any inconsistency between the present specification and any incorporated document, the present specification shall control. Incorporation by reference is not intended to import claim scope limitations, disclaimers, or prosecution history statements from any incorporated document into the present application unless expressly stated herein.

FIELD OF THE INVENTION

The present invention relates generally to computer systems and methods for governing use of contextual information in execution of a governed execution component and computer-executed workflows. More particularly, the disclosure relates to patient partitioned contextual memory systems that enforce policy-bound admissibility, execution conditioning, and reliance control through non-bypassable, machine-enforced interfaces when contextual information is supplied to governed execution components operating over regulated data. The disclosed subject matter lies at the intersection of contextual memory management, model orchestration, and technical enforcement of machine-executed workflows, including systems that assemble, constrain, and audit contextual inputs to computation under a context capacity constraint. Embodiments of the disclosure are applicable to environments in which contextual information is subject to policy, provenance, integrity, and audit requirements, including healthcare, life sciences, and other regulated domains.

The disclosure further relates to computer-implemented mechanisms that condition execution of governed execution components on completion of admissibility evaluation prior to execution and that condition downstream reliance on output based on governance artifacts produced during contextual memory evaluation. The disclosed techniques are applicable to both locally hosted and externally accessed governed execution components and support privacy-preserving steering, audit-grade replay, and enforcement of minimum-necessary disclosure in regulated computational workflows.

BACKGROUND OF THE INVENTION

Computer systems that integrate reasoning models, agent-based systems, or orchestration components with electronic medical records and other clinical data sources increasingly rely on assembling task-relevant patient information into an input context for computation. In such systems, a user or workflow may request summarization, longitudinal comparison, contraindication identification, or retrieval of clinically relevant history. Execution of these tasks requires that patient scoped contextual information be selected and provided to a governed execution component (e.g., reasoning model, agent, or orchestration component) prior to inference.

However, the input context available to a governed execution component is subject to a context capacity constraint, while real-world patient histories may span long time horizons, multiple care settings, and heterogeneous data modalities, including structured records, unstructured clinical notes, laboratory results, imaging metadata, pharmacy information, device telemetry, and externally sourced records. As a result, systems must necessarily select, compress, summarize, or otherwise constrain patient information before such information can be used for computation.

Existing approaches to context assembly often rely on heuristic selection, ad hoc prompt construction, or similarity-ranked retrieval to identify content to be supplied to a model. While such approaches may improve relevance ranking, they generally operate without enforcing non-bypassable admissibility, purpose limitation, provenance sufficiency, or fail-closed behavior at the moment contextual memory is injected into computation. Such variation can cause the same task request to be executed under materially different contextual inputs, thereby producing inconsistent outputs and preventing reproducible verification of context-dependent behavior. As a result, systems may omit clinically material constraints, include irrelevant or stale information, or vary the exact context provided to a model across executions without producing a deterministic or replayable record of what information influenced a given output.

Similarity-based retrieval and vector-indexed memory stores can further prioritize recent or semantically proximate artifacts while overlooking rare but safety-critical contextual elements such as contraindications, longitudinal baselines, or policy-restricted information. In such systems, selection of contextual memory is often performed as an informal prompt construction step rather than as a governed operation enforced prior to execution. Moreover, many existing systems do not provide a mechanism for deterministically reconstructing the precise context supplied to a model for a given task, complicating audit, compliance review, and incident investigation.

Clinical and regulated environments impose additional requirements that amplify these limitations. Contextual information supplied to a reasoning system must be constrained according to role, purpose of use, consent status, and organizational policy, and systems must deny admission and deny execution when admissibility cannot be established. These requirements become particularly acute in environments with extensive longitudinal records, where silent truncation, over-disclosure, or omission of clinically material information can materially affect safety, regulatory compliance, and institutional risk.

Additionally, existing approaches typically do not enforce mandatory inclusion of designated classes of contextual information as a deterministic, machine-checked precondition of execution, nor do they detect or record when required classes cannot be included due to provenance insufficiency, policy constraints, or a context capacity constraint. In such cases, a reasoning model may be provided an incomplete or distorted subset of a patient's longitudinal record without any governed indication that omissions occurred, leading to overconfident or unsafe outputs that cannot be reliably audited after the fact.

In parallel, many deployments access reasoning models through hosted services or external interfaces that are not controlled by the healthcare organization operating the clinical data systems. Transmitting unbounded patient records into such services can exceed a context capacity constraint, increase privacy and copying risk, and undermine institutional control over patient scoped information. At the same time, withholding patient context entirely can degrade model performance and limit clinical utility.

Certain clinical scenarios further involve sensitive attributes that are subject to heightened privacy or disclosure restrictions while still being relevant as constraints on reasoning or action. In such cases, direct disclosure of the underlying facts may be prohibited, even though their presence or effect should influence downstream reasoning or action selection. Conventional systems do not provide a structured mechanism to convey such constraints without disclosing the underlying sensitive information or enabling third-party systems to reconstruct protected attributes.

Accordingly, there exists a need for computer systems that treat contextual memory not as an informal prompt input, but as a governed, patient partitioned resource whose admissible use is enforced prior to execution and prior to reliance on output. Such systems must bound contextual memory according to a context capacity constraint, enforce policy and integrity constraints in a fail-closed manner, and produce deterministic, replayable artifacts sufficient to establish what information was permitted to influence computation and downstream actions. There further exists a need for mechanisms that enable privacy-preserving, patient-specific steering of reasoning systems without wholesale disclosure of patient records, while preserving auditability, institutional control, and compliance with regulatory requirements.

SUMMARY OF THE INVENTION

Although certain embodiments are described in connection with healthcare data, the disclosed ENGRAM contextual memory governance techniques are applicable to computer-implemented reasoning systems in any domain requiring policy-bound context construction, minimum-necessary disclosure, and audit-grade replay.

In healthcare embodiments, these requirements are particularly acute because patient scoped source data may be incomplete, inconsistent, or subject to disclosure restrictions.

Clinical data systems such as EMRs, HIS platforms, laboratory systems, imaging systems, and device telemetry repositories are widely used as sources of patient information. However, the presence of information in such systems does not guarantee that the information is correct, current, complete, consistent, or authorized for a particular use. In practice, patient records may include obsolete entries, transcription errors, copy-forward content, contradictory facts across institutions or encounters, or mis-associated information originating from another patient. In addition, certain patient-associated information may be subject to privacy restrictions, consent limitations, role-based access rules, or minimum-necessary disclosure requirements, even when such information is clinically relevant. As a result, systems that provide raw or ungoverned clinical data to a reasoning model may cause the model to rely on incorrect or unauthorized context, may silently omit clinically material constraints due to finite context capacity, and may fail to produce a deterministic, auditable record of what information was permitted to influence execution and downstream reliance.

In some embodiments, the governed contextual memory mechanisms described herein are used not only to support interactions with clinical professionals, but also to support patient facing interactions and real-time voice-based agent systems. For example, a patient facing voice agent may communicate with a patient regarding post-operative instructions, discharge reminders, scheduling, administrative messaging, or other non-clinical workflows, while being constrained to consume only a governed context bundle assembled through the non-bypassable memory gate under an applicable policy snapshot and one or more integrity criteria. In such embodiments, when a patient facing interaction raises a clinical question, contradiction, or other safety-relevant issue, the ENGRAM layer may generate control signals and/or enforce reliance conditioning by restricting downstream effectuation, requiring escalation to an authorized professional workflow, or conditioning acceptance of any state-changing action at an acceptance endpoint on issuance and verification of a readiness artifact, thereby preventing ungoverned reliance on incomplete, stale, inconsistent, or unauthorized patient scoped context.

The present disclosure relates to computer systems and methods for governing the use of patient scoped contextual information in execution of reasoning models or agentic systems in policy-constrained or high-stakes environments. In particular, the disclosure introduces an ENGRAM contextual memory governance system that operates as a non-bypassable, pre-inference control plane, conditioning both execution of a governed execution component (e.g., reasoning model, agent, or orchestration component) and downstream reliance on model output based on policy-bound admissibility of contextual memory.

In accordance with the disclosed embodiments, the system maintains patient partitioned contextual memory comprising discrete memory atoms, each memory atom representing a unit of contextual information associated with provenance metadata, temporal validity metadata, and governance-relevant attributes. Patient partitioning enforces isolation of contextual memory across patient identities such that retrieval and use of memory atoms are constrained to an identified patient unless an explicit policy authorized operation permits otherwise.

In response to a task request associated with a patient identity, the system retrieves a candidate set of memory atoms from the patient partitioned contextual memory. Retrieval identifies potentially relevant contextual information but does not itself authorize use of such information for computation. Authorization to use contextual memory is determined exclusively by a non-bypassable memory gate that operates prior to execution of a governed execution component.

The memory gate evaluates each candidate memory atom under an applicable policy snapshot and one or more integrity criteria to determine an admissibility state for the memory atom. Admissibility states may include admission, denial, redaction, abstraction, or attenuation. The memory gate enforces fail-closed behavior such that memory atoms are denied when admissibility cannot be established, and when admissible only in transformed form are admitted as redacted, abstracted, or attenuated representations. Memory atoms not admitted by the memory gate are not accessible to the reasoning system.

Memory atoms admitted by the memory gate are assembled into a governed context bundle prior to execution of the governed execution component. The governed context bundle is a bounded, policy-bound artifact assembled subject to context capacity constraints, deterministic ordering rules, and governance-defined compartmentalization rules for separating or labeling admitted context segments. The governed context bundle is identified by a bundle identifier and bound to an applicable policy snapshot identifier or policy digest applied during admissibility evaluation.

As used herein, a "governed execution package" comprises (i) the governed context bundle and (ii) a gate produced governance artifact bound to the governed context bundle.

Execution of the governed execution component is conditioned on presentation of the governed execution package, such that execution using patient scoped contextual information other than the governed context bundle is prevented by restricting access to patient scoped contextual information and by rejecting execution requests that do not present a valid governed execution package. In this manner, the disclosed system converts contextual memory from an advisory input into an enforced precondition of computation and prevents bypass of governance controls through direct model invocation or ungoverned context access. Output generated by a governed execution component does not automatically update, overwrite, or create ENGRAM memory atoms absent an explicit, policy authorized memory update operation.

In certain embodiments, the disclosed ENGRAM contextual memory governance system operates as a governance grade substrate for downstream reasoning and verification systems by deterministically governing what contextual information is eligible to influence inference and reliance under recorded policy constraints. As used herein, "truth making" refers to governance-enforced admissibility, provenance sufficiency, and replayable context construction, and does not require or imply that any output generated by a governed execution component is correct, clinically valid, or verified as ground truth. Rather, it establishes verifiable conditions under which contextual inputs were admitted, transformed, and presented. By constructing governed context bundles as bounded, policy-bound, and replayable machine artifacts prior to execution, the ENGRAM layer ensures that downstream arbitration, verification, rendering, or acceptance mechanisms operate only over contextual inputs that are admissible, provenance-sufficient, and non-bypassably gated. In this manner, the disclosed subject matter improves correctness, auditability, and reliability of computer-implemented reasoning systems by preventing silent context truncation, nondeterministic prompt drift, and ungoverned recall, independent of any particular upstream data preparation or downstream truth-enforcement implementation.

In some embodiments, the memory gate further performs a two-phase evaluation comprising an admissibility determination phase and a reliance readiness determination phase. The admissibility determination phase governs whether contextual information may be used to generate output, while the reliance readiness determination phase governs whether output generated using admitted context may be relied upon for downstream state-changing actions. Output generation may be permitted under admissibility-only conditions while reliance is restricted or deferred when reliance readiness criteria are not satisfied.

In some embodiments, downstream reliance on model or agent output is conditioned at a reliance boundary by a governed connector positioned upstream of an acceptance endpoint. The governed connector requires presentation of a readiness artifact bound to the governed context bundle and the applicable policy snapshot identifier or policy digest as a condition of accepting a reliance event. When the readiness artifact is absent, invalid, or inconsistent, the reliance event is denied or deferred, thereby preventing downstream commitment of output generated under non-compliant or insufficient governance conditions.

The system records governance records and evidence bundles identifying the applicable policy snapshot identifier or policy digest, candidate set of memory atoms, admissibility outcomes, transformations, bundle identifiers, and other governance artifacts sufficient to enable deterministic reconstruction and verification of the governed context bundle used for a task request. Deterministic replay enables independent verification by an authorized verifier of what contextual information was permitted to influence execution and reliance, under what policy constraints, and in what form.

In various embodiments, the patient partitioned contextual memory and ENGRAM memory representations described herein, including memory atoms and derived representations, may be generated, populated, or maintained by any upstream data pipeline or system, without limitation. By way of non-limiting example, memory atoms may be produced by an electronic health record or electronic medical record system, a clinical data aggregation or normalization service, a third-party extraction or feature-generation pipeline, or a governance, compliance, or mediation engine operating within or outside a healthcare organization.

The disclosed invention does not require, assume, or depend upon any particular upstream mechanism by which patient scoped contextual information is created, summarized, normalized, or derived. Rather, the technical contribution of the disclosed systems and methods resides in the machine-enforced governance, admission, transformation, bundling, execution conditioning, and deterministic replay of patient scoped contextual memory after such information exists, regardless of its origin.

Accordingly, the ENGRAM layer operates as a pre-inference control plane that constrains how contextual information may be admitted, transformed, ordered, bounded, audited, and relied upon during execution of a governed execution component, independent of whether such contextual information was generated by a proprietary clinical system, a third-party service, an automated extraction pipeline, or a governance engine. This separation ensures that the disclosed invention governs use and execution behavior, rather than prescribing or limiting upstream data creation processes.

For avoidance of doubt, the disclosed systems and methods govern how contextual information is admitted to and constrains computation, and do not require control over, ownership of, or modification to upstream patient data generation systems.

The disclosed embodiments provide a technical improvement to computer systems that execute reasoning models or agentic workflows over regulated data by enforcing machine-level control over contextual memory prior to computation and prior to reliance on output. Unlike ad hoc retrieval, post-hoc filtering, or prompt-construction techniques that do not technically constrain execution pathways, the disclosed system conditions execution itself on completion of admissibility evaluation by a non-bypassable memory gate and presentation of a gate produced governance artifact, thereby preventing ungoverned use of patient scoped contextual information.

Unlike retrieval-augmented generation systems and generic retrieval-augmented prompting that dynamically assemble prompts using similarity-ranked data without governance guarantees, the disclosed ENGRAM architecture treats model input context as a governed artifact and enforces mandatory candidate class inclusion rules for designated atom classes. The system detects and records omission conditions and insufficient-context states when required information cannot be admitted, and enforces fail-closed suppression or deferral when provenance sufficiency cannot be established. The governed context bundle is assembled using deterministic ordering and canonical serialization under a context capacity constraint and is bound to immutable applicable policy snapshot identifiers or policy digests and deterministic bundle identifiers. Deterministic replay of governed context bundles, including ordering and transformation outcomes, enables verification of exactly what information was presented to a governed execution component, thereby preventing silent truncation, nondeterministic prompt drift, or post-hoc reinterpretation of contextual inputs under finite context capacity constraints.

In various embodiments, the disclosed system provides a technical improvement to computer-implemented reasoning systems by transforming ad hoc prompt construction into a constrained, pre-inference execution pipeline that enforces finite context capacity, deterministic serialization, and non-bypassable invocation pathways. By assembling governed context bundles using canonical serialization, deterministic ordering, and recorded tokenizer identities, and by conditioning execution on machine-verifiable governance artifacts at a constrained execution interface, the system reduces uncontrolled context expansion, prevents non-deterministic prompt drift, and improves reproducibility, reliability, and auditability of context-dependent computation under bounded memory constraints.

Accordingly, the disclosed system provides a technical improvement to computer security and execution integrity by preventing ungoverned contextual access pathways and by enforcing cryptographically verifiable execution preconditions for context-dependent computation.

The disclosed system further improves safety and compliance by separating inference from reliance. By conditioning acceptance of state-changing actions on readiness artifacts produced under reliance readiness evaluation, the system permits generation of reasoning output while preventing premature or unsafe reliance on such output. This separation enables integration of reasoning systems into regulated workflows without requiring unrestricted trust in model behavior.

In some embodiments, the system further generates explicit omission or insufficient-context states when required information cannot be admitted under the applicable policy snapshot, provenance sufficiency criteria, or context capacity constraints. By restricting or deferring reliance until omissions are resolved, the system prevents silent failure modes in which clinically material context is excluded without detection.

The disclosed architecture further enables external verification and defensible deployment by producing replayable evidence bundles that bind contextual usage to immutable policy snapshots and recorded admissibility outcomes. These capabilities support compliance review, incident investigation, quality assurance, and litigation analysis by providing a verifiable record of how contextual memory governed execution and reliance for a given task.

BRIEF DESCRIPTION OF THE DRAWINGS

FIG. 2 illustrates an example structure of a memory atom including contextual content and associated provenance metadata, temporal validity metadata, and governance-related attributes.

DETAILED DESCRIPTION OF THE INVENTION

Definitions and System Architecture

Figure 1:
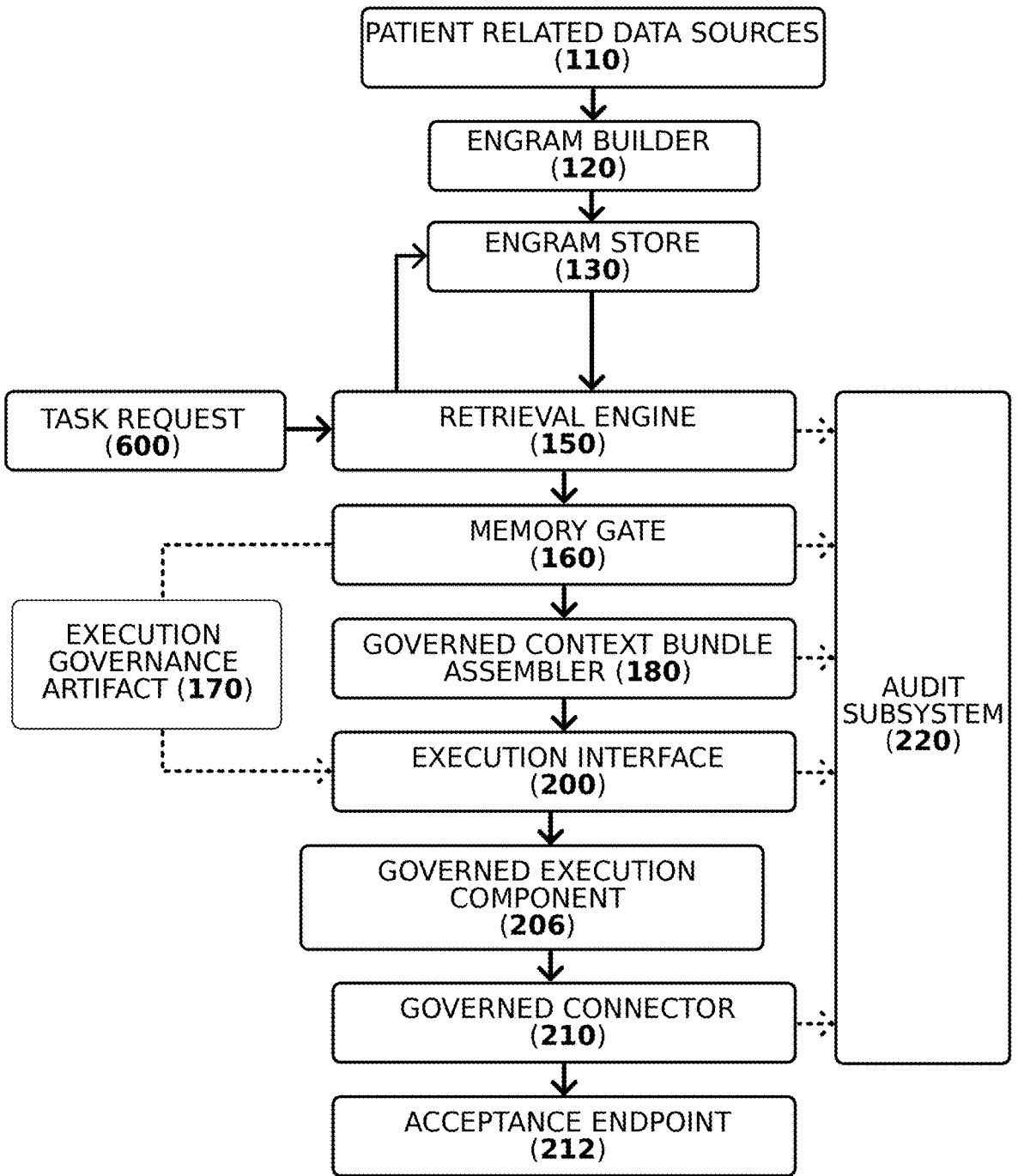
FIG. 1 illustrates an example system architecture in which an ENGRAM contextual memory governance system operates as a pre-inference control plane between patient scoped data sources and a governed execution component.

This disclosure describes computer-implemented control of model and agent execution in regulated environments by governing the conditions under which patient scoped information is permitted to be assembled into an input context, transmitted to a reasoning system, and relied upon for downstream state-changing actions. In particular, the disclosed systems treat model input context as a constructed, bounded, and replayable machine artifact that is admitted and assembled only through a non-bypassable pre-inference gate. Execution of a reasoning model or agent is conditioned, by enforcement at a constrained execution interface requiring gate produced governance artifacts, on successful admission and assembly of a governed context bundle that satisfies applicable policy and integrity constraints. In various embodiments, downstream reliance events are likewise conditioned on presentation and verification of readiness artifacts bound to the governed execution package (including the governed context bundle and a gate produced governance artifact bound thereto). The patient scoped contextual memory and memory atoms evaluated by the ENGRAM layer may be produced by any upstream system or pipeline, including an electronic medical record system, a third-party extractor or normalizer, or an optional governance engine, and the disclosed invention is directed to how such contextual information is admitted, constrained, assembled, audited, and conditioned for execution and reliance, rather than requiring any particular upstream creator.

As used herein, "ENGRAM" refers to a computer-implemented governance system comprising one or more software and/or hardware components that together implement a contextual memory control plane. The ENGRAM system includes (i) a patient partitioned contextual memory substrate ("ENGRAM memory") for storing governed contextual representations, (ii) computer-executable control logic including retrieval, non-bypassable gating, and governed context assembly mechanisms, and (iii) artifact-generation mechanisms that produce machine-verifiable governance artifacts for audit, replay, and enforcement. ENGRAM is thus not a single data object, but a system that stores, evaluates, transforms, assembles, and binds contextual representations into governed artifacts used to condition execution and reliance.

In various embodiments, ENGRAM is implemented as a service, gateway, proxy, sidecar, or distributed set of cooperating components.

As used herein, a "governed execution component" refers to any computation component that consumes a governed context bundle (or a gate produced steering profile derived therefrom) to generate an output, including without limitation a reasoning model, an agentic component, an orchestration component, or a model access gateway executing or mediating such computation. While many embodiments described herein involve reasoning models, agentic systems, or orchestration workflows, the governed execution component is not limited to artificial intelligence systems and may comprise any computational component whose execution depends on patient scoped contextual input and whose operation is conditioned on presentation of a governed context bundle and associated governance artifacts.

System Components

As used herein, an ENGRAM contextual memory layer (or "ENGRAM layer") is an implementation of the ENGRAM system that operates between one or more patient-related data sources and one or more reasoning models, agentic components, or orchestration services, and enforces governed retrieval, admissibility evaluation, governed context bundle assembly, and generation of governance artifacts as described herein.

The governed context bundle and the gate produced governance artifact bound thereto collectively comprise a governed execution package as defined herein.

For avoidance of doubt, "ENGRAM" does not imply or require any biological mechanism, neurological process, or neuroscientific model of memory.

Unless otherwise stated, references to "pre-inference" or "prior to execution" refer to operations performed before a reasoning model, agent, or tool-using orchestration component is permitted to consume patient scoped contextual content for substantive output generation.

A patient partition is a logical and/or physical isolation boundary by which stored memory atoms and retrieval operations are constrained to a single patient identity, unless an explicit, policy authorized cross-partition operation is invoked. In various embodiments, the patient partition is enforced by at least one of partition keys, access control rules, tenant boundaries, encryption domain separation, credential scoping, or network segmentation. Patient partitioning is described as a structural safeguard that reduces cross-patient leakage and supports minimum-necessary disclosure when coupled with memory gate enforcement as described herein; however, patient partitioning does not by itself authorize disclosure of any particular contextual content absent satisfaction of the memory gate described herein.

ENGRAM memory is a patient partitioned contextual memory substrate that stores a plurality of machine-addressable memory atoms. ENGRAM memory may be stored in any suitable database or storage system, and may maintain indices supporting deterministic addressing, similarity-ranked retrieval, and hybrid retrieval. In some embodiments, ENGRAM memory supports recall-oriented access patterns in which a previously constructed governed context bundle, or a previously admitted set of memory atoms for a recurrent task pattern, is selectively recalled and reused subject to re-evaluation under the then-applicable policy snapshot as referenced by the applicable policy snapshot identifier or policy digest and integrity criteria.

A memory atom is a discrete unit of contextual information maintained in ENGRAM memory and addressable for retrieval, gating, and assembly. A memory atom may represent, without limitation, a fact, constraint, baseline, summary, structured measurement, event, or modality-derived feature, and is associated with metadata sufficient to support governance decisions. In various embodiments, the metadata associated with a memory atom includes at least one of provenance metadata, temporal validity metadata, modality metadata, policy tags, confidence or quality indicators, and contradiction indicators. Memory atoms may be stored and versioned such that updates are recorded as new atom versions rather than overwriting prior content, thereby preserving lineage for audit and replay.

A Checklist Atom is a patient scoped ENGRAM memory element representing a discrete question, confirmation, instruction, or verification step associated with a clinical, diagnostic, non-diagnostic, or administrative task. Each Checklist Atom includes, or is associated with, governance metadata comprising applicability conditions, contraindication conditions, temporal validity constraints, provenance information, and one or more reliance state indicators computable under an applicable policy snapshot.

ENGRAM contextual memory representations are composed of one or more memory atoms and their associated metadata as stored in ENGRAM memory. Memory atoms constitute the atomic, addressable units of contextual information from which higher-level governed representations, including governed context bundles, steering profiles, and evidence bundles, are constructed.

A retrieval engine is computer-implemented logic configured to select, from the patient partitioned ENGRAM memory, a candidate set of memory atoms responsive to a task request associated with the patient identity. In various embodiments, the retrieval engine selects candidate atoms using deterministic addressing, rule-based selection, similarity scoring over semantic or modality-derived features, or combinations thereof. The retrieval engine may apply mandatory candidate class inclusion rules for designated atom classes and may produce ranked candidate lists for optional inclusion subject to capacity and policy constraints. Retrieval, as used herein, selects candidates for evaluation; retrieval alone does not authorize admission of any candidate content into a model input context absent gating.

As used herein, a "candidate set of memory atoms" refers to a set of memory atoms selected by the retrieval engine as potentially relevant to a task request and presented to the memory gate for admissibility evaluation. Selection of a memory atom into the candidate set does not authorize disclosure, admission into a governed context bundle, or consumption by a governed execution component. Each memory atom in the candidate set remains subject to fail-closed admissibility evaluation under the applicable policy snapshot (as referenced by the applicable policy snapshot identifier or policy digest) and one or more integrity criteria prior to any execution conditioning.

A memory gate is a non-bypassable control configured to evaluate the candidate set of memory atoms prior to model or agent execution and to determine, for each candidate atom, an admissibility state under an applicable policy snapshot (as referenced by an applicable policy snapshot identifier or policy digest) and one or more integrity criteria. In various embodiments, the memory gate further assigns a weighting parameter and/or performs a transformation of the atom prior to assembly into a governed context bundle. The memory gate is non-bypassable in that model or agent execution is permitted only when an invocation request presented at a constrained execution interface includes one or more gate produced governance identifiers or artifacts, such that patient scoped contextual content is not consumable by the reasoning system except through the gated pathway.

In embodiments providing downstream reliance control, acceptance of a reliance event or state-changing action is further conditioned at a governed connector or acceptance endpoint on verification of a readiness artifact bound to the governed context bundle and the applicable policy snapshot.

As used herein, an "admitted set of memory atoms" refers to the subset of memory atoms from the candidate set that the memory gate has determined to be admissible for inclusion in a governed context bundle under the applicable policy snapshot and one or more integrity criteria. The admitted set includes memory atoms admitted in transformed form, including as redacted, abstracted, or attenuated representations, and excludes memory atoms denied by the memory gate. In various embodiments, identifiers of the admitted set, together with per-atom admissibility outcomes and transformation indicators, are recorded in a governance record to support deterministic replay, audit, and verification of what contextual information was permitted to influence execution.

As used herein, an "included set of memory atoms" refers to the portion of the admitted set that is actually assembled into the governed context bundle after application of the context capacity constraint and deterministic assembly rules. In various embodiments, a memory atom may be admissible yet excluded from the governed context bundle due to capacity constraints, compartment allocation rules, or deterministic prioritization, and such exclusion may be recorded as an omission event or capacity-exclusion indicator in the governance record.

An integrity criterion is a machine-evaluable category of validation applied to a memory atom to determine eligibility for admission or safe use, the category comprising one or more of: (i) provenance verification, including source identification, acquisition pathway, and integrity attestation; (ii) temporal validity evaluation, including timestamp verification and freshness window enforcement; (iii) source trust classification, including evaluation against a defined trust tier or source reputation class; (iv) conflict detection or concordance evaluation, including identification of contradictions or unresolved inconsistencies with other memory atoms; and (v) completeness evaluation, including verification that mandatory atom classes required for the task are present or satisfiable.

A weighting parameter is a machine-readable parameter associated with an admitted memory atom and used to control how strongly the atom influences context assembly and/or downstream reasoning. In various embodiments, the weighting parameter includes at least one of a scalar weight, priority rank, confidence weight, modality-specific weighting, or contradiction-based attenuation factor.

A steering profile (also referred to as an "ENGRAM steering representation") is a governed representation derived from one or more memory atoms and configured to constrain or bias downstream reasoning without requiring disclosure of underlying raw patient data.

A sensitive attribute is patient-associated information subject to heightened privacy restrictions under an applicable policy snapshot, including without limitation protected diagnoses, family linkage information, genetic relationships, or other confidential identifiers. An obfuscated steering indicator is a non-raw representation derived from one or more sensitive attributes and configured to influence context assembly or downstream inference without revealing the underlying sensitive attribute. An escrowed reveal mapping is a protected association maintained by the ENGRAM layer that links an obfuscated steering indicator to underlying sensitive source content and permits authorized re-identification or controlled disclosure only upon satisfaction of policy and consent requirements, with corresponding audit logging.

An admissibility state is an output of the memory gate that specifies how a candidate memory atom is handled for context assembly. In various embodiments, admissibility states include, without limitation, admit, deny, redact, abstract, or attenuate. "Redact" refers to removal or masking of restricted fields while retaining permitted attributes. "Abstract" refers to replacement of data-bearing content with a higher-level constraint representation or steering representation that reduces disclosure while preserving functional influence on downstream reasoning. "Attenuate" refers to admission with reduced influence, including through weighting or de-prioritization during assembly.

A context capacity constraint is a bounded capacity limit on a governed context bundle provided to a governed execution component (e.g., a reasoning model, agent, or orchestration component). In various embodiments, the context capacity constraint includes at least one of a token budget computed under an identified tokenizer, a byte-size limit, a field-count limit, or a structured payload-size limit. In some embodiments, the system reserves capacity for designated mandatory atom classes by allocating predefined portions of the context capacity constraint to such classes and assembling those classes prior to optional content, such that inclusion of optional atoms is conditioned on remaining available capacity after mandatory atoms are placed.

Fail-closed refers to a default-deny behavior enforced by the memory gate such that the candidate set of memory atoms is treated as denied, or transformed to a non-data-bearing representation when admissibility cannot be established under the applicable policy snapshot and integrity criteria. In some embodiments, fail-closed operation produces an insufficient-context state indicating that the system lacks admissible information required to safely execute a task or safely rely on an output, and the system correspondingly restricts output delivery, restricts reliance, or triggers governed evidence requests.

As used herein, a "non-data-bearing transformed form" (also referred to as a "non-data-bearing representation") refers to a machine-readable representation of a candidate or derived memory atom in which patient scoped data-bearing content is removed, masked, or replaced such that the representation does not disclose underlying raw patient data, while still permitting governed operation of the system. In various embodiments, non-data-bearing transformed forms include, without limitation: (i) an omission marker or insufficient-context indicator, (ii) a constraint label or category code indicating a permitted risk tier, care setting, tool scope, or minimum-evidence requirement, (iii) a redaction token substituting for restricted fields, (iv) a bounded abstracted summary that excludes identifiers and restricted values, and/or (v) a steering-only representation that conditions downstream behavior without revealing source values. A non-data-bearing transformed form may retain permitted provenance, integrity, temporal, or class metadata to support audit and deterministic replay, while excluding disallowed content under the applicable policy snapshot.

A bundle family is a set of governed context bundles that are deterministically related through a shared task request, applicable policy snapshot identifier or policy digest, and candidate set of memory atoms. In various embodiments, bundle families are used to coordinate context delivery across multiple reasoning models or agentic components participating in a task, such that each model or agent receives either the same governed context bundle or a deterministically derived variant computed from the same recorded inputs. Bundle family identifiers are recorded as governance metadata and referenced during execution and replay to constrain context selection across parallel or sequential executions to bundles derived from the same source set, thereby avoiding divergence in contextual inputs attributable to ungoverned variation.

A third-party model is a governed execution component accessed via a hosted service or external interface that is not controlled by the entity operating the ENGRAM layer.

A context compartment is a logical subdivision within a governed context bundle that groups admitted content according to governance function, sensitivity class, provenance class, or downstream usage constraints.

In various embodiments, provenance and transformation lineage is recorded using dependency relationships among memory atoms and derived representations, as further described below.

Governance Artifacts and Identifiers

As used herein, the term "governance artifact" refers to one or more machine-verifiable artifacts produced by, or attributable to, the memory gate and bound to governed context artifacts and applicable policy inputs. Governance artifacts include, without limitation, execution governance artifacts required to condition execution at a constrained execution interface, gating tokens used to authorize invocation or access through an authorized pathway, and readiness artifacts used to condition acceptance of reliance events or effectuation at governed connectors or acceptance endpoints. Unless the context requires otherwise, references herein to a governance artifact encompass any such gate produced artifact, whether described as an execution governance artifact, gating token, readiness artifact, or equivalent machine-verifiable credential, provided that the artifact is cryptographically or referentially bound to at least a bundle identifier and an applicable policy snapshot identifier or policy digest.

A policy snapshot is a versioned, immutable, machine-readable representation of policy inputs evaluated for a particular task request and bound to governance outputs produced by the ENGRAM layer. In various embodiments, the policy snapshot comprises at least one of role constraints, purpose-of-use constraints, consent directives, sensitivity or classification labels, minimum-necessary disclosure rules, organizational or facility-specific policies, jurisdictional constraints, time or session scope constraints, and risk-classification constraints. As used herein, a policy snapshot includes configuration parameters, rules, or constraints, regardless of nomenclature, provided that such parameters, rules, or constraints are versioned, immutable for the duration of a task request, and bound to governance outputs.

The policy snapshot is identified by an applicable policy snapshot identifier or a policy digest suitable for recording, verification, and deterministic replay. The applicable policy snapshot identifier is recorded as governance metadata and bound to governed context bundles and readiness artifacts. The policy snapshot is treated as immutable for the duration of the task request such that changes to policy inputs result in generation of a new applicable policy snapshot identifier rather than modification of an existing snapshot.

The applicable policy snapshot identifier enables deterministic verification that identical policy inputs were applied during admissibility evaluation, governed context bundle assembly, execution conditioning, and reliance enforcement.

As used herein, a "policy digest" refers to a cryptographic digest or hash representing a policy snapshot and may be used as, or in place of, an applicable policy snapshot identifier to bind governance artifacts to the applicable policy state.

As used herein, and consistent with the foregoing definition of a policy snapshot, the terms "policy," "governance," and "applicable policy snapshot identifier" refer to any machine-enforceable set of constraints, rules, configuration parameters, or decision logic, together with associated versioning or identification mechanisms, used to evaluate admissibility, transformation, disclosure minimization, execution conditioning, and audit requirements. Such policy constructs may be implemented by an electronic medical record system, a third-party service, a configuration framework, or an optional governance engine, and are not limited by nomenclature, source, or implementation architecture. In some embodiments, the applicable policy snapshot identifier is cryptographically bound to a bundle identifier, evidence bundle digest, or readiness artifact to prevent substitution or downgrade of policy inputs.

Unless expressly stated otherwise, references herein to application, binding, verification, recording, transmission, or comparison of a "policy snapshot" refer to use of an applicable policy snapshot identifier, policy digest, or equivalent machine-verifiable reference to the policy snapshot, rather than to transmission or duplication of the full policy definition itself. The policy snapshot object defines the governing rule set, while the applicable policy snapshot identifier or digest functions as the binding and verification mechanism recorded in governance artifacts and audit records.

A governed context bundle is a task-scoped, machine-readable payload assembled using only memory atoms admitted by the memory gate and bounded by the context capacity constraint. In various embodiments, the governed context bundle includes an ordering of admitted atoms, including a deterministically computed ordering in some embodiments, references to atom identifiers, annotations indicating provenance and temporal validity, and binding identifiers including at least a bundle identifier and an applicable policy snapshot identifier or policy digest. In some embodiments, the admitted set of memory atoms determined by the memory gate is larger than the included set of memory atoms incorporated into the governed context bundle due to a context capacity constraint, deterministic ordering rules, or compartmentalization rules. Deterministic ordering is implemented by applying a recorded assembly rule set to the admitted atom identifiers under the applicable policy snapshot, such that reapplication of the same rule set to the same admitted atoms yields a reproducible governed context bundle for audit and replay.

As used herein, a "bundle identifier" refers to a machine-verifiable identifier associated with a governed context bundle and computed from, or otherwise bound to, at least the identifiers of the admitted set of memory atoms and an applicable policy snapshot identifier or policy digest, thereby enabling verification and replay.

An evidence bundle is a replayable, machine-readable artifact that includes, or references, the admitted set of memory atoms, ordering, applicable policy snapshot identifier or policy digest, gating outcomes, and one or more cryptographic integrity protections sufficient to enable independent reconstruction and verification of what contextual information was permitted to influence execution for a task.

As used herein, a "gating token" refers to a machine-verifiable credential produced by, or attributable to, the memory gate and bound to one or more governed context artifacts, including without limitation a bundle identifier and an applicable policy snapshot identifier or policy digest. In various embodiments, a gating token comprises a signed token, capability token, authorization token, or cryptographic proof that (i) the governed context bundle was assembled from an admitted set of memory atoms under the applicable policy snapshot and integrity criteria and (ii) the invocation is permitted via an authorized execution or reliance pathway. Gating tokens may include or reference an expiration time, nonce, scope, tool permissions, and/or reliance readiness predicates, and are validated by a constrained execution interface, model access gateway, governed connector, and/or acceptance endpoint mediator prior to permitting execution or effectuation.

An observable usage artifact is a traceable identifier or marker recorded by the system to evidence that governed retrieval and/or governed injection occurred for a task request. In various embodiments, observable usage artifacts include at least one of a bundle identifier, applicable policy snapshot identifier, gating token, readiness artifact identifier, cryptographic signature, embedded marker, or a recorded rejection event identifier.

A replay identifier is an identifier recorded by the system and usable to deterministically reconstruct a governed context bundle as presented for a task via an authorized execution pathway, including the set and ordering of admitted set of memory atoms and the associated governance identifiers. In various embodiments, the replay identifier references an audit record and/or evidence bundle that binds together the admitted atom identifiers, applicable policy snapshot identifiers or policy digests, and assembly rules sufficient to reproduce the bundle.

As used herein, deterministic replay refers to deterministic reconstruction of governed context artifacts and associated governance records for a task request, and does not require or imply determinism of output generated by a governed execution component.

In optional embodiments, deterministic replay of governed context artifacts may further support reconstruction or verification of downstream verification states, arbitration outcomes, rendering decisions, or acceptance outcomes produced by separate truth-enforcement, arbitration, or display-gating mechanisms.

Unless otherwise explicitly stated, references to deterministic replay throughout this disclosure refer to deterministic reconstruction of governed context artifacts and associated governance records.

In various embodiments, deterministic replay further comprises deterministic reconstruction and verification of one or more governed context artifacts and associated governance artifacts, including a governed context bundle identifier, admitted memory atom identifiers, transformation outcomes, deterministic ordering, an applicable policy snapshot identifier or digest, tokenizer identity, and canonical serialization inputs used to form the governed context bundle under a context capacity constraint. In this manner, deterministic replay ensures that the contextual inputs and governance conditions presented to a reasoning model or agent are reconstructable, verifiable, and audit-grade for incident review, compliance investigation, and defensibility.

Governance records, readiness artifacts, evidence bundles, and replay identifiers bind to the policy snapshot through its identifier or digest, enabling deterministic verification of applied policy inputs without requiring disclosure or reproduction of policy source content. In various embodiments, deterministic replay is performed using identifiers, digests, and recorded transformation parameters without requiring storage or disclosure of underlying patient scoped content in the governance record.

Canonical serialization refers to a deterministic encoding format used to represent a governed context bundle for capacity computation, ordering, and replay. In various embodiments, the ENGRAM layer associates a governed context bundle with a tokenizer scheme identity identifying the tokenizer version, configuration, or vocabulary used to compute token counts and enforce context capacity constraints. The canonical serialization format and tokenizer scheme identity are recorded as governance metadata and referenced during capacity computation and replay operations, such that reapplication of the recorded serialization format and tokenizer scheme identity to the admitted set of memory atoms yields the same capacity utilization and serialized bundle representation.

A policy evaluation trace is a machine-readable record identifying which policy constraints, predicates, or rules within a policy snapshot were evaluated during memory gate operation and the outcome of such evaluation. In various embodiments, the policy evaluation trace records identifiers of satisfied, violated, or indeterminate policy conditions without embedding policy source text. The policy evaluation trace is associated with the governed context bundle, replay identifier, or evidence bundle to enable deterministic reconstruction of governance decisions without disclosing policy implementation details.

Provenance closure refers to the property that each derived, abstracted, or steering representation admitted into a governed context bundle is traceable to one or more source memory atoms that were themselves evaluated by the memory gate. In various embodiments, the ENGRAM layer maintains a dependency graph linking derived representations to source atoms and recorded transformation steps. The dependency graph is referenced by the audit record or evidence bundle to enable verification that all contextual elements influencing inference originate from admissible, governed sources.

An external verifier is a component or third party configured to verify an evidence bundle or readiness artifact using a public key, signature, or other integrity mechanism, including without limitation a compliance auditor, regulator, enterprise security service, or incident review system.

Execution and Reliance Conditioning

As used herein, the term "non-bypassable" refers to a system-enforced execution or reliance control in which invocation of a reasoning model, agent, or tool, and/or submission of a reliance event to an acceptance endpoint, is permitted only through an authorized system pathway that enforces governance requirements, such that alternative invocation paths lacking required governance artifacts are rejected. A non-bypassable control is enforced by technical mechanisms that restrict invocation to a sole authorized pathway, or to one of a defined set of authorized pathways, and does not rely on voluntary compliance, advisory policy, or post-hoc audit. In various embodiments, such enforcement is implemented using credential scoping, network access restriction, and API authorization such that the reasoning model, tool, or acceptance endpoint is not reachable except through the authorized pathway or authorized set of pathways.

In various embodiments, the constrained execution interface is implemented as one or more concrete system components including, without limitation, a gateway, proxy, sidecar service, API mediation layer, credential-scoped invocation boundary, or equivalent execution-access control mechanism that technically restricts invocation of the governed execution component to authorized pathways requiring presentation of gate produced governance artifacts.

Implementation example (non-limiting): in one embodiment, a model access gateway or orchestration mediator is deployed as the sole network-reachable interface to a hosted reasoning model or tool API. Network policy and credential scoping deny direct access from application components to the model or tool endpoint. The gateway validates, on each invocation, that a gate produced governance artifact or gating token is present and is cryptographically bound to the bundle identifier and applicable policy snapshot identifier or digest recorded for the task request. If validation fails, the gateway rejects the invocation and records a rejection event identifier in the governance record, thereby enforcing fail-closed operation by technical mechanism rather than advisory policy.

Execution conditioning refers to gating whether a governed execution component may execute using patient scoped contextual information, whereas reliance conditioning refers to gating whether output generated under execution conditioning may be accepted for downstream effectuation or state-changing actions.

In certain embodiments, each Checklist Atom and each associated patient response is assigned a reliance state indicating whether the checklist information is eligible for downstream reliance without further confirmation, requires verification, or is insufficient for reliance. In various embodiments, the reliance state is computed deterministically as governance metadata based on provenance sufficiency, recency, temporal validity, internal consistency with other patient scoped ENGRAM memory elements, detected contradiction indicators, and the applicable policy snapshot identifier (or policy digest). In some embodiments, the reliance state contributes to one or more readiness predicates required for generation or verification of a readiness artifact at a reliance boundary. The reliance state conditions whether downstream effectuation or other state-changing actions may proceed and does not constitute autonomous decision-making, medical diagnosis, or clinical judgment.

A reliance event is an event that causes, or is treated as causing, downstream reliance on a model or agent output, including without limitation a commit operation, finalize operation, sign operation, dispatch operation, or write back operation into a system of record or workflow system.

An effectuation is a computer-performed or computer-accepted operation that causes a state change in a downstream system, workflow, or system of record based on, or in response to, an output generated by a governed execution component, wherein the state change is persisted, committed, dispatched, or executed such that it has operational consequence beyond transient display.

In various embodiments, effectuation includes, without limitation: writing, updating, committing, finalizing, signing, dispatching, transmitting, scheduling, ordering, executing, or granting an action in a downstream system, including an electronic medical record update, order placement, medication administration record update, task dispatch, chart finalization, payment release, access grant, ticket creation, code deployment, or automated approval.

Effectuation excludes generation of non-committed intermediate output or transient display content that is not committed to a downstream system.

An acceptance endpoint is a downstream system interface, connector, or endpoint at which an effectuation or reliance event is accepted, applied, or committed.

In certain embodiments, an acceptance endpoint includes a patient facing delivery gateway or communication channel endpoint, including without limitation voice or telephony systems, portal messaging systems, SMS delivery systems, email delivery systems, secure chat interfaces, or document release and publication services, such that patient facing transmission, release, publication, or delivery of instructions, forms, summaries, or other artifacts constitutes an effectuation or reliance event. In such embodiments, acceptance of patient facing effectuation is conditioned on verification of one or more readiness artifacts bound to the governed context bundle and the applicable policy snapshot identifier (or policy digest), thereby preventing patient facing delivery of content generated outside the governed execution pathway.

A governed connector is an intermediary component positioned on a pathway to an acceptance endpoint and configured to require one or more governance artifacts as a condition of permitting an effectuation or reliance event.

A readiness artifact is a machine-verifiable artifact derived from, or bound to, a governance record and configured to condition acceptance of a reliance event or effectuation at an acceptance endpoint, including without limitation a readiness token or gating token, authorization token, signed bundle identifier, signed applicable policy snapshot identifier, or signed evidence bundle digest. In various embodiments, governance artifacts include an execution governance artifact produced by the memory gate and required by a constrained execution interface as a precondition of execution.

In certain embodiments, a readiness artifact includes or is accompanied by a human authorization artifact attributable to an authorized healthcare provider, including without limitation a concurrence token, attestation record, or authorization signature, that authorizes a specific effectuation class. In such embodiments, the human authorization artifact is cryptographically or referentially bound to at least a bundle identifier and an applicable policy snapshot identifier (or policy digest), and is verified at a governed connector or acceptance endpoint as a condition of accepting a patient facing effectuation or other state-changing reliance event.

A reliance readiness predicate is a machine-evaluated condition, distinct from admissibility, that determines whether output generated using a governed context bundle is eligible to be relied upon for downstream effectuation or state-changing actions. In various embodiments, a governed context bundle may be admissible for inference yet fail a reliance readiness predicate due to unresolved contradictions, insufficient provenance assurance for a reliance class, missing mandatory atom classes, elevated risk classification, or unmet integrity thresholds. Reliance readiness predicates are evaluated deterministically and are bound to readiness artifacts used to condition acceptance of reliance events at acceptance endpoints.

In certain embodiments, governed context artifacts produced by the ENGRAM layer are consumable by downstream verification, arbitration, or rendering components that operate independently of inference. Such components are described throughout this disclosure in the context of deterministic replay, evidence bundles, and readiness artifacts.

An integrity exception event is a governed event indicating that one or more integrity predicates required for admission or safe use of memory atoms are not satisfied, including without limitation provenance insufficiency, failed attestation, failed checksum verification, stale temporal validity, detected contradiction, memory poisoning indicators, or missing mandatory atom class.

An omission event is a governed event indicating that one or more required memory atom classes or mandatory candidate class inclusion rules were not satisfied during context bundle assembly, including without limitation missing allergy information, missing medication information, missing contraindication constraints, or missing baseline parameters.

As used herein, ENGRAM contextual memory representations are constructed machine artifacts derived from upstream data sources and preprocessing pipelines, including clinical systems, extraction or normalization services, summarization processes, or governance-aware builders. Such representations are stored and governed prior to inference and are distinct from internal representations generated by a governed execution component during execution.

The disclosed invention governs which contextual representations may influence execution of a governed execution component, and under what policy and integrity constraints such influence is permitted. The invention does not require any particular internal representation of a reasoning model, including tokenization schemes, embeddings, n-grams, or model-internal state, and operates independently of how a reasoning model processes admitted input internally.

References to ENGRAM contextual memory representations encompass collections, assemblies, or governed forms of memory atoms produced and evaluated by the ENGRAM layer, rather than model-internal representations generated during inference.

The ENGRAM layer functions as a pre-inference control plane that constrains contextual perception and influence, rather than performing reasoning, generating conclusions, or encoding model-internal thought processes.

Nothing herein precludes upstream systems from using model-assisted extraction, summarization, or feature derivation, provided that resulting contextual representations are admitted, governed, and assembled through the ENGRAM layer before execution.

Output generated by a governed execution component does not automatically update, overwrite, or modify ENGRAM memory atoms, and is not persisted to ENGRAM memory absent an explicit, policy authorized write pathway subject to governance evaluation and audit recording.

System Architecture

FIG. 1 illustrates an example computer architecture in which the ENGRAM contextual memory layer operates as a pre-inference governance control plane positioned between patient-related data sources and one or more reasoning models, agentic components, or orchestration services and configured to enforce machine-level access control, deterministic context construction, and audit-grade replay. The architecture is configured such that patient scoped contextual information is not directly consumed by a reasoning system, and such that model or agent execution is conditioned, by enforcement at a constrained execution interface requiring gate produced governance artifacts, on prior construction and admission of a governed context bundle through a non-bypassable memory gate, as described herein.

In operation, the ENGRAM layer maintains a longitudinal, patient partitioned ENGRAM memory comprising memory atoms derived from heterogeneous clinical and operational sources. As described above, a memory atom may represent at least one of a factual data element, a baseline parameter, a constraint, a derived feature, a summarized representation, an abstracted indicator, or a modality-specific signal, provided that the memory atom is associated with provenance metadata and temporal validity metadata. Upon receipt of a task request associated with a target patient, the ENGRAM layer retrieves a candidate set of memory atoms responsive to the task request and evaluates those candidates using a memory gate prior to any model or agent execution. The memory gate determines admissibility, transformation, and weighting of candidate atoms under an applicable policy snapshot, as referenced by an applicable policy snapshot identifier or policy digest, and one or more integrity criteria, and denies or transforms content for which admissibility cannot be established. Only memory atoms admitted by the memory gate, as evidenced by gate produced admissibility outcomes recorded as governance metadata, are eligible for inclusion in a governed context bundle.

The architecture enforces a strict separation between retrieval and execution. Retrieval and gating are completed before inference, and the governed execution component is provided only with the resulting governed execution package. As used herein, the governed execution package comprises the governed context bundle and one or more gate produced governance artifacts bound thereto and required by the constrained execution interface. In this manner, the ENGRAM layer treats model input context as a constructed machine artifact whose existence, composition, and identifiers condition whether inference is permitted to occur. By contrast, ad hoc prompt construction, direct access to underlying data sources, or uncontrolled retrieval during execution are prevented by restricting access to patient scoped contextual content to a sole authorized pathway that includes the retrieval engine and memory gate, and by enforcing, at a constrained execution interface, rejection of execution requests that do not present gate produced governance artifacts.

In various embodiments, alternative invocation paths are rendered technically inoperable by credential scoping, network segmentation, and API authorization rules that deny direct access to patient partitioned context storage and deny model execution absent a gate produced token bound to the bundle identifier and the applicable policy snapshot identifier (or policy digest).

The ENGRAM layer includes an ENGRAM builder configured to ingest patient-related signals from one or more upstream data sources and to generate memory atoms suitable for storage in the patient partitioned ENGRAM memory. The ENGRAM builder operates asynchronously with respect to task execution and may asynchronously or periodically update the ENGRAM memory as new data becomes available. Importantly, the ENGRAM builder does not itself authorize disclosure or use of any memory atom for inference; rather, it prepares contextual units for potential future gating and admission.

The ENGRAM store maintains the patient partitioned ENGRAM memory and supports retrieval operations limited to the applicable patient partition. The store may provide indices enabling deterministic addressing, similarity-ranked retrieval, or hybrid retrieval, but does not determine admissibility. All candidate atoms retrieved from the ENGRAM store are subject to evaluation by the memory gate prior to inclusion in any governed context bundle.

The retrieval engine is configured to select, from the ENGRAM store, a candidate set of memory atoms responsive to the task request. In various embodiments, the retrieval engine applies deterministic inclusion rules for designated mandatory atom classes and may further rank additional candidates by relevance, recency, provenance sufficiency class, or contradiction status. Retrieval produces candidates for evaluation; retrieval alone does not authorize admission or disclosure of any content.

The memory gate is positioned as a non-bypassable control between retrieval and execution. The memory gate evaluates each candidate memory atom under the applicable policy snapshot and integrity criteria and produces an admissibility determination for that atom. In various embodiments, the memory gate may deny admission, admit the atom in data-bearing form, admit the atom in redacted or abstracted form, or admit the atom with attenuated influence via a weighting parameter. The memory gate enforces fail-closed behavior such that the candidate set of memory atoms is treated as denied, or transformed when admissibility cannot be established, and may produce an insufficient-context state when required information cannot be admitted.

Following gate evaluation, a context bundle assembler constructs a governed context bundle using only the included set of memory atoms selected from the admitted set of memory atoms. The governed context bundle is assembled subject to a context capacity constraint and one or more ordering rules, including deterministic ordering rules in some embodiments, and is annotated with governance identifiers sufficient to support audit and replay. The governed context bundle is treated as a task-scoped, machine-readable artifact distinct from underlying patient records and is identified by a bundle identifier bound to the applicable policy snapshot identifier or policy digest.

The architecture enforces that reasoning models, agents, and orchestration components consume only governed context bundles admitted through the memory gate. In various embodiments, model or agent execution is conditioned on presentation of a gate produced governance identifier, such as a gating token or bundle identifier, such that execution is prevented by rejection of invocation requests that do not traverse the authorized execution pathway and present the required governance identifiers, unless the governed context bundle was successfully assembled. This enforcement may be implemented by a model access gateway, orchestration layer, or other execution mediator that rejects invocation requests lacking the required governance identifiers. In such embodiments, the model access gateway requires presentation of a bundle identifier and an applicable policy snapshot identifier or digest, and denies execution requests that lack a valid gate produced token bound to such identifiers.

In some embodiments, the ENGRAM layer interfaces with a patient scoped persona agent that maintains access to the longitudinal ENGRAM memory and coordinates retrieval, gating, and context assembly for task requests associated with that patient. The persona agent may generate task-scoped derived context artifacts, including steering profiles or task-specific governed context bundles, using only memory atoms admitted by the memory gate. In such embodiments, the persona agent functions as a patient scoped execution boundary that prevents external systems from accessing raw patient records while still enabling governed reasoning.

In embodiments involving third-party models or externally hosted services, the ENGRAM layer reduces disclosure and copying risk by supplying only governed execution packages produced under memory gate governance, rather than transmitting bulk patient record content. Steering profiles, when used, are produced under memory gate governance and are subject to the same applicable policy snapshot identifier or policy digest and integrity criteria as data-bearing atoms, thereby preventing steering from operating as a bypass pathway around the governance controls.

The ENGRAM layer further includes an audit logger configured to record governance artifacts associated with each task request. Recorded artifacts may include the task request identifier, candidate memory atom identifiers, per-atom gate outcomes, admitted atom identifiers, weighting parameters, redaction or abstraction indicators, the governed context bundle identifier, the applicable policy snapshot identifier or policy digest, and a model or agent identifier. These records support deterministic reconstruction of the governed context bundle and enable later verification of what contextual information was presented to the reasoning system and under what governance conditions.

In some embodiments, the ENGRAM layer interfaces with downstream acceptance endpoints through governed connectors that condition effectuation or reliance events on presentation of readiness artifacts derived from the governance record. In various embodiments, a readiness artifact includes at least a bundle identifier, an applicable policy snapshot identifier or policy digest, a model configuration identifier, a validity interval, and a cryptographic signature or digest that is bound to, and verifiable against, a bundle digest and the applicable policy snapshot identifier or policy digest. In such embodiments, reliance on model or agent output, including write back, commit, finalize, or sign operations, is prevented by governed connectors positioned upstream of acceptance endpoints unless the readiness artifact bound to the governed context bundle and the applicable policy snapshot identifier or policy digest is present. These downstream enforcement mechanisms are described as extensions of the same pre-inference governance pipeline and serve to prevent reliance on outputs generated outside the governed execution pathway.

By structuring model input context as a governed, bounded, and replayable artifact and by enforcing non-bypassable gating as a precondition of execution, the disclosed architecture improves determinism, safety, and auditability of computer-implemented AI systems operating over large longitudinal patient records. The ENGRAM layer thereby transforms contextual memory from an ad hoc prompt-construction concern into a machine-enforced control surface that conditions computation and downstream reliance in regulated environments.

In various embodiments, the ENGRAM contextual memory layer is deployed as one or more computing components arranged to mediate access between patient data sources, one or more reasoning models or agentic components, and one or more acceptance endpoints. The described deployment topologies are non-limiting examples and do not restrict the ENGRAM layer to a particular hosting environment, vendor, or network architecture.

In a first non-limiting topology, the ENGRAM layer is deployed within an on-premises clinical environment controlled by a healthcare organization. In such embodiments, the ENGRAM store, retrieval engine, memory gate, governed context bundle assembler, constrained execution interface, and audit subsystem execute on one or more servers within a hospital network boundary. Source system connectors interface with one or more local systems of record, including at least an electronic medical record system, clinical device telemetry feeds, or departmental systems. Governance artifacts including bundle identifiers, applicable policy snapshot identifiers, evidence bundles, and readiness artifacts are generated within the on-premises boundary and are stored in, or referenced by, the tamper-evident audit chain maintained by the audit subsystem.

In a second non-limiting topology, the ENGRAM layer is deployed in a cloud environment and interfaces with one or more clinical source systems through a secure connector gateway. In such embodiments, the secure connector gateway terminates authenticated connections from on-premises source systems, applies network and identity controls, and mediates access to acceptance endpoints. The ENGRAM layer executes in the cloud environment and produces a governed execution package for tasks, while the secure connector gateway enforces that downstream tool access requests and reliance events are accepted only when accompanied by a valid gate produced governance artifact bound to the governed context bundle, the bundle identifier, and the applicable policy snapshot identifier or policy digest.

In a third non-limiting topology, the ENGRAM layer is deployed in a hybrid configuration comprising an on-premises gateway component and one or more cloud-hosted orchestration or model-access components. In such embodiments, patient partitioned storage and memory gate enforcement are performed within the on-premises boundary, and governed context bundles and steering profiles are exported across the boundary to cloud-hosted reasoning services through a constrained execution interface. The on-premises gateway component mediates all patient scoped retrieval operations and issues gate produced governance artifacts, and cloud-hosted components accept execution requests only when accompanied by such artifacts. In some embodiments, the hybrid configuration further positions governed connectors at acceptance endpoints to enforce readiness artifacts for reliance events, wherein readiness artifacts are generated by the ENGRAM layer and verified at the acceptance endpoint prior to state-changing actions.

In various embodiments, the ENGRAM layer is implemented as a service, gateway, proxy, sidecar, or distributed set of cooperating components, and may be deployed in a single administrative domain or across multiple administrative domains provided that patient partitioning, non-bypassable gating, deterministic bundle assembly, and tamper-evident audit recording are enforced as described herein.

ENGRAM Builder Component

The ENGRAM builder is a computer-implemented component configured to ingests patient-related signals from one or more heterogeneous clinical, administrative, or operational data sources and to generate memory atoms suitable for storage in the patient partitioned ENGRAM memory. The ENGRAM builder operates as a preparation stage within the overall architecture and is not configured to authorize, determine, or effectuate disclosure of patient information, admission of content into a governed context bundle, or execution of any governed execution component. In particular, the ENGRAM builder is not configured to generate a governed execution package and is not configured to produce gate produced governance artifacts bound to governed context bundles. Instead, the ENGRAM builder produces structured contextual units that may later be evaluated by the memory gate under applicable policy and integrity constraints.

In operation, the ENGRAM builder receives input data associated with a patient from one or more upstream sources and maps, parses, and/or transforms that data into memory atoms having a defined schema and associated metadata. In various embodiments, the atom schema includes an atom identifier, atom type, patient partition key, payload fields, provenance fields, temporal validity fields, and one or more governance tags. The ENGRAM builder may operate asynchronously, periodically, or in response to events, and may update the ENGRAM memory independently of task requests. Memory atoms generated by the ENGRAM builder are stored for potential future retrieval and gating but do not, by themselves, trigger any inference or disclosure.

In one embodiment, generation, population, and updating of patient partitioned ENGRAM memory atoms are upstream-independent. Memory atoms may be produced, populated, or updated by any upstream data pipeline, including without limitation:

(i) an electronic medical record (EMR or EHR) vendor pipeline;

(ii) a third-party extraction, normalization, indexing, or summarization pipeline; and/or (iii) a governance, validation, or integrity-assessment layer configured to evaluate provenance sufficiency, temporal validity, or preliminary admissibility criteria.

Accordingly, the disclosed subject matter does not require, assume, or depend on any particular upstream ingestion architecture, data preparation technique, or governance implementation. Rather, the invention governs how contextual information becomes eligible for retrieval, admission, assembly, and exposure to a reasoning model, independent of how such information is originally produced.

Data inputs processed by the ENGRAM builder may include, without limitation, electronic medical record data elements, clinician-authored notes, problem lists, medication and allergy records, laboratory results, pharmacy feeds, imaging data and imaging metadata, device and monitoring telemetry, prior encounter summaries, and external records received from other institutions or systems. Inputs may be structured, semi-structured, or unstructured, and may include non-text modalities.

In some embodiments, a patient receives care across multiple institutions, including without limitation a referral hospital, an outpatient clinic, and a tertiary care center. In such embodiments, the ENGRAM builder ingest patient-associated information from multiple source systems and may perform patient identity resolution to associate received information with a patient identity, including by master patient index (MPI) matching, record linkage, or probabilistic identity matching using demographic fields, encounter identifiers, or institution-specific patient identifiers. Memory atoms originating from multiple institutions may thereby be stored within the patient partitioned ENGRAM memory as atoms associated with the resolved patient identity, while retaining provenance metadata identifying the originating institution or source system. In response to a task request, the retrieval engine may select a candidate set of memory atoms originating from multiple institutions; however, prior to inclusion in a governed context bundle, the memory gate evaluates each candidate memory atom under an applicable policy snapshot (as referenced by an applicable policy snapshot identifier or policy digest) and one or more integrity criteria, including consent indicators, purpose-of-use constraints, and disclosure restrictions applicable to cross-institution sharing. Memory atoms that cannot be admitted for cross-institution use are denied or transformed to non-data-bearing representations, thereby enabling multi-source continuity of governed context while preventing unauthorized disclosure or reliance. In such embodiments, export or disclosure of patient scoped content across institutional boundaries, if performed, remains subject to inter-institutional policy constraints enforced through memory gate evaluation and readiness artifact conditioning as described herein.

The ENGRAM builder is not limited to any particular data source, format, or vendor system. Rather, the ENGRAM builder is configured to accept patient-related signals from diverse sources and to generate a normalized internal representation suitable for governance and replay. In some embodiments, the ENGRAM builder associates each input with source identifiers, acquisition pathways, time-stamps, and other provenance indicators at the time of ingestion.

The ENGRAM builder generates memory atoms by transforming ingested input data into discrete, machine-addressable contextual units. Atom generation may include, without limitation, normalization of patient identifiers and time-stamps, de-duplication of redundant inputs, mapping of source-specific fields into a common atom schema, extraction of salient constraints or baselines, derivation of summary representations, and computation of modality-specific features.

In various embodiments, the ENGRAM builder assigns metadata to each memory atom sufficient to support later governance decisions. Such metadata may include provenance metadata identifying the source and acquisition pathway, temporal validity metadata defining effective time ranges or decay rules, modality indicators, policy tags, confidence or quality indicators, and contradiction indicators identifying conflicts with other atoms. The ENGRAM builder may identify potential contradictions or inconsistencies across sources and may record such conditions in metadata; however, resolution of contradictions and determination of admissibility are deferred to the memory gate.

The ENGRAM builder may generate both data-bearing memory atoms and derived memory atoms. Derived memory atoms may include summaries, aggregates, or modality-derived features computed from underlying inputs. In such cases, the ENGRAM builder maintains associations between derived atoms and their source atoms to preserve lineage for audit and replay. The generation of derived atoms does not authorize their disclosure and does not bypass subsequent gate evaluation. In various embodiments, derived memory atoms and any representations computed therefrom are treated as candidate artifacts and remain subject to the non-bypassable memory gate prior to admission, disclosure, execution, or reliance.

Each memory atom generated by the ENGRAM builder may be associated with temporal validity metadata that defines when the atom is considered effective and, in some embodiments, when the atom expires or decays in relevance.

Temporal validity metadata may include effective time-stamps, expiration timestamps, version identifiers, or decay parameters that influence later retrieval and gating decisions.

In some embodiments, the ENGRAM builder implements append-only versioning such that updates to patient-related information are recorded as new atom versions rather than overwriting prior versions. This versioning preserves historical lineage and enables deterministic reconstruction of governed context bundles corresponding to prior points in time. Where multiple versions of an atom exist, the ENGRAM builder may record relationships among versions, such as supersession or overlap, without resolving which version is admissible for a given task.

By separating atom generation and versioning from admissibility and execution, the ENGRAM builder prepares patient-related information for subsequent governance processing without prematurely disclosing or authorizing its use. Under this separation, memory atoms generated by the ENGRAM builder are not eligible for inclusion in a governed context bundle until evaluated by the memory gate at task time. The memory gate, operating under an applicable policy snapshot as referenced by an applicable policy snapshot identifier or policy digest, and one or more integrity criteria, performs admissibility evaluation to determine which memory atoms are admitted, transformed, or denied for inclusion in the governed context bundle.

Output generated by a governed execution component does not automatically update, overwrite, or modify ENGRAM memory atoms. In various embodiments, ENGRAM memory is not updated from raw reasoning-model or agent outputs absent an explicit, policy authorized write pathway subject to governance evaluation and audit recording. In one embodiment, any proposed memory atom derived from a model or agent output is stored as a proposed atom associated with a non-admitted status and is placed in a quarantine partition or a pending state until one or more governed validation predicates are satisfied. Unless and until such predicates are satisfied, the proposed atom is excluded from governed context bundle assembly and is not eligible to influence inference or reliance.

ENGRAM Store Component

The ENGRAM store is a computer-implemented storage subsystem configured to maintain patient partitioned collections of memory atoms generated by the ENGRAM builder. The ENGRAM store operates as a persistent substrate for governed contextual memory and is not configured to authorize disclosure, determine admissibility, or serve as an execution interface for any governed execution component. Rather, the ENGRAM store maintains memory atoms and associated metadata in a form suitable for retrieval, gating, audit, and replay as described herein.

In operation, the ENGRAM store receives memory atoms from the ENGRAM builder and stores such atoms within a patient partition corresponding to the associated patient identity. The ENGRAM store exposes retrieval interfaces that allow the retrieval engine to select a candidate set of memory atoms responsive to a task request, but the ENGRAM store does not itself enforce policy snapshots, integrity criteria, or admissibility determinations as part of a gating control. In various embodiments, such retrieval interfaces are not exposed to governed execution components and are accessible only to authorized retrieval logic operating within the governed pipeline.

All candidate atoms retrieved from the ENGRAM store remain subject to evaluation by the memory gate prior to any inclusion in a governed context bundle.

Patient partitioning within the ENGRAM store establishes a logical and/or physical isolation boundary by which stored memory atoms and retrieval operations are constrained to a single patient identity, unless an explicit, policy authorized cross-partition operation is invoked. In various embodiments, patient partitioning is enforced using at least one of partition keys, access control rules, tenant boundaries, encryption domain separation, credential scoping, or network-level isolation.

Patient partitioning is described herein as an isolation mechanism rather than a disclosure authorization mechanism. The presence of a memory atom within a patient partition does not imply that the atom is admissible for any particular task, role, or purpose of use. Admission of any memory atom into a governed context bundle remains subject to evaluation by the memory gate under the applicable policy snapshot and integrity criteria at task time.

By enforcing patient partitioning at the storage level, the ENGRAM store reduces the risk of cross-patient leakage during retrieval and supports minimum-necessary disclosure in conversational and agentic workflows. However, patient partitioning alone does not permit retrieval results to be consumed by a governed execution component absent subsequent gating.

The ENGRAM store maintains memory atoms together with metadata, in machine-addressable form, sufficient to support retrieval, governance, audit, and replay. In various embodiments, storage structures include one or more of an atom table keyed by patient identifier and atom identifier, a provenance metadata store, a temporal metadata store supporting effective-time and expiration queries, policy tag indices, and representations of contradiction or conflict sets among atoms.

In some embodiments, the ENGRAM store supports append-only storage or version graphs that preserve prior versions of memory atoms rather than overwriting historical content. Such structures enable deterministic reconstruction of governed context bundles corresponding to prior task executions and support longitudinal analysis of patient context over time.

The ENGRAM store may be implemented using any suitable database technology, including relational databases, document stores, key-value stores, graph databases, or combinations thereof. The described storage structures are non-limiting examples and do not restrict the ENGRAM layer to any particular database product, schema, or vendor implementation.

Example memory atom record (non-limiting). In various embodiments, a memory atom is stored as a structured record comprising a fixed set of typed fields together with optional extension fields. In one non-limiting example, a memory atom record comprises: an atom_id identifying the memory atom within a patient partition; a patient_id identifying the patient partition; an atom_type identifying a class of contextual information; a source_id identifying an originating system or acquisition channel; a source_record_ref identifying an originating record or document; one or more timestamp fields including event_time and ingest_time; temporal validity fields including valid_from, valid_to, or a decay_rule; a payload or payload_ref referencing stored content; provenance and trust indicators including at least one of provenance_class, trust_tier, or attestation_reference; integrity fields including at least one of a checksum, hash, or verification status; governance metadata including policy_tags or sensitivity_labels; quality indicators including contradiction flags and/or completeness indicators; and versioning fields including at least one of a prior_atom_id, version identifier, or lineage reference. Multimodal atoms may further include a modality_type and modality-specific metadata.

Example governed context bundle manifest linkage (non-limiting). In some embodiments, storage structures further maintain references linking memory atoms to governed context bundles assembled for task execution. In one non-limiting example, a governed context bundle is associated with a bundle manifest comprising a bundle_id, an applicable_policy_snapshot_id (or policy_digest), a task_id, a patient_id, and an ordered list of atom_id values identifying an included set of memory atoms in deterministic order. The bundle manifest may further include references to transformation indicators, weighting parameters, compartment identifiers, ordering rule identifiers, serialization identifiers, tokenizer scheme identity, and capacity utilization metadata. These references permit deterministic reconstruction of bundle composition by reapplying recorded ordering and assembly rules to the identified atom records stored in the ENGRAM store.

In various embodiments, the ENGRAM store maintains these atom records and bundle linkage records as append-only or versioned artifacts, such that historical governance decisions and bundle compositions remain reconstructable for audit, replay, or external verification.

To support efficient candidate selection, the ENGRAM store may maintain one or more retrieval indices. In various embodiments, retrieval indices include deterministic addressing indices that allow retrieval of memory atoms by identifier, type, temporal window, or other structured attributes. In some embodiments, retrieval indices further include similarity-ranked indices based on semantic features or modality-derived features associated with memory atoms.

Hybrid retrieval configurations may combine deterministic inclusion rules, such as retrieval of mandatory atom classes, with similarity-ranked retrieval of additional candidates relevant to a task request.

In various embodiments, any derived view, index, embedding, summary, checklist binding association, ranking output, or other representation computed from patient scoped memory atoms is treated as a candidate artifact and does not authorize admission, disclosure, execution, or reliance. Any downstream use of derived representations that can influence context assembly, governed execution, or patient facing effectuation remains subject to the non-bypassable memory gate and, where applicable, reliance boundary enforcement and acceptance endpoint verification as described herein.

In certain optional embodiments, the ENGRAM store maintains a Checklist Binding Index that associates Checklist Atoms with supporting patient scoped ENGRAM memory atoms, contraindication atoms, temporal validity constraints, and one or more policy identifiers or policy tag references usable to select an applicable policy snapshot at task time. The Checklist Binding Index enables efficient identification of candidate associations for Checklist Atom evaluation based on current patient context and supplies such candidates for evaluation by the retrieval engine and the memory gate. The Checklist Binding Index does not authorize disclosure or admission of any Checklist Atom or supporting memory atom, and all associated elements remain subject to non-bypassable memory gate evaluation prior to inclusion in any governed context bundle. Regardless of retrieval technique, all retrieved memory atoms are treated as candidates for evaluation and are not authorized for admission or disclosure absent subsequent memory gate evaluation.

The ENGRAM store is intentionally agnostic to the specific embedding methods, similarity metrics, or vector database technologies used to support similarity-ranked retrieval. Under this design, retrieval implementation choices are decoupled from governance enforcement such that selection, ranking, or representation of the candidate set of memory atoms does not alter the operation of the memory gate, admissibility evaluation, or execution conditioning. Governance enforcement is applied uniformly to the candidate set of memory atoms produced by retrieval, regardless of the underlying representation or retrieval technology.

In some embodiments, a single patient partition stores memory atoms spanning multiple time horizons and multiple originating institutions, and the ENGRAM layer further maintains one or more task-scoped derived views for the same patient identity. A derived view is a governed, machine-generated subset, index, or organization of memory atoms associated with the same patient identity and is not a separate patient partition.

In one embodiment, a short-horizon recency ENGRAM view is generated for the patient identity to represent recent events within a defined recency window (e.g., the last 10 days), and a longitudinal baseline ENGRAM view is generated to represent longer-term history (e.g., multiple years) including baseline conditions, chronic diagnoses, and historical contraindications. In such embodiments, the recency ENGRAM view and the longitudinal baseline ENGRAM view may be stored as distinct indices, lists, or collections referencing memory atom identifiers within the same patient partition.

In some embodiments, the ENGRAM store further maintains institution-scoped derived ENGRAM views that group or index memory atoms according to originating institution identifiers recorded in provenance metadata. By way of non-limiting example, a patient identity may have memory atoms originating from a referral hospital, outpatient clinic, and tertiary care center, and the ENGRAM layer may maintain a derived view corresponding to each institution while preserving the patient partition as the governing isolation boundary.

Importantly, generation or maintenance of derived ENGRAM views does not authorize disclosure or use of memory atoms for computation. In response to a task request, candidate memory atoms may be selected from one or more derived ENGRAM views; however, admissibility and transformation of candidate memory atoms are determined exclusively by the non-bypassable memory gate operating under the applicable policy snapshot identifier (or policy digest) and one or more integrity criteria prior to inclusion in any governed context bundle.

In various embodiments, selection among derived ENGRAM views is performed deterministically based on task category, temporal scope, institution scope, or mandatory inclusion requirements, and is recorded as part of the governance record to support audit and deterministic replay.

In non-limiting embodiments, the ENGRAM store is implemented using one or more data structures including: (i) an atom table keyed by patient identifier and atom identifier; (ii) an append-only atom log or version graph preserving prior atom versions; (iii) a provenance and policy-tag index enabling retrieval and governance evaluation; (iv) a temporal index supporting effective-time, expiration, and decay queries; and (v) one or more retrieval indices supporting deterministic lookup and/or similarity-ranked candidate selection.

These data structures are described to illustrate enablement and do not limit the ENGRAM layer to any particular data organization, persistence mechanism, or indexing strategy. The essential characteristic of the ENGRAM store is that it maintains patient partitioned contextual memory in a form suitable for retrieval and governance, while deferring all admissibility and execution control to the memory gate and associated governance mechanisms described elsewhere in this disclosure.

Retrieval Engine Component

The retrieval engine is a computer-implemented component configured to select, from the patient partitioned ENGRAM store, a candidate set of memory atoms responsive to a task request. The retrieval engine operates as a candidate-selection mechanism and does not authorize disclosure, admission, governed context bundle assembly, or execution. All memory atoms selected by the retrieval engine are treated as candidates subject to evaluation by the memory gate prior to inclusion in a governed context bundle.

In various embodiments, retrieval results are not directly consumable by a governed execution component as patient scoped contextual content for inference, and are not injected into an execution context except through the non-bypassable memory gate and governed context bundle assembly pipeline.

In operation, the retrieval engine receives a task request associated with a target patient and selects memory atoms from the corresponding patient partition based on task-relevant criteria. The retrieval engine may employ deterministic addressing, rule-based selection, similarity-ranked selection, or hybrid combinations thereof to identify candidate atoms. Regardless of selection technique, retrieval results are provisional and do not bypass subsequent governance controls.

The task request may include, without limitation, a patient identifier, a request type, a role context and purpose-of-use context, and one or more task-specific constraints. In some embodiments, the retrieval engine further derives task context parameters from workflow state, user identity, location, care setting, session state, or other runtime conditions.

Task context parameters are used by the retrieval engine to determine which classes of memory atoms are potentially relevant to the task request, to prioritize time ranges, and to identify categories of information that may be required for safe task execution. The retrieval engine may identify candidate atom classes based on task type; however, identification of required or admissible content remains subject to evaluation by the memory gate under the applicable policy snapshot and integrity criteria.

The retrieval engine may operate in one or more retrieval modes. In deterministic retrieval modes, the retrieval engine selects memory atoms by explicit identifiers, atom types, temporal windows, or other structured attributes. In rule-based retrieval modes, the retrieval engine selects memory atoms meeting predefined eligibility conditions, such as recency thresholds or version status.

In similarity-ranked retrieval modes, the retrieval engine computes relevance scores using semantic features, modality-derived features, or other similarity representations associated with memory atoms and ranks candidate atoms accordingly. Similarity-ranked retrieval may produce ranked candidate atoms for evaluation by the memory gate and does not constitute admission, authorization, or disclosure of any patient scoped content.

Hybrid retrieval modes may combine deterministic inclusion of designated atom classes with similarity-ranked selection of additional candidates. In all retrieval modes, the retrieval engine produces a candidate set for evaluation rather than an authorized context for execution.

In some embodiments, the retrieval engine applies mandatory candidate class inclusion rules to select a candidate set of memory atoms belonging to designated atom classes for evaluation by the memory gate. Such classes may include, without limitation, allergies, active medications, known contraindications, or critical baseline constraints. Application of mandatory candidate class inclusion rules causes memory atoms within the designated classes to be included in the candidate set presented to the memory gate for admissibility evaluation, without guaranteeing admission of any particular atom into the governed context bundle.

For candidate atoms not designated as mandatory, the retrieval engine may apply ranking criteria to prioritize candidates for evaluation. Ranking criteria may include relevance scores, provenance sufficiency class, recency, contradiction indicators, or quality scores. Ranked candidates may be presented to the memory gate in an order reflecting such priorities, but the memory gate retains authority to deny, transform, or attenuate any candidate atom regardless of rank.

In various embodiments, the admitted set of memory atoms is determined by the memory gate, and the included set of memory atoms is determined by the governed context bundle assembler subject to the context capacity constraint and deterministic assembly rules.

In some embodiments, candidate atoms belonging to mandatory candidate classes are identified and selected prior to similarity-ranked candidates during retrieval, and are processed by the memory gate before optional candidates are evaluated for admission. Under this ordering, the governed context bundle assembler allocates capacity to the included set of memory atoms belonging to mandatory classes before allocating remaining capacity to optional admitted atoms. Capacity allocation performed in this manner is subject to the same policy snapshot and integrity criteria enforced by the memory gate, and does not cause admission of any memory atom that fails admissibility evaluation.

In some embodiments, the ENGRAM layer generates a task-scoped derived view from the longitudinal patient partitioned ENGRAM memory. A task-scoped derived view comprises a subset or transformation of memory atoms selected for alignment with a specific task request and may include derived summary atoms, task-specific constraints, or contradiction sets.

A task-scoped derived view is generated prior to memory gate evaluation and is processed as an input to the memory gate rather than as an authorized execution artifact. In various embodiments, the task-scoped derived view is treated as a candidate artifact and does not authorize admission, disclosure, execution, or reliance absent non-bypassable memory gate evaluation. A task-scoped derived view is not a governed context bundle and is not sufficient, by itself, to satisfy execution conditioning requirements. Derived views retain references to underlying memory atom identifiers and associated provenance metadata, and are evaluated by the memory gate under the applicable policy snapshot and integrity criteria in the same manner as longitudinal ENGRAM content. Generation of a task-scoped derived view does not itself produce a governed context bundle, does not authorize disclosure of patient scoped information, and does not permit execution of a governed execution component unless and until the derived content is admitted through the non-bypassable memory gate and assembled into a governed context bundle.

By structuring retrieval as a candidate-selection process distinct from admission and execution, the ENGRAM layer decouples relevance ranking and similarity scoring from policy enforcement, integrity evaluation, and execution control. Under this structure, retrieval operations identify memory atoms eligible for consideration, while admissibility, transformation, and authorization for use are determined exclusively by the memory gate prior to execution.

In one embodiment, the system instantiates or maintains a patient scoped agent logically bound to a patient partition and the corresponding ENGRAM memory. The patient scoped agent is optional in certain embodiments and is not required to practice the ENGRAM memory gating, governed context bundle assembly, or audit mechanisms described herein. Task requests associated with a given patient identity are routed to the patient scoped agent, and the patient scoped agent invokes retrieval and non-bypassable memory gate operations to obtain a governed context bundle prior to any reasoning-model or agent execution.

In such embodiments, the patient scoped agent is constrained to invoke the reasoning model only through the constrained execution interface requiring gate produced governance artifacts.

In one embodiment, the ENGRAM memory comprises a longitudinal patient ENGRAM that accumulates governed memory atoms over time, while the retrieval engine derives one or more task-scoped derived views responsive to a particular question, workflow step, or tool invocation. Accordingly, multiple task-scoped derived views may be generated for the same patient depending on the task request, while preserving the longitudinal ENGRAM as a durable, provenance-labeled substrate.

This two-layer structure enables stable patient context, precise purpose-limited task context, and deterministic governance under finite context capacity constraints, without requiring disclosure of the full longitudinal patient record to any single governed execution component.

Memory Gate Component

Figure 6:
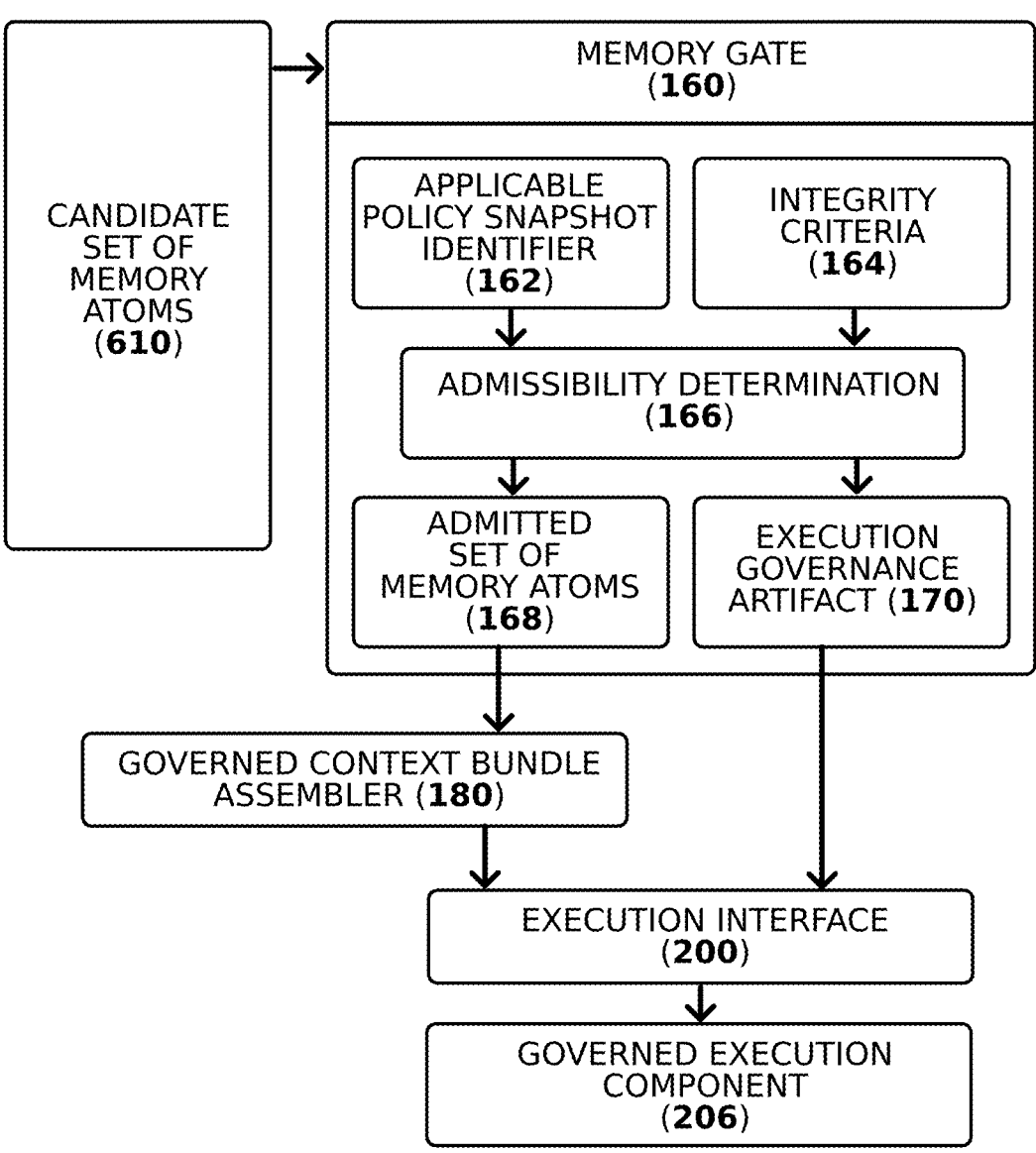
FIG. 6 illustrates a non-bypassable, fail-closed memory gate evaluating a candidate set of memory atoms under an applicable policy snapshot and one or more integrity criteria and conditioning execution of a governed execution component on gate produced governance artifacts.
Figure 7:
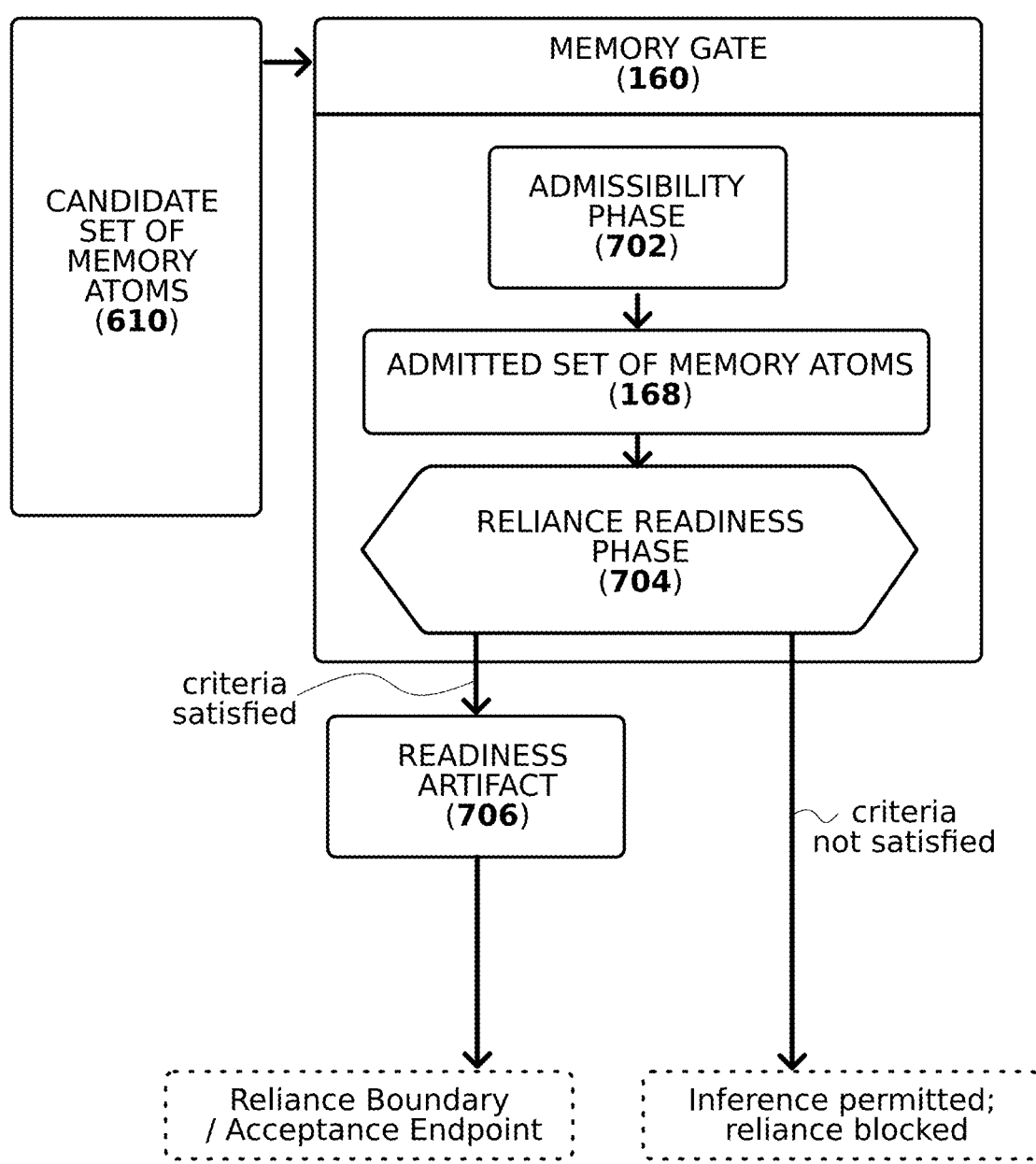
FIG. 7 illustrates an example two-phase memory gate evaluation comprising an admissibility determination phase and a reliance readiness determination phase.

FIGS. 6-7 illustrate non-limiting embodiments of the memory gate positioned between candidate retrieval and execution and configured to enforce machine-level access control, fail-closed admissibility evaluation, and non-bypassable enforcement through a constrained execution interface requiring gate produced governance artifacts.

As defined in Definitions Section, the memory gate operates as a non-bypassable, fail-closed control that determines admissibility of patient scoped contextual information and, in some embodiments, determines reliance readiness prior to acceptance of downstream reliance events or other downstream state-changing actions.

The memory gate is a computer-implemented enforcement mechanism positioned between candidate retrieval and model or agent execution and configured to control whether, how, and in what form patient scoped contextual information may be used for a task. The memory gate operates prior to inference and is non-bypassable in that execution of a reasoning model, agent, or tool-using orchestration component is conditioned on completion of gate evaluation and generation of gate produced governance artifacts, including one or more governance identifiers. The memory gate thereby converts contextual memory from an advisory input into an enforced precondition of computation.

In various embodiments, governance evaluation performed by the memory gate is implemented as a preinference evaluation pipeline comprising schema validation, provenance verification, integrity predicate evaluation, and policy snapshot constraint evaluation. The memory gate produces one or more machine-verifiable governance arti-facts that are verified by a constrained execution interface as a condition of permitting execution and, in some embodiments, as a condition of accepting downstream reliance events.

In operation, the memory gate receives a candidate set of memory atoms selected by the retrieval engine and evaluates each candidate atom under an applicable policy snapshot and one or more integrity criteria. The memory gate determines, for each candidate atom, an admissibility state and, in some embodiments, an associated weighting parameter or transformation. The memory gate thereby determines the admitted set of memory atoms, and the governed context bundle assembler determines the included set of memory atoms from the admitted set under the context capacity constraint and deterministic assembly rules. Candidate memory atoms that are denied by the memory gate are excluded from the admitted set and are therefore ineligible for inclusion in the governed context bundle.

The memory gate enforces fail-closed behavior such that each candidate memory atom for which admissibility cannot be established is denied or transformed to a non-data-bearing representation, and execution is denied or limited to policy-permitted operations accordingly. Under this operation, patient scoped information is provided to a reasoning system only after the memory gate has evaluated the candidate atoms against the applicable policy snapshot, provenance requirements, and integrity criteria under the governed execution pathway.

In some embodiments, the memory gate performs a two-phase evaluation comprising an admissibility phase and a reliance readiness phase. The admissibility phase determines whether a candidate memory atom, or a transformed representation thereof, may be used to generate output by a governed execution component. The reliance readiness phase independently determines whether output generated using the governed context bundle is eligible to be relied upon for effectuation or downstream state-changing actions. Failure of a reliance readiness predicate does not require suppression of inference output, but results in restriction or denial of reliance events unless additional conditions are satisfied. As used herein, a reliance readiness predicate is distinct from per-atom admissibility and is evaluated against the governed context bundle, task request, and applicable policy snapshot.

In various embodiments, reliance readiness predicates are evaluated using stricter or additional criteria than admissibility predicates, including higher provenance sufficiency thresholds, contradiction resolution requirements, mandatory atom class satisfaction, or task-specific safety conditions. The outcome of reliance readiness evaluation is bound to one or more readiness artifacts that condition acceptance of reliance events at acceptance endpoints.

In some embodiments, the memory gate evaluates taint flags, poisoning indicators, or adversarial manipulation indicators associated with the candidate set of memory atoms as part of integrity criteria. When such indicators are present, the memory gate may deny admission, increase abstraction, attenuate weighting, require corroborating evidence, or place the task into an insufficient-context state. Handling of tainted or poisoned memory atoms is deterministic and recorded as an integrity exception event to prevent silent propagation of compromised context.

In some embodiments, the memory gate enforces dynamic consent conditions reflected in the policy snapshot. When a policy authorized escalation occurs, the policy snapshot may enter a break-glass state permitting expanded evaluation or disclosure for a limited scope and duration. Entry into and exit from a break-glass state requires heightened authentication and justification capture and is recorded as part of the governance record. Break-glass operation does not bypass memory gate evaluation and does not relax audit or replay requirements.

In various embodiments, the memory gate associates obligation tags with admitted memory atoms and, in some embodiments, with a governed context bundle assembled from the admitted memory atoms, as part of admissibility determination. Obligation tags specify post-admission handling requirements and are propagated with the governed context bundle to orchestration components, governed connectors, and acceptance endpoints. Violation of an obligation tag results in machine-enforced denial or restriction of execution or reliance rather than silent noncompliance.

In some embodiments, the memory gate generates a steering profile as a steering-only representation admitted in lieu of data-bearing memory atoms. In one non-limiting example, a steering profile comprises one or more constraint indicators, risk flags, baseline parameters, or modality-specific features derived from underlying memory atoms without exposing the underlying data values. The steering profile may include, without limitation, normalized constraint identifiers, abstracted ranges, Boolean risk indicators, or encoded modality features. Steering profiles are bound to source memory atom identifiers and provenance metadata and are subject to the same applicable policy snapshot identifier or policy digest and integrity criteria as data-bearing atoms. Steering profiles are provided to reasoning models or agents in non-assertive constraint form and are not represented as patient-factual statements. In such embodiments, steering profiles are treated as control inputs rather than evidentiary inputs for reliance.

The memory gate evaluates the candidate set of memory atoms using machine-readable inputs that include a policy snapshot as referenced by an applicable policy snapshot identifier or policy digest and one or more integrity criteria. Gate inputs may include, without limitation, role and purpose-of-use constraints, consent constraints, organizational or jurisdictional rules, source trust classifications, attestation or signature status, freshness or temporal validity requirements, contradiction indicators, and minimum evidence requirements associated with the task request. Integrity criteria evaluated by the memory gate are selected from defined integrity criterion categories and are applied deterministically to the candidate set of memory atoms based on recorded metadata and task context. The policy snapshot is treated as immutable for the duration of the task request, such that changes to policy inputs result in generation of a new applicable policy snapshot identifier rather than modification of an existing snapshot.

In various embodiments, Checklist Atoms are retrieved as part of a candidate set of memory atoms and are evaluated by the memory gate under an applicable policy snapshot identifier (or policy digest) and one or more integrity criteria to determine an admissibility state for each Checklist Atom. Admissibility states include, without limitation, admit, deny, redact, abstract, or attenuate. In such embodiments, Checklist Atoms admitted in transformed form are included only in the transformed form produced by the memory gate.

In various embodiments, the memory gate receives an applicable policy snapshot identifier or policy digest bound to the task request and applies the corresponding policy constraints uniformly to each candidate memory atom during evaluation. Integrity criteria are evaluated on a per-atom basis using metadata recorded at ingestion time, including provenance metadata, acquisition pathway indicators, temporal validity metadata, and quality indicators. Gate evaluation is performed by applying the same policy snapshot and integrity criteria to the same candidate atom metadata using a defined evaluation rule set, such that re-evaluation of the same candidate memory atom identifiers, metadata, applicable policy snapshot identifier, and evaluation rule identifiers yields the same admissibility outcomes.

For each candidate memory atom, the memory gate produces an admissibility determination specifying how the atom is handled for context assembly. Admissibility determinations may include, without limitation, admitting the atom in data-bearing form, denying the atom, admitting the atom in redacted form, admitting the atom in abstracted form, or admitting the atom with attenuated influence via a weighting parameter.

In certain embodiments, the candidate set of memory atoms includes one or more Checklist Atoms. For each Checklist Atom, governance metadata includes applicability logic and contraindication logic that is evaluated against patient scoped ENGRAM memory elements. Applicability logic determines whether a Checklist Atom is relevant to a given task request and patient interaction context, while contraindication logic suppresses instantiation or inclusion when use would be redundant, clinically inappropriate, or unsafe given the patient's known medical history, detected contradictions, temporal validity constraints, or policy constraints reflected in the applicable policy snapshot.

In various embodiments, admissibility evaluation performed by the memory gate comprises a deterministic, computer-executed evaluation sequence applied to each candidate memory atom prior to execution. The memory gate verifies provenance and integrity attributes associated with the candidate memory atom, maps the candidate memory atom to a defined atom schema, and applies the applicable policy snapshot to determine whether the candidate memory atom may be admitted in data-bearing form or only in a transformed form. The memory gate further evaluates consistency conditions, including contradiction or conflict indicators relative to other candidate memory atoms or the admitted set of memory atoms, and selects an admissibility action comprising at least one of admission, denial, redaction, abstraction, or attenuation. The selected admissibility action and any associated transformation parameters are recorded in machine-readable form as part of the governance record.

Redaction refers to removal or masking of restricted fields while preserving permitted attributes. Abstraction refers to replacement of data-bearing content with a higher-level constraint representation or steering representation that preserves functional influence while reducing disclosure. Attenuation refers to admission with reduced influence on context assembly or downstream reasoning, such as by assigning a lower weight or priority.

In certain embodiments, the memory gate performs patient-specific parameter binding for Checklist Atoms by substituting one or more parameters within a Checklist Atom using values derived from patient scoped ENGRAM memory elements that are admissible under the applicable policy snapshot identifier (or policy digest). Parameter binding may include substitution of medication identifiers, dosages, procedure identifiers, dates, temporal references, or other governed fields, thereby producing patient-specific checklist questions or instruction steps rather than generic prompts. In various embodiments, the parameter binding outcome is recorded as a transformation applied to the Checklist Atom, including identifiers of supporting memory atoms used for binding, such that the resulting checklist step is replayable and auditable as part of the governed context bundle. Such parameter binding constitutes a governed transformation step and does not constitute autonomous decision-making, medical diagnosis, or an ungoverned execution pathway.

The memory gate may further evaluate contradiction conditions among the candidate set of memory atoms and, based on detected contradictions, may deny admission, apply attenuation, or substitute abstracted representations. All transformations performed by the memory gate, including contradiction-responsive actions, are recorded as part of the governance record together with references to the affected atom identifiers and applied transformation types. During audit or replay, the recorded transformation metadata is reapplied to reconstruct the form in which each admitted atom was provided to the governed context bundle.

In optional embodiments, the ENGRAM store maintains one or more contradiction set objects that represent detected inconsistency among two or more memory atoms associated with a patient identity. A contradiction set object may reference a set of atom identifiers, a contradiction type, a detection basis, and contradiction metadata sufficient to support governed evaluation, including without limitation timestamps, provenance classes, and confidence or quality indicators associated with the conflicting atoms. Contradiction set objects may be generated by the ENGRAM builder during ingestion and de-duplication, and/or by integrity evaluation logic associated with the memory gate.

In such embodiments, the memory gate evaluates the candidate set of memory atoms not only individually but also with respect to membership in one or more contradiction sets. In certain optional embodiments, the memory gate evaluates contradiction indicators and conflict markers among patient scoped ENGRAM memory atoms when determining admissibility, inclusion, and reliance state assignment for Checklist Atoms. When conflicts are detected among supporting memory atoms for a Checklist Atom, the memory gate suppresses inclusion of the affected Checklist Atom, emits an abstracted verification step requiring confirmation, and/or assigns a reliance state requiring verification prior to downstream reliance. In various embodiments, the memory gate further emits one or more control signals indicating escalation, follow-up evidence requests, or blocking of downstream effectuation until the conflict is resolved under the applicable policy snapshot identifier (or policy digest). All such checklist-related outcomes are recorded as governance metadata for audit and deterministic replay. The memory gate may apply contradiction resolution rules under the applicable policy snapshot identifier to determine admissibility and transformation outcomes, including without limitation: (i) selecting a preferred atom version based on provenance sufficiency thresholds, recency, attestation status, or source trust classification; (ii) admitting an abstracted representation indicating the presence of a constraint without disclosing contradictory underlying details; (iii) denying all atoms within a contradiction set until additional evidence is obtained; and/or (iv) admitting multiple conflicting atoms while attaching contradiction indicators or reduced reliance weight to the admitted representations.

In optional embodiments, contradiction evaluation produces an arbitration outcome recorded as part of the governance record. The arbitration outcome may identify the contradiction set identifier, resolution rule identifiers applied, atom identifiers selected or denied, and any transformation or attenuation parameters issued as a result of contradiction handling. The arbitration outcome is crypto-graphically bound to the bundle identifier and applicable policy snapshot identifier such that deterministic replay reconstructs the same admissibility decisions and governed context bundle composition for the task request.

In optional embodiments, memory atoms are assigned a stale or inconsistent status state when contradiction evaluation indicates that the atom is superseded, inconsistent with higher-integrity evidence, or outside a validity window required for the task request. Such status transitions may include, without limitation, ACTIVE, STALE, INCONSISTENT, SUPERSEDED, or QUARANTINED states. Status state and transitions are recorded as governance metadata and are evaluated by the memory gate as part of integrity criteria. In certain embodiments, atoms in an INCONSISTENT or QUARANTINED state are denied by default under a fail-closed policy unless explicitly admitted under a policy authorized exception rule.

The memory gate enforces fail-closed behavior by default. When admissibility of a candidate atom cannot be established under the applicable policy snapshot and integrity criteria, the atom is denied or transformed to a non-data-bearing representation. The memory gate does not substitute best-effort disclosure or silent omission in place of denied content.

In some embodiments, the memory gate detects that one or more required classes of information cannot be admitted, or that provenance sufficiency cannot be established for clinically material constraints. In such cases, the memory gate may generate an insufficient-context state indicating that the system lacks admissible information required for safe execution or safe reliance on output. When an insufficient-context state is present, the system may restrict output delivery, restrict reliance events, or trigger governed evidence requests rather than proceeding with execution under incomplete or unverifiable context.

In various embodiments, fail-closed behavior includes generation of a governed denial response when execution or reliance is denied. The governed denial response comprises machine-readable indicators identifying one or more causes of denial and is recorded as part of the governance record. The governed denial response enables downstream systems, users, or auditors to distinguish intentional governance-based denial from system error or unavailability, without disclosing restricted patient data.

The memory gate is non-bypassable in that execution of a reasoning model, agent, or tool-using orchestration component is conditioned on completion of memory gate evaluation and invocation through a constrained execution interface, the constrained execution interface being configured to accept invocation requests only when accompanied by gate produced governance artifacts. In various embodiments, execution is permitted only upon presentation of a gating token, bundle identifier, applicable policy snapshot identifier, or other governance artifact produced exclusively by the memory gate.

In various embodiments, non-bypassable enforcement is achieved by constraining access to the governed execution component such that invocation is permitted only through a designated execution interface. By way of non-limiting example, the governed execution component may be deployed behind a single invocation gateway, proxy, or sidecar component that enforces network segmentation, credential scoping, and request validation. In such embodiments, the governed execution component is not directly addressable by users, applications, or downstream components, and is accessible only via the constrained execution interface that verifies presentation of gate produced governance artifacts prior to permitting execution.

Non-bypassable enforcement may be implemented at one or more architectural boundaries. By way of non-limiting example, a model access gateway or orchestration layer may reject execution requests lacking a valid gating token, bundle identifier, or applicable policy snapshot identifier. In other embodiments, credential scoping and access control mechanisms restrict issuance of execution credentials such that the governed execution component cannot be invoked outside the governed execution pathway. In still other embodiments, governed connectors mediating access to external data sources prevent ungoverned retrieval or context expansion during execution unless corresponding governance artifacts are presented and verified.

In further embodiments, non-bypassable enforcement is implemented using machine-verifiable tokens or governance artifacts generated by the memory gate and required by the constrained execution interface and one or more governed connectors. Invocation requests lacking a valid gating token, bundle identifier, or applicable policy snapshot identifier are rejected prior to execution. Similarly, acceptance endpoints for effectuation or reliance events require presentation of a readiness artifact bound to the governed context bundle and applicable policy snapshot identifier, and deny or defer reliance events when verification fails. In this manner, both execution of the governed execution component and downstream effectuation are conditioned on successful traversal of the governed execution and acceptance pathways.

Non-bypassable enforcement may be realized at multiple enforcement locations within the system architecture. In non-limiting embodiments, enforcement is implemented at a model access gateway or orchestration layer that restricts invocation of a reasoning model to requests accompanied by gate produced governance artifacts; at a governed connector boundary that mediates access to tools, external data sources, or acceptance endpoints; and at an acceptance endpoint boundary that verifies readiness artifacts prior to permitting state-changing actions. These enforcement locations may operate independently or in combination, and collectively ensure that neither execution nor reliance can occur without traversal of the governed execution pathway described herein.

In all such embodiments, bypass is prevented not by discretionary policy checks but by technical constraints on network access, credential issuance, invocation routing, and token verification that render ungoverned invocation paths inoperable. Direct access to patient scoped contextual information, direct invocation of a reasoning model, or reliance on model output is prevented unless the memory gate has admitted and assembled a governed context bundle under the applicable policy snapshot identifier and integrity criteria.

The memory gate thus enforces a trap-before-run execution model in which context governance is a precondition of computation rather than a post-hoc audit. In all such embodiments, admissibility determinations, reliance readiness outcomes, and execution-conditioning decisions produced by the memory gate are not overridable by end users, reasoning models, or downstream components outside policy authorized exception flows recorded in the governance record.

In all embodiments, governance evaluation and context assembly are completed before invocation of the governed execution component, and outputs generated without a gate produced governance artifact are treated as ungoverned and ineligible for reliance or acceptance.

In non-limiting embodiments, FIGS. 6-7 further illustrate deterministic gate evaluation as an input-conditioned decision function whose recorded inputs support replay equivalence of admissibility and reliance readiness outcomes.

In various embodiments, evaluation performed by the memory gate is deterministic with respect to its inputs. For a given candidate set of memory atoms, policy snapshot, integrity criteria, and evaluation rule set, the memory gate produces the same admissibility determinations, transformations, weighting parameters, and reliance readiness outcomes. Under this deterministic operation, governance decisions are reproducible across executions, and identical task conditions result in identical governed context admission outcomes when evaluated using the same recorded inputs.

The memory gate operates as a defined decision function that conditions execution and reliance based on machine-evaluable inputs rather than discretionary or probabilistic judgment. Where upstream processes produce non-deterministic signals, such signals are normalized, discretized, or resolved prior to gate evaluation such that the gate itself remains deterministic in operation. In this manner, the memory gate enforces stable governance boundaries even when upstream data sources or reasoning components exhibit variability.

Deterministic gate evaluation supports audit-grade replay, as defined herein, by enabling reconstruction of admissibility and reliance readiness decisions using recorded governance inputs.

By enforcing deterministic gate behavior and replay equivalence, the ENGRAM layer constrains contextual admission to outcomes produced by evaluation of recorded inputs, such that variation in governed context admission across executions is attributable only to changes in candidate set of memory atoms, applicable policy snapshot identifiers, or integrity criteria. Governance records produced under deterministic gate evaluation provide a verifiable basis for compliance review, incident investigation, and external verification. Deterministic gate evaluation further causes execution conditioning and reliance control to be applied as predictable, machine-executed decision logic rather than as discretionary, advisory, or heuristic guidance.

Physiological Signal Memory Atoms

In various embodiments, the ENGRAM layer is configured to store, govern, and preserve high-frequency and high-sensitivity physiological signal data as contextual memory atoms. Such physiological signal engrams may include, without limitation, photoplethysmography (PPG or plethysmography), electrocardiography (ECG), electroencephalography (EEG), electromyography (EMG), respiration waveforms, impedance measurements, acoustic biosignals, or other waveform-based or time-series physiological measurements generated by patient-associated sensors or monitoring devices.

Unlike low-frequency summaries, scalar measurements, or pre-aggregated vital signs, such physiological signal engrams may comprise raw or near-raw waveform segments captured at high temporal resolution. In some embodiments, memory atoms representing physiological signals include continuous or segmented waveform data, while in other embodiments such memory atoms include references, hashes, or immutable pointers to externally stored raw signal archives maintained under patient partitioning and governance control.

In various embodiments, physiological signal memory atoms are associated with high-resolution temporal metadata. Such metadata may include sub-second timestamps, sub-millisecond timestamps, or finer-grained temporal markers sufficient to enable precise alignment, synchronization, or phase comparison across multiple sensors, anatomical locations, or acquisition modalities. In certain embodiments, the ENGRAM layer supports deterministic temporal alignment of multiple physiological signal memory atoms captured concurrently or near-concurrently from different points on the body, enabling downstream analysis of propagation timing, waveform morphology relationships, or cross-signal correlations without requiring disclosure of raw signal values outside governed pathways.

In some embodiments, physiological signal engrams are governed using signal-fidelity provenance metadata as part of the integrity criteria evaluated by the memory gate. Such provenance metadata may include, without limitation, sampling characteristics, bit depth, capture duration, sensor modality, preprocessing or filtering status, compression or smoothing indicators, motion or contact quality indicators, calibration state, and acquisition pathway identifiers. Integrity evaluation may consider whether a signal has been altered, downsampled, smoothed, scored, or otherwise transformed prior to admission, and may condition admissibility, transformation, or weighting based on preservation of signal fidelity required for a given task or reliance class.

In various embodiments, the ENGRAM layer preserves original raw physiological signal data, or cryptographically verifiable references thereto, even when derived features, summaries, or normalized representations are generated for immediate use. Such preservation enables future governed reprocessing of physiological signals using updated algorithms, models, or analytical techniques without requiring re-acquisition of patient data or irreversible loss of signal information. Derived representations admitted into governed context bundles may therefore coexist with retained raw signal references, enabling deterministic replay, audit, and reconstitution of contextual inputs under future policy snapshots or analytical regimes.

In certain embodiments, physiological signal engrams are disclosed or made discoverable without disclosing underlying patient data by publishing the existence, availability, or characteristics of such engrams as governed metadata. Such disclosure may include, without limitation, signal type identifiers, temporal coverage windows, resolution classes, anatomical source descriptors, and integrity or fidelity indicators, without revealing waveform content itself. This enables downstream systems or future governed execution components to request access to such engrams under applicable policy snapshots while preserving patient privacy and institutional control.

In some embodiments, physiological signal engrams are retained even when no currently deployed governed execution component is capable of interpreting the full informational content of such signals, thereby preserving latent informational value for future analytical techniques.

Accordingly, embodiments described herein support storage, governance, preservation, and future reuse of high-frequency physiological signal engrams as first-class contextual memory artifacts, enabling longitudinal analysis, multi-sensor synchronization, and algorithmic advancement while enforcing policy-bound admissibility, integrity evaluation, and non-bypassable execution and reliance conditioning.

Governed Context Bundle Assembly Component

Figure 8:
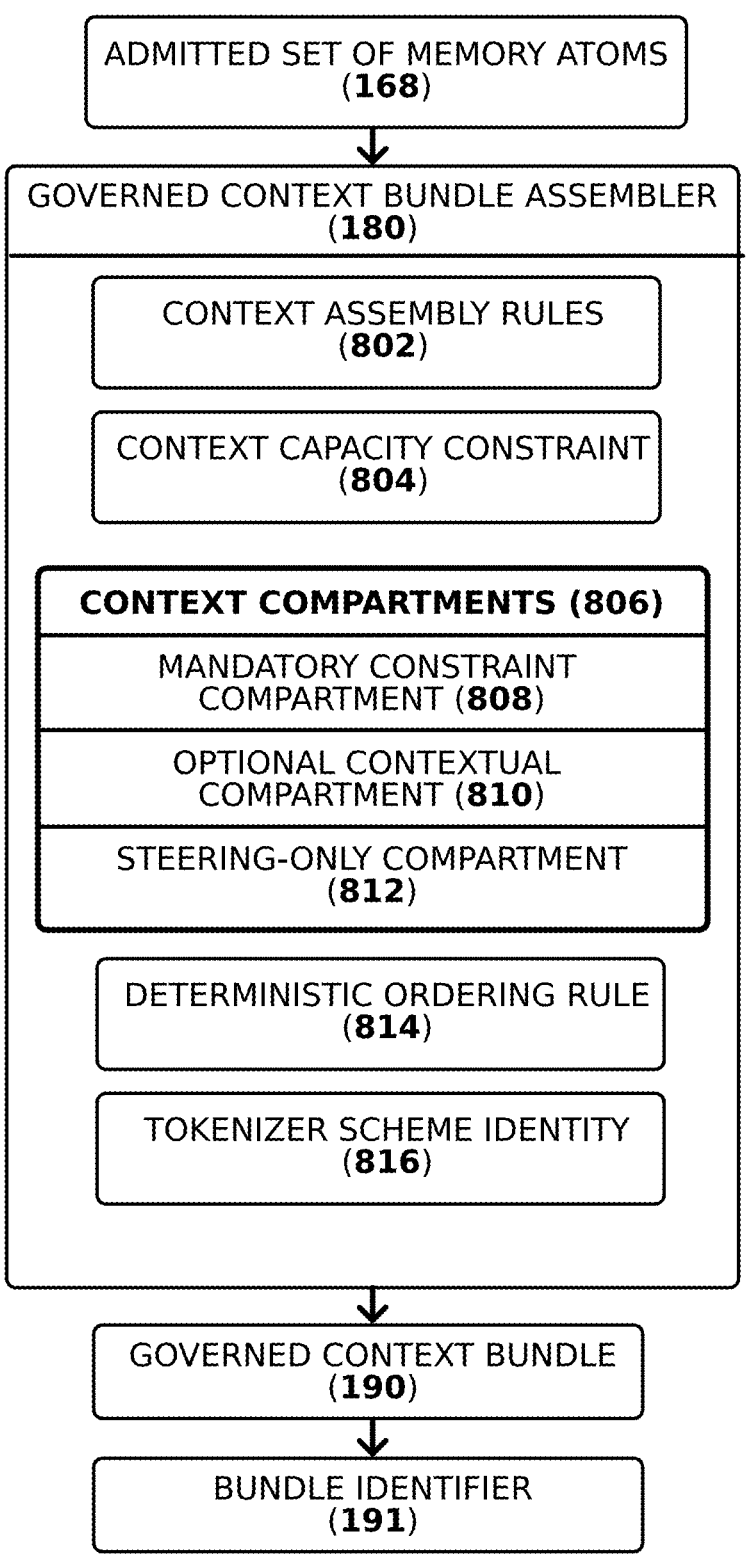
FIG. 8 illustrates assembly of a governed context bundle including deterministic ordering, context capacity constraints, and context compartments.

FIG. 8 illustrates deterministic assembly of a governed context bundle following memory gate evaluation, including deterministic ordering, compartment placement, and binding of gate produced governance artifacts and identifiers to the resulting governed context bundle.

Following evaluation by the memory gate, the ENGRAM layer assembles a governed context bundle using only an included set of memory atoms selected from an admitted set of memory atoms determined by the memory gate. The governed context bundle is a task-scoped, machine-readable artifact constructed prior to inference and provided to a governed execution component as the sole, non-bypassable source of patient scoped contextual input for the task. Assembly of the governed context bundle is performed deterministically under a context capacity constraint and an assembly rule set such that the resulting bundle can be reconstructed for audit and replay.

In such embodiments, non-bypassable enforcement is implemented by restricting execution pathways such that a governed execution component is technically unable to access patient scoped contextual information except through a constrained execution interface that requires presentation and verification of a gate produced governance artifact bound to the bundle identifier and applicable policy snapshot identifier (or policy digest).

In operation, the context bundle assembler receives the admitted set of memory atoms together with associated admissibility states, weighting parameters, transformation indicators, and gate produced governance artifacts and identifiers produced by the memory gate. Memory atoms denied by the memory gate are excluded from the governed context bundle and are not accessible to the reasoning system. Memory atoms admitted in transformed form, including redacted, abstracted, or attenuated representations, are included in the governed context bundle only in the transformed form produced by the memory gate.

In certain embodiments, the included set of memory atoms assembled into the governed context bundle further includes one or more admitted Checklist Atoms, wherein admitted Checklist Atoms are eligible for deterministic assembly subject to the context capacity constraint and recorded ordering rules.

The governed context bundle is treated as a discrete artifact distinct from the underlying ENGRAM memory and from the candidate atom set. Once assembled, the governed context bundle is immutable for the duration of the task execution and includes the applicable policy snapshot identifier (or policy digest) as recorded governance metadata. In this manner, the governed context bundle represents the authoritative statement of what contextual information the reasoning system was permitted to consume for the task.

Assembly of the governed context bundle is subject to a context capacity constraint that limits the size of the bundle provided to the governed execution component. In various embodiments, the context capacity constraint includes at least one of a token budget computed under an identified tokenizer, a byte-size limit, a structured field limit, or a combination thereof.

The context bundle assembler computes capacity utilization based on the admitted set of memory atoms using the recorded canonical serialization format and enforces the context capacity constraint using a deterministic capacity computation method. In some embodiments, capacity allocation is performed by assigning predefined portions of the context capacity constraint to designated mandatory atom classes and assembling those classes prior to optional admitted atoms. When remaining capacity is insufficient to include all admitted atoms, the context bundle assembler applies a deterministic selection and ordering rule based on recorded weighting parameters, atom class identifiers, and governance rules to determine which admitted atoms are included in the governed context bundle. In such embodiments, the context bundle assembler deterministically selects an included set of memory atoms from the admitted set of memory atoms for placement into the governed context bundle, and excluded admitted atoms are recorded as not included due to the context capacity constraint.

Importantly, capacity enforcement does not override admissibility determinations made by the memory gate. If required atom classes cannot be admitted due to policy or integrity constraints, or if required content cannot be included within the context capacity constraint, the system records an omission event or insufficient-context state rather than silently truncating content or proceeding with incomplete context.

The governed context bundle is assembled using a deterministic ordering rule based on memory atom identifiers and recorded ordering metadata such that, for a given admitted set of memory atoms evaluated under an applicable policy snapshot identifier and an assembly rule set, identical inputs yield identical governed context bundle composition and ordering. Deterministic ordering may be based on atom class, priority rank, temporal relevance, weighting parameters, or other governance-defined criteria, provided that the ordering rule is identifier-based and reproducible.

In certain embodiments, the bundle identifier comprises, or is derived from, a cryptographic digest computed over a canonical serialization of the included set of memory atoms and associated transformation indicators, together with, and cryptographically bound to, the applicable policy snapshot identifier (or policy digest) under which admissibility was evaluated. In such embodiments, the digest-based bundle identifier provides a deterministic, machine-verifiable representation of "what the model saw" for the task request, and is usable to verify that execution and downstream reliance were conditioned on the same governed context bundle and policy constraints without reliance on non-deterministic prompt text.

In certain embodiments, the system assembles a contextualized checklist by selecting and ordering eligible Checklist Atoms according to applicability logic, contraindication logic, reliance states, policy-defined dependencies, and patient-specific context derived from patient scoped ENGRAM memory under the applicable policy snapshot identifier (or policy digest). In various embodiments, the checklist assembly is computed deterministically using recorded assembly rules and deterministic ordering criteria, such that identical inputs yield identical checklist content and ordering. The resulting checklist assembly may be versioned and annotated with provenance indicators, temporal validity indicators, and reliance metadata, and may be incorporated into a governed context bundle as an ordered checklist representation. This checklist assembly remains a governed context artifact and does not convert ENGRAM into a conversational agent or autonomous decision engine.

Each memory atom in the included set is annotated with metadata sufficient to support audit and replay. Such metadata may include references to atom identifiers, provenance indicators, temporal validity indicators, transformation indicators (such as redaction or abstraction), weighting parameters, and governance identifiers. The governed context bundle further includes, or references, the bundle identifier and the applicable policy snapshot identifier or policy digest.

By assembling the governed context bundle using deterministic ordering rules and annotating the bundle with governance metadata, the ENGRAM layer records the identifiers, ordering, and policy conditions sufficient to enable reconstruction and verification of the exact contextual input presented to a governed execution component after execution. Under this deterministic assembly process, variation in model inputs across executions is attributable only to differences in recorded inputs or governance parameters, thereby supporting audit-grade reconstruction of context-dependent outputs.

In various embodiments, the governed context bundle is assembled using one or more context compartments that segregate admitted content according to governance function. Context compartment assignments may be produced by the memory gate as part of admissibility and transformation evaluation and are enforced during context bundle assembly, model or agent execution, and replay.

Context compartments may include, without limitation, mandatory constraint compartments containing atom classes required for safe task execution, optional contextual compartments containing supplementary admitted atoms, steering-only compartments containing abstracted or obfuscated steering representations, and withheld or escrow-referenced compartments identifying content that is not disclosed but may be subject to policy authorized reveal. Compartment membership is recorded as part of the governance record and is preserved in the governed context bundle metadata.

The context bundle assembler applies compartment-specific assembly and representation rules that govern how memory atoms in the included set are placed into and interpreted within the governed context bundle. Content assigned to one context compartment is assembled and annotated using representation rules distinct from those applied to other compartments and is not promoted or interpreted as content belonging to another compartment during execution. Steering-only compartments are assembled using abstracted or non-factual representations not consumable by a governed execution component as asserted patient facts, and withheld compartments are assembled without inclusion of underlying data-bearing content. Mandatory constraint compartments are assembled prior to optional compartments by allocating capacity to mandatory atom classes before optional content is considered, and inclusion of optional content is conditioned on remaining available capacity under the context capacity constraint.

By enforcing compartmentalization within the governed context bundle, the ENGRAM layer prevents category confusion, disclosure escalation, and unintended semantic promotion of abstracted or steering content, while preserving deterministic assembly and replay.

In various embodiments, the governed context bundle is assembled using a canonical serialization format that defines deterministic encoding, ordering, and representation of memory atoms in the included set and associated governance metadata. Under the canonical serialization format, the encoding and ordering rules applied to the included set of memory atoms and governance metadata are fixed and recorded such that, for a given admitted set of memory atoms evaluated under an applicable policy snapshot identifier and an assembly rule set, the serialized governed context bundle is reproducible across executions.

Context capacity constraints are enforced using the canonical serialization and a deterministic capacity computation method, including a token budget computed under an identified tokenizer scheme identity. The tokenizer scheme identity, serialization version, and capacity computation parameters are recorded as part of the governance record or evidence bundle. Capacity utilization is computed deterministically based on the canonical serialized form, and inclusion or exclusion of admitted atoms under the context capacity constraint follows a deterministic rule set recorded for replay.

Where insufficient capacity exists to include all admitted atoms, the context bundle assembler applies deterministic selection rules based on compartment priority, weighting parameters, and governance rules rather than truncation or nondeterministic omission. When required content cannot be included due to capacity constraints, an omission event or insufficient-context state is recorded rather than silently proceeding with an incomplete context bundle.

Canonical serialization and deterministic capacity enforcement define fixed encoding, ordering, and capacity computation rules applied during governed context bundle assembly, such that the resulting bundles function as stable, verifiable machine artifacts whose composition and size can be independently reproduced and validated during audit, replay, or external verification.

Governed Execution Interface Component

The ENGRAM layer interfaces with one or more reasoning models, agentic components, or orchestration services in a manner that restricts such components to consuming only governed context bundles assembled from an included set of memory atoms selected from an admitted set of memory atoms as described herein. The ENGRAM layer operates as a pre-inference control plane that supplies bounded, policy-compliant contextual input and prevents ungoverned expansion, retrieval, or disclosure of patient scoped information during execution.

In operation, a governed execution component is invoked only after a governed context bundle has been successfully assembled by the ENGRAM layer. The model or agent receives the governed context bundle—comprising the included set of memory atoms and associated governance metadata—or a gate produced steering profile derived therefrom, as the sole, non-bypassable patient scoped contextual input for the task. In some embodiments, the constrained execution interface permits execution only when the governed execution package is presented. In such embodiments, the governed execution package is machine-validated at the constrained execution interface prior to releasing the governed context bundle to the governed execution component. Direct access by the model or agent to underlying ENGRAM memory, source systems, or raw patient records is prevented by architectural enforcement, credential scoping, or execution mediation.

In some embodiments, non-bypassable enforcement is explicitly implemented by restricting credentials, network access, and API permissions such that a governed execution component is technically unable to access patient partitioned contextual memory, underlying ENGRAM memory, or source systems except through the constrained execution interface. In such embodiments, invocation requests that do not present a valid governed execution package are rejected by the constrained execution interface prior to releasing any governed context bundle, thereby preventing execution using ungoverned or ad hoc patient scoped context.

Non-bypassable enforcement is implemented using one or more constrained execution interfaces and, in some embodiments, one or more governed connectors such that alternative invocation paths are technically inoperable, and execution requests are permitted only upon presentation of gate produced governance artifacts bound to a governed context bundle and an applicable policy snapshot identifier (or policy digest).

In such embodiments, non-bypassable enforcement is achieved by a technical mechanism comprising at least one of: (i) a constrained execution interface that refuses execution absent a valid governed execution package; (ii) enforced mediation of model invocation through a model access gateway that validates bundle identifiers and gate produced governance artifacts; (iii) credential scoping, network segmentation, and API permission restrictions that prevent direct access by a governed execution component to patient scoped ENGRAM memory or source systems; and (iv) cryptographic verification of tokens, signatures, or digests bound to the governed context bundle identifier and the applicable policy snapshot identifier (or policy digest). In such embodiments, alternative invocation paths that bypass the constrained execution interface are explicitly denied, rejected, or rendered technically inoperable, thereby preventing patient scoped contextual information from influencing execution except through the governed pipeline described herein.

In such embodiments, fail-closed behavior is applied when a required governance artifact is absent, invalid, stale, revoked, or inconsistent with a recorded audit trace.

As used herein, a "governed execution package" comprises (i) the governed context bundle and (ii) a gate produced governance artifact bound to the governed context bundle. In various embodiments, the governed execution package binds, directly or by reference, identifiers of the candidate set of memory atoms, the admitted set of memory atoms, and the included set of memory atoms, thereby enabling deterministic verification of what was considered, permitted, and actually provided for execution.

In some embodiments, the governed context bundle includes or references by identifier a steering profile comprising one or more non-data-bearing constraints that condition output generation without exposing additional patient scoped content. In certain embodiments, the ENGRAM layer and/or memory gate emits one or more machine-readable control signals derived from governance evaluation of Checklist Atoms, admissibility outcomes, and reliance states. Such control signals may include, without limitation, follow-up question triggers, confirmation requirements, escalation indicators for authorized healthcare provider review, initiation of supervised or takeover modes, tool-scope restrictions, and blocking conditions that prevent downstream effectuation until required context is obtained. In various embodiments, the control signals are bound to the governed context bundle identifier and the applicable policy snapshot identifier (or policy digest) and are recorded as governance metadata for audit and deterministic replay. The control signals constrain downstream execution and reliance without converting ENGRAM into a conversational agent or autonomous decision-making system.

In certain embodiments, the governed execution component comprises a plurality of cooperating models or agentic components operating in parallel and/or in a staged pipeline, including embodiments in which a first model generates candidate checklist steps, follow-up questions, or candidate control signals and a second model performs evaluation, ranking, critique, or consistency checking. In such embodiments, each model invocation consumes only a governed context bundle (or a gate produced steering profile derived therefrom) produced through the non-bypassable memory gate, and downstream reliance is conditioned at acceptance endpoints by verification of readiness artifacts as described herein. Such multi-model operation is an implementation detail that does not alter the non-bypassable governance constraints, does not authorize ungoverned context expansion, and does not constitute autonomous decision-making.

In a non-limiting example, a steering profile includes one or more fields such as:

(i) contraindication flags indicating clinical or operational prohibitions (e.g., do-not-suggest contraindicated actions under identified conditions);

(ii) allowed topic classes and prohibited topic classes defining permitted and restricted output categories for the task;

(iii) a risk tier or safety classification associated with the task request or context (e.g., informational-only, decision-support, effectuation-eligible);

(iv) a tool-scope descriptor defining which external tools, connectors, or write back operations are permitted or prohibited;

(v) a minimum-evidence requirement identifying mandatory atom classes or provenance sufficiency thresholds for reliance readiness; and (vi) a presentation constraint defining required disclaimers, escalation triggers, or human-review requirements.

In such embodiments, the steering profile is evaluated during governed context assembly and, in some embodiments, during reliance readiness evaluation, thereby restricting output behavior and downstream effectuation according to governance constraints.

In various embodiments, the ENGRAM layer interfaces with a model access gateway or orchestration layer that mediates all invocations of reasoning models and agents. The model access gateway enforces that execution requests include one or more governance identifiers produced by the memory gate and context bundle assembler, such as a gating token or bundle identifier. Invocation requests lacking such identifiers are rejected, thereby preventing execution with ungoverned or ad hoc context.

During execution, the ENGRAM layer may further restrict ungoverned context expansion by enforcing constraints on tool calls, external data access requests, or secondary retrieval operations initiated by an agent. In certain optional multilingual embodiments, the ENGRAM layer and/or memory gate performs governed translation of admitted and included content between a patient language and a provider language under the applicable policy snapshot identifier (or policy digest). The governed translation process preserves semantic content of authorized information and is constrained to avoid introducing new meaning, new facts, or unauthorized inferences beyond the scope of the governed context bundle and steering profile. In various embodiments, translation is recorded as a governed transformation event including provenance identifiers, translation engine identifiers, version identifiers, and bundle identifiers, thereby supporting audit and deterministic replay of what content was translated and presented. In such embodiments, tool invocation pathways are mediated by governed connectors that require presentation of governance identifiers bound to the governed context bundle and the applicable policy snapshot identifier (or policy digest). Under this enforcement, additional patient scoped information is introduced into the reasoning process only when the corresponding retrieval and assembly operations are performed through the same non-bypassable memory gate and governed context assembly pipeline.

In embodiments involving third-party or externally hosted models, the ENGRAM layer supplies only governed context bundles assembled from the included set of memory atoms selected from the admitted set and, in some embodiments, supplies a steering profile derived from the governed context bundle, thereby reducing disclosure and copying risk. Steering profiles, when used, are treated as governed representations produced under memory gate control and are not permitted to bypass policy or integrity enforcement. The ENGRAM layer thus maintains institutional control over patient scoped contextual memory even when inference is performed outside the administrative domain of the health-care organization.

In the ENGRAM architecture, execution of a governed execution component and acceptance of output for down-stream effectuation are governed as distinct control stages. Execution control determines what contextual information is provided to the governed execution component, while reli-ance control determines whether output generated using the governed context may be accepted, committed, or written back into a system of record. Separation of execution control from reliance control permits generation of output for review or analysis while preventing unsafe, noncompliant, or unverifiable outputs from being relied upon for regulated actions.

In some embodiments, the ENGRAM layer extends gov-ernance enforcement beyond inference to condition down-stream reliance on model or agent output. A reliance bound-ary may be implemented at, or upstream of, an acceptance endpoint at which an effectuation or reliance event may occur, including without limitation a commit operation, finalize operation, sign operation, dispatch operation, or write back operation that incorporates model or agent output into a system of record or regulated workflow.

In some embodiments, the acceptance endpoint comprises a patient facing dispatch or publication endpoint, and the governed connector comprises a patient communication gateway including at least one of an email gateway, an SMS gateway, a voice or telephony gateway, a secure chat gate-way, a patient portal messaging gateway, or a document release or publication service.

In operation, a governed connector is positioned at or upstream of an acceptance endpoint and is configured to require presentation of a readiness artifact as a condition of accepting a reliance event. The readiness artifact is bound to the governed context bundle and the applicable policy snapshot identifier or policy digest and evidences that the model or agent output was generated using a governed context bundle assembled from the included set of memory atoms under the applicable policy snapshot identifier (or policy digest).

In such embodiments, the governed connector verifies, prior to permitting effectuation, that the readiness artifact cryptographically matches, or is bound to, (i) the bundle identifier or bundle digest corresponding to the governed context bundle and (ii) the applicable policy snapshot iden-tifier (or policy digest), thereby preventing acceptance of reliance events based on mismatched, substituted, or non-replayable context.

In certain embodiments, downstream acceptance or reli-ance on outputs that depend on Checklist Atoms is condi-tioned on satisfaction of checklist reliance state require-ments as verified through a readiness artifact at a reliance boundary. In various embodiments, the governed connector and/or acceptance endpoint verifies that required reliance states and associated readiness predicates have been satisfied prior to permitting commit, finalize, sign, dispatch, write back, or other effectuation operations. When verification fails, the system enforces fail-closed suppression or deferral of the reliance event rather than permitting ungoverned reliance on incomplete, stale, contradictory, or non-replay-able patient context.

When a readiness artifact is not present, invalid, or inconsistent with the reliance event, the governed connector denies, defers, or holds the reliance event rather than per-mitting ungoverned incorporation of model output. In this manner, the system prevents downstream reliance on outputs generated outside the governed execution pathway, even where inference itself may have occurred in a separate administrative or technical domain.

In some embodiments, reliance events include manual incorporation of model output. For example, when a user copies or transcribes model output into an electronic medical record and subsequently performs a commit, finalize, or sign operation, the operation is treated as a reliance event. The acceptance endpoint enforces that a corresponding readiness artifact is present before permitting completion of the opera-tion. This configuration enforces governance even when model output is introduced through human-mediated path-ways rather than direct system integration.

Readiness artifacts may include, without limitation, gat-ing tokens, signed bundle identifiers, signed applicable policy snapshot identifiers, or signed evidence bundle digests. In various embodiments, readiness artifacts are machine-verifiable and may be validated using crypto-graphic signatures or integrity checks prior to acceptance of a reliance event. Acceptance endpoint identifiers and reli-ance event metadata may be recorded in the audit trace to support later reconstruction and compliance review.

In various embodiments, the bundle identifier comprises a digest-based bundle identifier computed under canonical serialization rules, such that verification of the readiness artifact is reducible to verification of the bundle identifier and applicable policy snapshot identifier (or policy digest).

In some embodiments, the memory gate or a reliance readiness evaluation stage issues a readiness artifact that is machine-verifiable by a governed connector or acceptance endpoint. The readiness artifact may be implemented as a signed token, signed digest, signed evidence bundle refer-ence, or other cryptographically verifiable structure. In a non-limiting example, the readiness artifact includes one or more fields such as:

(i) a bundle identifier identifying a governed context bundle;

(ii) an applicable policy snapshot identifier or policy digest corresponding to the policy constraints applied;

(iii) a task request identifier or task class identifier;

(iv) a validity interval comprising at least one of an issuance time, expiration time, or replay window;

(v) a model configuration identifier identifying a model version, orchestration configuration, or execution pro-file;

(vi) an admitted atom digest comprising a hash or digest computed over identifiers of the admitted set of memory atoms and any transformations applied thereto; and (vii) an issuer identifier and/or signature metadata enabling verification of the issuing authority.

In such embodiments, a governed connector verifies the readiness artifact prior to permitting a reliance event, thereby preventing effectuation of state-changing actions when readiness authorization is absent, invalid, expired, or inconsistent with the governed context bundle.

By conditioning both execution and downstream reliance on the existence and validity of governed context artifacts, the ENGRAM layer applies enforcement checks that permit patient scoped information to influence system behavior only when introduced through the governed pipeline described herein. Under this unified enforcement model, execution requests, tool invocations, and reliance events that lack valid governance artifacts are denied or suppressed, thereby constraining system operation to policy-evaluated, auditable pathways and providing a defensible technical basis for deployment of AI-assisted workflows in regulated environments.

Audit and Replay Subsystem

Figure 9A:
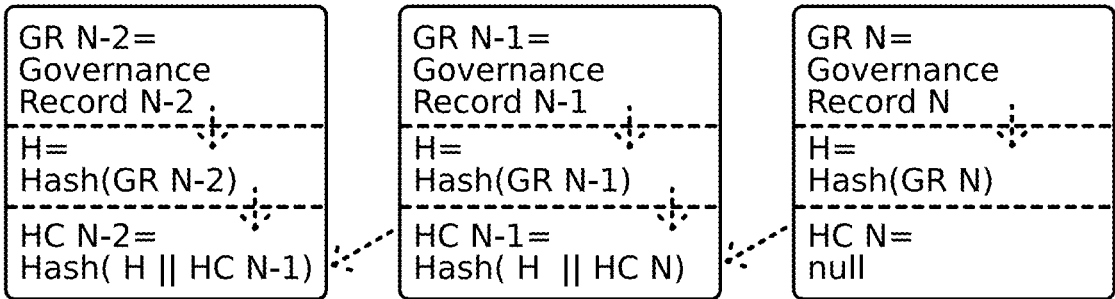
FIG. 9 illustrates an audit trail and evidence bundle enabling deterministic reconstruction and verification of governed context usage for a task request.
Figure 9:
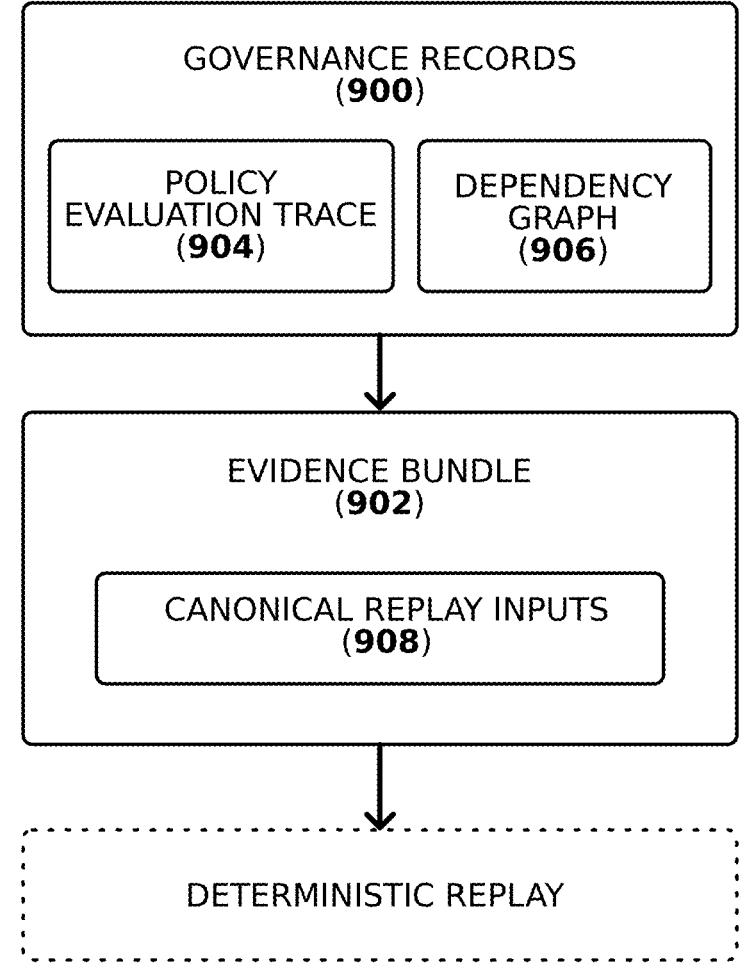

FIG. 9 illustrates non-limiting embodiments of a tamper-evident audit chain and replay workflow in which bundle identifiers, applicable policy snapshot identifiers, and associated governance artifacts are recorded to enable deterministic reconstruction and verification of governed context usage.

Consistent with the definitions of deterministic replay and governance artifacts set forth in Definitions Section, the audit subsystem records machine-verifiable governance records sufficient to reconstruct, verify, and replay governed context usage for a task request.

The ENGRAM layer includes an audit subsystem configured to record governance records in a tamper-evident audit chain. The audit chain comprises append-only records cryptographically bound to bundle identifiers, applicable policy snapshot identifiers, and governance artifacts, such that post-hoc alteration of governance records is detectable during verification or deterministic replay. The audit subsystem operates as an integral component of the same pre-inference governance pipeline that enforces non-bypassable memory gating and governed context assembly, and is not a post-hoc logging mechanism applied after execution, but rather a governance component that records the same identifiers and artifacts required to enforce execution conditioning and deterministic replay.

In operation, the audit trail records machine-readable identifiers and governance artifacts associated with a task request. Recorded information may include, without limitation, a task request identifier, identifiers of the candidate set of memory atoms evaluated by the memory gate, per-atom admissibility outcomes, transformation indicators, weighting parameters, identifiers of the admitted set of memory atoms, identifiers of the included set of memory atoms assembled into the governed context bundle, deterministic ordering information, the governed context bundle identifier, the applicable policy snapshot identifier or policy digest, and a governed execution component identifier. The audit trail may further record timestamps, execution boundary identifiers, and references to reliance events when applicable, including patient facing dispatch outcomes such as delivery receipts or delivery status indications.

In certain embodiments, outcomes of applicability evaluation, contraindication-based suppression, and any resulting admissibility determinations or transformations for Checklist Atoms are recorded in the governance record together with identifiers of the Checklist Atom, identifiers of supporting memory atoms, and the applicable policy snapshot identifier (or policy digest), thereby enabling deterministic replay of which Checklist Atoms were eligible, instantiated, parameterized, transformed, or suppressed for the task request.

In certain embodiments, deterministic replay further includes replay of checklist assembly decisions, including which Checklist Atoms were retrieved in a candidate set, admitted or denied under applicability logic and contraindication logic, parameter-bound using admissible patient scoped ENGRAM memory elements, assigned reliance states, and included and ordered for presentation or downstream use for a given patient interaction. In various embodiments, the audit trail records identifiers of the Checklist Atoms, identifiers of supporting memory atoms used for parameter binding, the applicable policy snapshot identifier (or policy digest), and any transformation, suppression, or reliance-state outcomes, thereby enabling reconstruction of the checklist representation that was permitted to influence governed execution or downstream reliance. Such replay establishes audit-grade proof of checklist governance decisions without requiring reproduction of model-internal state or determinism of model output.

Consistent with the definition of deterministic replay provided herein, audit-grade replay enables deterministic reconstruction and verification of the governed context bundle and associated governance records for a task request, without requiring or implying reproduction of output generated by a governed execution component. Deterministic replay enables reconstruction of the exact contextual inputs, admissibility determinations, ordering, and policy conditions under which execution occurred, independent of any non-deterministic behavior of the governed execution component. In optional embodiments, deterministic replay of governed context artifacts further enables reconstruction or verification of downstream arbitration states, rendering decisions, or acceptance outcomes produced by separate truth-enforcement or display-gating mechanisms, without requiring determinism of model or agent output generation.

Figure 11:
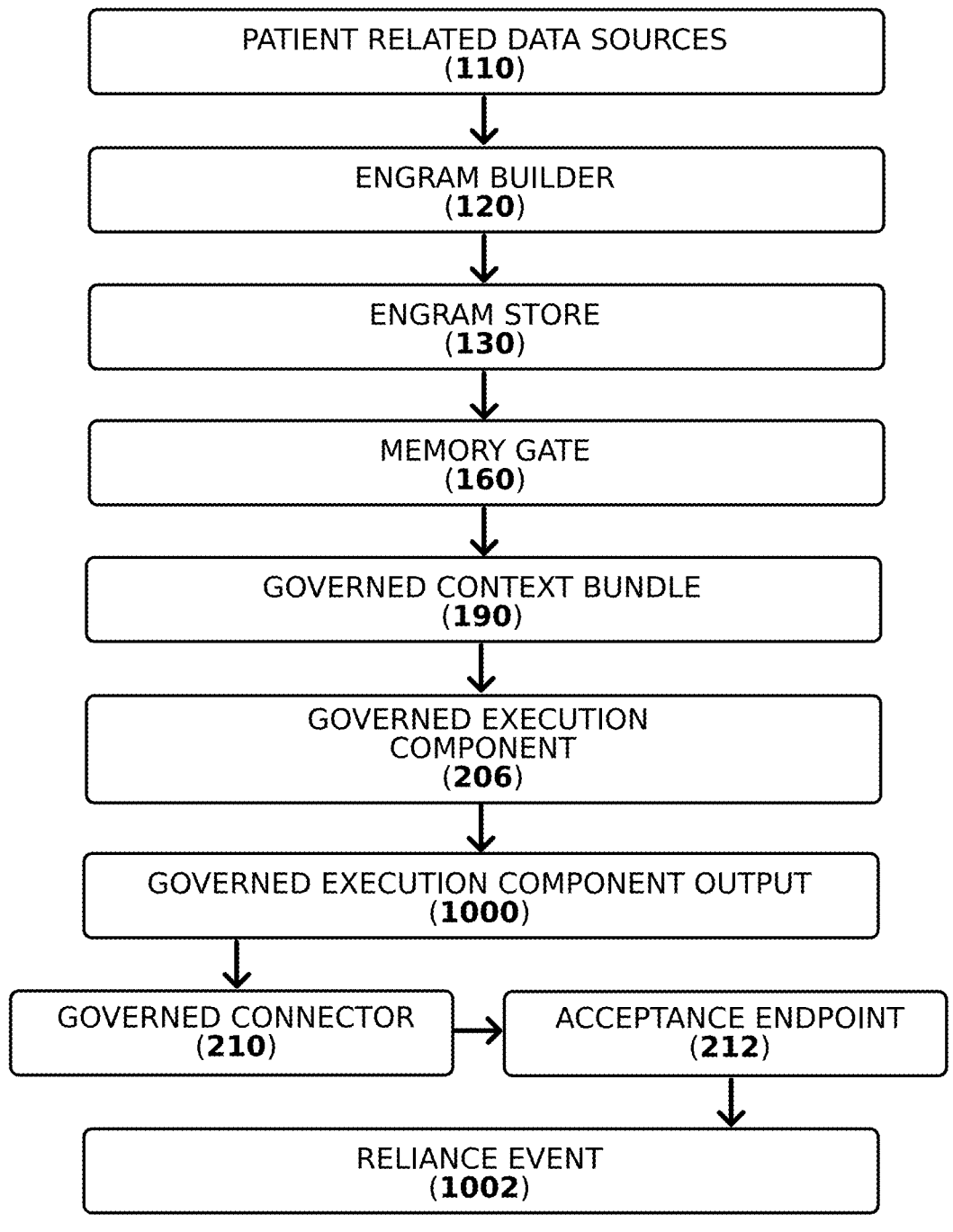
FIG. 11 illustrates a downstream verification, arbitration, or rendering component that conditions rendering, display, export, or acceptance of output generated by a governed execution component on verification of governance artifacts included in or bound to a governed execution package.

In some embodiments, as illustrated in FIG. 11, governed context bundles and bound governance identifiers are supplied to a downstream verification or arbitration component that conditions rendering, display, or acceptance outcomes based on verification of such identifiers.

For clarity, deterministic replay as described herein operates at the level of governed context artifacts and governance metadata, rather than at the level of model-internal state or inference behavior. Deterministic replay enables verification of what contextual information, admissibility decisions, ordering rules, and policy constraints were applied for a task, without requiring deterministic execution, deterministic inference, or reproducible outputs from the governed execution component.

In various embodiments, deterministic replay is performed using a replay identifier that references at least a bundle identifier, identifiers of the admitted set of memory atoms, identifiers of the included set of memory atoms, the applicable policy snapshot identifier, a task request identifier, and a recorded temporal validity window associated with the task. Deterministic replay is permitted only for an authorized verifier operating under an applicable policy snapshot authorizing replay enforced by the ENGRAM layer. Replay reconstructs the governed context bundle by reapplying recorded admissibility outcomes, transformations, deterministic ordering rules, and canonical serialization parameters, and verifies the integrity of governance records using the tamper-evident audit chain.

In various embodiments, the governance record binds the bundle identifier to the applicable policy snapshot identifier and to identifiers of both the admitted set and the included set, thereby enabling verification of what was permitted for inclusion and what was actually provided for execution.

The audit trail is bound to the governed context bundle such that the bundle identifier and associated replay identifier can be used to reconstruct the exact contextual input presented to the governed execution component for the task. Deterministic replay is enabled by combining the recorded atom identifiers, admissibility states, transformation indicators, ordering rules, and policy snapshot information, thereby allowing the system or an authorized verifier to reproduce the governed context bundle without relying on non-deterministic reconstruction or subjective interpretation.

By treating audit records as integral governance artifacts rather than auxiliary logs, the ENGRAM layer enables audit-grade reconstruction of context-dependent outputs and provides a defensible basis for compliance review, quality assurance, and incident investigation.

In some embodiments, governance records are recorded in an append-only, hash-chained structure as illustrated in FIG. 9A, such that alteration or removal of a governance record is detectable during verification or replay.

In various embodiments, the ENGRAM layer generates, for a task request, an evidence bundle that functions as a replayable, machine-readable governance artifact binding together the elements required to verify how a governed context bundle was assembled and used. The evidence bundle references or includes identifiers of the candidate set of memory atoms, identifiers of the admitted set of memory atoms, identifiers of the included set of memory atoms assembled into the governed context bundle, recorded admissibility and transformation outcomes, deterministic ordering information, the governed context bundle identifier, the applicable policy snapshot identifier or policy digest, and identifiers of the evaluation and assembly rule sets applied during execution.

The evidence bundle further includes, or references, one or more cryptographic integrity protections comprising at least one of digital signatures, hash digests, or hash chains. bind the evidence bundle to the bundle identifier (including, in certain embodiments, a digest-based bundle identifier computed over a canonical serialization of the governed context bundle) and the applicable policy snapshot identifier (or policy digest), the applicable policy snapshot identifier, and associated governance artifacts, such that post-hoc alteration of governance records or substitution of ungoverned artifacts is detectable during verification or deterministic replay. Evidence bundles may be stored locally, transmitted to external systems, or retained for later retrieval in response to audit, investigation, or compliance review.

In various embodiments, reliance conditioning is enforced using a readiness artifact associated with a governed context bundle and evaluated by a governed connector or acceptance endpoint. The readiness artifact is a machine-verifiable artifact derived from, or bound to, the evidence bundle and is required as a condition for acceptance of a reliance event or downstream state-changing action.

In one non-limiting example, a readiness artifact comprises:

(i) a readiness_token_id identifying the artifact;

(ii) a bundle_id and applicable_policy_snapshot_id (or policy_digest) binding the readiness artifact to the governed context bundle and policy snapshot;

(iii) a task_id and patient_id identifying the task request and patient partition;

(iv) allowed_actions identifying one or more permitted reliance actions or effectuation classes, including at least one of commit, finalize, sign, dispatch, order placement, or write back;

(v) a reliance_readiness_status indicating whether reliance readiness predicates were satisfied;

(vi) a predicate_summary and/or predicate identifiers identifying which reliance readiness predicates were evaluated;

(vii) an expiry or time-to-live defining artifact validity duration;

(viii) an issuer_id identifying the governance component that issued the readiness artifact; and (ix) signature_fields comprising at least one of a signature, signature reference, public-key identifier, or verification material sufficient to permit machine verification by a governed connector against a bundle digest and the applicable policy snapshot identifier (or policy digest).

In some embodiments, the readiness artifact further includes an acceptance_endpoint_scope limiting validity to specified acceptance endpoints or connector domains.

An external verifier may validate an evidence bundle and/or a readiness artifact using a public-key mechanism, signature verification process, or other integrity check. External verifiers may include, without limitation, compliance auditors, regulators, enterprise security services, or incident review systems. Verification may confirm that the governed context bundle was assembled under the recorded applicable policy snapshot identifier (or policy digest), that only memory atoms admitted by the memory gate were eligible for inclusion, and that the governed context bundle comprises the included set of memory atoms selected from the admitted set in accordance with recorded deterministic assembly and serialization rules, and that the readiness artifact authorizing reliance was issued under the same governance conditions.

In some embodiments, governed connectors or acceptance endpoints verify a signature or digest over at least one of the governed context bundle identifier, the applicable policy snapshot identifier, the evidence bundle digest, or the readiness artifact prior to accepting an effectuation or reliance event. Under this verification process, reliance events that are not accompanied by valid, consistent governance artifacts are denied or deferred rather than being accepted, thereby constraining reliance to outputs generated through the governed execution pathway.

In addition to recording successful admissions and executions, the ENGRAM layer records governed exception events when governance conditions are not satisfied. Integrity exception events are recorded when one or more integrity criteria required for admission or safe use of memory atoms are not satisfied. Such events may include, without limitation, provenance insufficiency, failed attestation or signature verification, failed checksum verification, stale temporal validity, detected contradictions, memory poisoning indicators, or missing mandatory atom classes.

When an integrity exception event is detected, the memory gate applies one or more predefined exception-handling actions to the affected memory atoms, including denying admission, attenuating weighting, substituting abstracted representations, or designating the task as being in an insufficient-context state. Detection of the integrity exception event, the specific handling action applied, and references to the affected atom identifiers are recorded as part of the audit trail. During audit or replay, the recorded exception metadata is evaluated to determine the basis on which particular memory atoms were excluded, transformed, or caused execution or reliance to be restricted.

Omission events are recorded when mandatory candidate-inclusion rules for designated atom classes cannot be satisfied during context bundle assembly. In various embodiments, omission events include included-set omission in which one or more memory atoms in the admitted set are excluded from the included set due to the context capacity constraint or compartment allocation rules, and the audit trail records identifiers of the excluded admitted atoms together with a capacity-exclusion indicator. By way of non-limiting example, omission events may be recorded when allergy information, medication information, contraindication constraints, or baseline parameters required for a task are not admitted due to missing provenance, insufficient integrity, or context capacity constraints. When an omission event occurs, the system records the omission and restricts execution or reliance rather than silently proceeding with incomplete context.

By explicitly recording integrity exception events and omission events, the ENGRAM layer prevents silent failure modes in which clinically material information is absent without indication. These records support later reconstruction of why execution was restricted, why outputs were suppressed, or why additional evidence was required, and provide transparency into governance decisions made by the system.

In various embodiments, the audit trail or evidence bundle includes a policy evaluation trace associated with a task request. The policy evaluation trace is a machine-readable record identifying which policy constraints, predicates, or rule identifiers within the applicable policy snapshot (as referenced by the applicable policy snapshot identifier or policy digest) were evaluated during memory gate operation and the outcome of such evaluation. The policy evaluation trace does not embed policy source text, but instead records sufficient identifiers to enable deterministic reconstruction of policy application without disclosing policy implementation details.

The policy evaluation trace is bound to the governed context bundle identifier, applicable policy snapshot identifier or policy digest, and replay identifier. During audit or replay, the policy evaluation trace enables verification that admissibility, transformation, reliance readiness, and execution conditioning decisions were produced by applying the recorded policy snapshot to the recorded candidate set of memory atoms. External verifiers may use the policy evaluation trace in combination with the evidence bundle to confirm that governance decisions were not altered post hoc and that execution and reliance occurred under the recorded policy constraints.

In various embodiments, the audit trail or evidence bundle references a dependency graph that establishes provenance closure for the included set of memory atoms and for derived representations, abstracted content, and steering indicators included in a governed context bundle, and in various embodiments further records dependencies linking such included content to source memory atoms in the admitted set that were evaluated by the memory gate. The dependency graph identifies source memory atom identifiers and recorded transformation steps sufficient to demonstrate that all contextual elements influencing inference originate from memory atoms evaluated by the memory gate under the applicable policy snapshot and integrity criteria.

The dependency graph is recorded in association with canonical serialization identifiers, tokenizer scheme identity, and context capacity computation parameters used to assemble the governed context bundle. These recorded inputs enable canonical replay in which re-evaluation of the dependency graph, policy snapshot, integrity criteria, and assembly rule set yields the same governed context bundle composition, ordering, and capacity utilization as originally produced.

By recording provenance closure, dependency relationships, and canonical replay inputs as part of the audit trail or evidence bundle, the ENGRAM layer enables independent verification that governed context bundles were assembled deterministically, without undisclosed transformations, silent omission, or unauthorized context expansion. These records provide a verifiable basis for compliance review, incident investigation, expert analysis, and external audit.

Multimodal Contextual Memory

In some embodiments, the ENGRAM layer supports multimodal contextual memory in which memory atoms represent or are derived from patient-related information across multiple data modalities. Multimodal embodiments are described to illustrate the breadth of contextual information that may be governed by the same pre-inference memory gate and context assembly pipeline described herein, and do not alter the non-bypassable enforcement, fail-closed admissibility evaluation, or deterministic governed context bundle assembly model of the invention.

Memory atoms in multimodal embodiments may include, without limitation, text-based representations, structured measurements, time-series data, waveform-derived features, audio feature vectors or derived summary representations, image-feature tensors, device telemetry features, or combinations thereof. Each such memory atom, regardless of modality, is stored in the patient partitioned ENGRAM memory together with metadata sufficient to support governance, including provenance metadata, temporal validity metadata, modality indicators, and integrity-related attributes.

In operation, multimodal memory atoms are retrieved as candidates by the retrieval engine in the same manner as text-based atoms and are subject to evaluation by the memory gate prior to any model or agent execution. The memory gate applies policy constraints defined by an applicable policy snapshot, as referenced by an applicable policy snapshot identifier (or policy digest) and integrity criteria uniformly across modalities, while permitting modality-specific integrity checks or transformation rules where appropriate. For example, integrity criteria for image-derived features may include validation of acquisition device identifiers or timestamps, while integrity criteria for device telemetry features may include continuity or calibration checks.

Where multimodal memory atoms are admitted by the memory gate, the atoms may be included in the governed context bundle as part of an included set of memory atoms selected from an admitted set of memory atoms under a context capacity constraint and deterministic assembly rules. In some embodiments, multimodal atoms are admitted in abstracted or summarized form rather than as raw data, particularly where disclosure minimization or context capacity constraints apply. Such abstraction or summarization is performed by the memory gate and recorded as part of the governance record, the governance record identifying the transformation applied, such that the form of the admitted atom can be deterministically reconstructed during audit or replay.

The governed context bundle may include multimodal content in a representation consumable by a governed execution component, or may include derived representations such as references, embeddings, or feature vectors representing such content, provided that any such derived representations are treated as candidate artifacts and remain subject to non-bypassable memory gate evaluation and governance recording as described herein. Regardless of representation, the governed context bundle remains a bounded, deterministic artifact assembled before execution and identified by a bundle identifier, including in certain embodiments a digest-based bundle identifier computed over a canonical serialization of the included set of memory atoms, and bound to an applicable policy snapshot identifier (or policy digest).

In some embodiments, weighting parameters assigned by the memory gate account for modality-specific confidence, resolution, or relevance characteristics. For example, recent structured measurements may be weighted differently from historical image-derived features, or device telemetry features may be attenuated when integrity criteria indicate incomplete coverage. Such weighting does not override admissibility and does not permit inclusion of content that fails policy or integrity evaluation.

By applying the same non-bypassable gating, deterministic assembly, and audit mechanisms to multimodal memory atoms as to text-based patient scoped atoms, the ENGRAM layer subjects multimodal data to identical admissibility evaluation, execution conditioning, and audit recording steps prior to inclusion in any governed context bundle. Under this architecture, extension of the ENGRAM layer to additional data modalities does not introduce alternative execution paths or bypass points outside the constrained execution interface and the non-bypassable memory gate. This uniform application demonstrates that contextual governance and model input control are enforced consistently across heterogeneous data types without modification of the core governance pipeline.

In various embodiments, execution requests that attempt to supply multimodal patient scoped content, derived representations, or embeddings outside the governed context bundle are rejected by the constrained execution interface as lacking required gate produced governance artifacts.

Federated and Cross-Institution Context Governance

In some embodiments, the ENGRAM layer operates in a federated or cross-institution configuration in which patient partitioned contextual memory is distributed across multiple administrative, organizational, or institutional domains. Federated embodiments are described to illustrate how the same pre-inference governance model applies when patient-related information is stored or generated by multiple entities, and do not alter the fundamental requirement that contextual information be admitted through a non-bypassable memory gate prior to inference and reliance.

In a federated configuration, each participating institution maintains its own ENGRAM memory and ENGRAM store under local governance control. Memory atoms generated within an institution remain subject to that institution's policy constraints, integrity criteria, and patient partitioning rules. Retrieval of memory atoms across institutional boundaries is not performed directly by reasoning models or agents and is not authorized by retrieval alone. Instead, any cross-institution retrieval is mediated by the ENGRAM layer and evaluated by a memory gate operating under an applicable policy snapshot, as referenced by an applicable policy snapshot identifier (or policy digest), the policy snapshot incorporating both local and cross-institution governance constraints.

In operation, when a task request requires consideration of patient-related information that may reside outside a local institutional boundary, the ENGRAM layer identifies a candidate set of memory atoms available from one or more external ENGRAM stores. Prior to releasing any such patient scoped memory atoms or derived representations, at least one memory gate selected from a local memory gate, a source-institution memory gate, or a combination thereof evaluates admissibility under the applicable policy snapshot, which may include inter-institutional agreements, consent constraints, jurisdictional rules, and minimum-necessary disclosure requirements. In various embodiments, cross-institution export is permitted only when a gate produced governance artifact evidencing admissibility under the applicable policy snapshot identifier (or policy digest) is generated and verified at an institutional boundary connector. Memory atoms that are not admissible under the applicable policy snapshot identifier (or policy digest) are denied or transformed prior to any export.

In some embodiments, rather than exporting data-bearing memory atoms across institutional boundaries, the memory gate generates abstracted or steering-only representations derived from external memory atoms. Such representations may convey clinically relevant constraints or directional indicators without disclosing underlying raw patient data. These representations are treated as governed outputs of the memory gate and are subject to the same audit, replay, and reliance controls as locally generated context.

Federated embodiments may further include exchange of governance artifacts rather than exchange of raw data. In various embodiments, a governed execution package produced at a source institution includes a governed context bundle and one or more gate produced governance artifacts bound thereto, such that a receiving institution may verify admissibility and reliance conditions without importing raw patient scoped content. By way of non-limiting example, an external institution may provide a signed evidence bundle, applicable policy snapshot identifier or policy digest, or readiness artifact cryptographically attesting to admissibility or constraint satisfaction, which may be evaluated by the local ENGRAM layer without importing underlying memory atoms. Such configurations enable coordinated governance while preserving institutional autonomy and reducing disclosure risk. Verification of such artifacts does not itself authorize execution or reliance, and any patient scoped contextual information used for inference at the receiving institution remains subject to governed context bundle assembly and constrained execution interface enforcement as described herein.

Regardless of deployment configuration, the essential characteristic of federated embodiments is that no patient scoped contextual information influences model or agent execution unless it has been admitted through a non-bypassable memory gate operating under an applicable policy snapshot identifier (or policy digest) and incorporated into an included set of memory atoms assembled into a governed context bundle through the constrained execution interface. Federation thus extends the reach of governed contextual memory without introducing ungoverned execution pathways or weakening the pre-inference enforcement model.

In various embodiments, reasoning models, agents, and orchestration components are technically unable to directly query external ENGRAM stores and may access cross-institution context only through governed connectors that enforce the same gate produced artifact requirements.

Professional-Domain Context Governance

While the foregoing description is presented with clinical and patient-oriented embodiments to illustrate high-stakes governance requirements, the disclosed ENGRAM system is not limited to healthcare and may be applied in professional domains, including regulated environments. In various embodiments, ENGRAM provides a governance control plane for contextual memory and model input construction for professional-use artificial intelligence systems in any domain in which (i) source information is multi-source, longitudinal, or high-volume, (ii) model input capacity is constrained, (iii) the consequences of error are material, and/or (iv) auditability, provenance, and policy compliance are required.

In one embodiment, the patient partitioning described herein may be generalized as a principal partition corresponding to a subject entity or other governed unit for which contextual memory is maintained. By way of example, the principal partition may correspond to at least one of: a client, account, customer, policyholder, claim, case, legal matter, contract, project, codebase, asset, device, system, manufacturing lot, or enterprise tenant. In such embodiments, memory atoms store domain-relevant contextual units and are governed by policy constraints and integrity criteria analogous to those described for clinical data.

In one embodiment, the memory gate machine-enforces purpose limitation and minimum-necessary disclosure in non-clinical contexts. By way of example, policy constraints may include at least one of: least-privilege access control, role-based access control, contractual confidentiality constraints, export-control constraints, attorney-client privilege constraints, information barrier constraints, data residency constraints, or organization-specific compliance rules. In one embodiment, the memory gate performs redaction, abstraction, or steering-only disclosure when raw sensitive values are not eligible for release to a reasoning model, hosted service, or agent tool.

In one embodiment, a reliance event comprises any action that commits, publishes, executes, or otherwise causes a downstream system to rely on a model output. By way of example, a reliance event may comprise at least one of: submitting or filing a document, transmitting a communication to a third party, executing a transaction, placing or modifying an order, approving a payment, deploying code, merging a change set, updating a configuration, committing a record to an enterprise system, issuing a command to a device, or triggering an automated workflow. In such embodiments, an acceptance endpoint suppresses, defers, or denies the reliance event unless a readiness artifact verifies successfully under a fail-closed policy.

In one embodiment, ENGRAM supports professional-use systems that must demonstrate audit-grade traceability. The system records at least the task request, identifiers of the candidate set of memory atoms, memory gate determinations, the governed context bundle identifier and/or a steering profile identifier, and a replay identifier sufficient to reconstruct the contextual inputs and governance conditions presented to the model or agent. In this manner, the disclosed ENGRAM system provides verifiable governance of "what the model saw," in addition to any governance applied to outputs or reliance events. In some embodiments, an admitted set of memory atoms is larger than an included set of memory atoms due to a context capacity constraint, deterministic ordering rules, or compartmentalization rules.

In one embodiment, a principal partition corresponds to a legal matter, litigation docket, investigation, or contract negotiation. ENGRAM memory atoms may include, by way of example: (i) contract clauses and definitional terms, (ii) correspondence excerpts, (iii) deposition or interview summaries, (iv) privilege status indicators, (v) jurisdictional or procedural constraints, (vi) deadline and scheduling facts, and (vii) citations to authoritative sources. A candidate set of memory atoms may be retrieved using deterministic addressing (e.g., clause identifiers, exhibit identifiers, or docket identifiers) and/or similarity scoring (e.g., semantic features) to identify responsive material to a task request such as "draft a response" or "summarize issues."

In one embodiment, the memory gate enforces attorney-client privilege, work product protections, and confidentiality constraints by evaluating an applicable policy snapshot identifier (or policy digest) that includes at least role, purpose-of-use, and information-barrier rules. The memory gate may admit only those atoms that are eligible for disclosure to the requesting user and/or to a hosted third-party model under the applicable policy snapshot identifier (or policy digest), and may redact or abstract sensitive values while preserving admissible constraints or guidance. In one embodiment, when raw privileged content is not eligible for release to a hosted model, the memory gate emits a steering profile that constrains the model to request admissible evidence or to generate output based on admissible high-level constraints rather than privileged underlying text. In such embodiments, disclosure of privileged content is prevented such that model processing does not constitute waiver or voluntary publication of privileged material.

In one embodiment, the governed context bundle is assembled subject to a context capacity constraint and canonical serialization rule, and is recorded with a replay identifier enabling reconstruction of the bundle and the applicable policy snapshot identifier (or policy digest). In one embodiment, a reliance event comprises filing, transmitting, submitting, or publishing the generated output (e.g., filing a motion, sending a response letter, or transmitting a draft to an external party). An acceptance endpoint suppresses the reliance event unless a readiness artifact verifies successfully, wherein the readiness artifact is cryptographically bound to at least the governed context bundle identifier and an applicable policy snapshot identifier or policy digest. In this manner, the system provides audit-grade proof of what material the model was permitted to see, and prevents ungoverned disclosure or publication.

In one embodiment, a principal partition corresponds to a financial account, portfolio, customer profile, underwriting file, or transaction case. ENGRAM memory atoms may include, by way of example: (i) account permissions and authorization limits, (ii) risk tier indicators, (iii) suitability or appropriateness constraints, (iv) recent transaction history, (v) market exposure summaries, (vi) policy or regulatory constraints, (vii) fraud or anomaly indicators, and (viii) non-disclosure constraints for sensitive operational values. A candidate set of memory atoms may be retrieved responsive to a task request such as "propose a rebalance," "assess risk," or "prepare an explanation," using deterministic addressing (e.g., account identifiers, instrument identifiers, or policy identifiers) or similarity scoring.

In one embodiment, the memory gate enforces least-privilege access control, purpose limitation, and compliance constraints by evaluating an applicable policy snapshot identifier (or policy digest) that includes at least role and purpose-of-use, and may additionally include jurisdiction, residency, or organizational compliance rules. The memory gate may deny admissibility of atoms lacking provenance sufficiency, may attenuate weights for stale or low-confidence atoms, and may redact or abstract sensitive values that are not eligible for release to a hosted third-party model or to a tool. In one embodiment, when raw values are restricted, the memory gate emits a steering profile that provides risk constraints, allowable actions, prohibited actions, and required follow-up questions to obtain admissible evidence.

In one embodiment, the governed context bundle is assembled with deterministic ordering and canonical serialization under a context capacity constraint, and an audit record is stored identifying identifiers of an admitted set of memory atoms, an applicable policy snapshot identifier (or policy digest), and a replay identifier enabling reconstruction. In one embodiment, a reliance event comprises executing a trade, placing an order, approving a payment, or committing a transaction instruction to an enterprise system. An acceptance endpoint verifies, prior to permitting the reliance event, that a readiness artifact is valid and matches a cryptographic digest of the governed context bundle identifier and the applicable policy snapshot identifier (or policy digest), wherein failure of verification causes fail-closed suppression or deferral.

In one embodiment, a principal partition corresponds to an enterprise tenant, software project, repository, codebase, service, infrastructure environment, or change-management case. ENGRAM memory atoms may include, by way of example: (i) architectural constraints, (ii) security and compliance policies, (iii) deployment configuration parameters, (iv) environment-specific secrets handling rules, (v) dependency and compatibility constraints, (vi) incident history or postmortem summaries, (vii) change-control requirements, and (viii) authoritative documentation excerpts. A candidate set of memory atoms may be retrieved responsive to a task request such as "propose a patch," "generate a pull request," "modify configuration," or "prepare a deployment plan," using deterministic addressing (e.g., repository identifiers, service identifiers, or policy identifiers) and/or similarity scoring.

In one embodiment, the memory gate enforces least-privilege access control, information barrier constraints, and organization-specific compliance rules by evaluating an applicable policy snapshot identifier (or policy digest) that includes at least role and purpose-of-use. The memory gate may deny admissibility of atoms that are stale, inconsistent, lack provenance sufficiency, or are restricted from disclosure to a hosted model or tool. In one embodiment, when raw configuration values or sensitive operational details are not admissible for disclosure, the memory gate admits an abstracted or steering-only representation that constrains the governed execution component to generate output consistent with admissible policies while preventing exposure of restricted values.

In one embodiment, the governed context bundle is assembled subject to deterministic ordering, canonical serialization, and a context capacity constraint, and is recorded with a bundle identifier bound to the applicable policy snapshot identifier (or policy digest). In one embodiment, a reliance event comprises merging a change set, deploying a build, promoting a release, modifying a production configuration, approving a change ticket, committing an infrastructure update, or triggering an automated workflow in an enterprise system. An acceptance endpoint suppresses, defers, or denies the reliance event unless a readiness artifact verifies successfully and matches a cryptographic digest of the governed context bundle identifier and the applicable policy snapshot identifier (or policy digest). In this manner, the system prevents ungoverned deployment or configuration changes based on inadmissible or non-replayable context and provides audit-grade traceability of what contextual information the model or agent was permitted to consume.

The foregoing professional-domain embodiments illustrate that ENGRAM governs what contextual memory is admissible for model or agent consumption and conditions downstream reliance events on verifiable governance artifacts, independent of the particular industry domain.

In all such embodiments, the ENGRAM layer provides a technical mechanism for constraining contextual influence and reliance through non-bypassable, fail-closed governance artifacts.

Privacy-Preserving Steering and Escrowed Disclosure

In some embodiments, the ENGRAM layer supports privacy-preserving steering in which certain patient-associated information is not disclosed in data-bearing form to a governed execution component, yet still influences execution through governed constraint representations. Privacy-preserving steering is implemented as a transformation performed by the memory gate and does not operate as an independent or parallel control pathway. All steering representations are admitted, assembled, and audited under the same non-bypassable governance pipeline described herein, including evaluation under an applicable policy snapshot identifier (or policy digest).

In operation, the memory gate may identify one or more memory atoms as corresponding to sensitive attributes subject to heightened privacy restrictions under the applicable policy snapshot identifier (or policy digest). Sensitive attributes may include, without limitation, protected diagnoses, family history or genetic relationships, confidential social or behavioral indicators, or other patient-associated information for which direct disclosure is restricted. Identification of a memory atom as sensitive does not, by itself, authorize disclosure or steering; rather, it triggers evaluation of whether a transformed representation may be admitted consistent with policy and integrity constraints.

When disclosure of a sensitive attribute in data-bearing form is not authorized, the memory gate may generate an obfuscated steering indicator derived from the underlying memory atom. An obfuscated steering indicator is a non-raw, non-invertible or computationally infeasible-to-invert representation configured to influence context assembly or downstream reasoning without revealing the underlying sensitive attribute. Such indicators are treated as directional constraints rather than factual assertions and are not consumable by the reasoning system as patient-factual statements.

Obfuscated steering indicators are produced deterministically by the memory gate and are associated with governance metadata sufficient to support audit and replay. The form and scope of an obfuscated steering indicator are selected by the memory gate based on the applicable policy snapshot identifier (or policy digest), integrity criteria, and task context, and may include constraint flags, weighted parameters, or restricted action classes. Steering indicators do not bypass the memory gate and do not permit access to underlying sensitive content.

In some embodiments, the memory gate includes obfuscated steering indicators within a steering profile, which is a governed representation admitted and assembled in the same manner as data-bearing memory atoms. The steering profile may be included in a governed context bundle, provided as a steering-only bundle, or combined with limited disclosed facts in a hybrid bundle, depending on policy authorization. In all cases, the steering profile is included within a governed context bundle or steering-only bundle, identified by a bundle identifier and bound to the applicable policy snapshot identifier (or policy digest), and is subject to the same capacity constraints, determinism requirements, and audit mechanisms as other governed context bundles.

In some embodiments, the ENGRAM layer maintains an escrowed reveal mapping that associates obfuscated steering indicators with their underlying sensitive source content. The escrowed reveal mapping is maintained under governance control and is not accessible to reasoning models, agents, or external systems during execution or inference. Access to the escrowed reveal mapping is permitted only through a policy authorized reveal operation distinct from deterministic replay, the reveal operation being evaluated under an applicable policy snapshot identifier (or policy digest) and enforced by the ENGRAM layer, and is subject to audit logging and integrity verification. In such embodiments, the reveal operation is permitted only through an authorized reveal interface requiring verification of a gate produced governance artifact bound to the applicable policy snapshot identifier (or policy digest), such that alternative reveal pathways are denied or rendered technically inoperable. The existence of an escrowed reveal mapping enables authorized re-identification or controlled disclosure when required, without exposing sensitive attributes to unauthorized inference or copying.

Importantly, privacy-preserving steering does not relax fail-closed behavior. When neither disclosure nor transformation of a sensitive attribute is authorized under the applicable policy snapshot, the memory gate denies admission and may generate an insufficient-context state or restrict execution or reliance accordingly. Steering is therefore a disclosure-minimization mechanism, not a substitute for admissibility.

In a non-limiting example, a task request requires evaluation of treatment options for a patient, and the ENGRAM memory includes a memory atom corresponding to a sensitive attribute subject to heightened privacy restrictions. Under the applicable policy snapshot identifier (or policy digest), direct disclosure of the sensitive attribute is not authorized for the requesting role or purpose of use.

In one embodiment, a steering bundle or steering profile includes, by way of non-limiting example:

(i) one or more contraindication, exclusion, or suppression flags;

(ii) an allowed-topic set and a prohibited-topic set;

(iii) a risk-tier or caution-level indicator;

(iv) recency, completeness, or confidence indicators associated with one or more memory atom classes;

(v) an allowed-tool list, prohibited-tool list, or tool-scope restriction; and (vi) one or more required follow-up questions or evidence requests that, if satisfied with admissible information, enable transition from steering-only guidance to a data-bearing governed context bundle.

In response, the memory gate denies admission of the data-bearing memory atom and generates an obfuscated steering indicator representing a directional constraint.

Based on these admissibility and transformation outcomes, the memory gate deterministically conditions emission of a data-bearing governed context bundle, a steering-only bundle, or a hybrid bundle, based on satisfaction of provenance sufficiency, minimum-necessary disclosure requirements, and task-specific policy constraints under the applicable policy snapshot identifier (or policy digest).

The steering indicator may specify, by way of example, that certain classes of actions are restricted, that additional evidence is required before proceeding, or that escalation thresholds apply. The steering indicator is included within a steering profile admitted by the memory gate and assembled into a governed context bundle or steering-only bundle.

The governed context bundle is provided to the governed execution component, which generates output constrained by the steering profile without receiving the underlying sensitive attribute. The audit trail records the generation and admission of the obfuscated steering indicator, the denial of the underlying data-bearing atom, and the applicable policy snapshot identifier (or policy digest) associated with the task request. If a later policy authorized reveal operation is performed, the escrowed reveal mapping enables controlled disclosure of the underlying sensitive attribute with corresponding audit logging.

In such embodiments, execution of the governed execution component remains conditioned on presentation of a governed execution package that includes the bundle identifier and gate produced governance artifacts corresponding to the steering-only or hybrid bundle.

This example illustrates how privacy-preserving steering enables minimum-necessary disclosure while preserving enforcement, determinism, and auditability. The example is provided for enablement and does not limit the scope or form of steering representations.

Illustrative Use Scenarios

The following examples are provided to illustrate operation of the ENGRAM layer in representative scenarios. These examples are non-limiting and do not alter the scope of the invention, which is defined by the governed, non-bypassable pre-inference context control mechanisms described herein.

In a non-limiting example, a patient interaction triggers assembly of a contextualized checklist. The system retrieves a candidate set of Checklist Atoms and supporting patient scoped ENGRAM memory elements including medications, allergies, prior procedures, contraindications, and temporal validity metadata. The memory gate evaluates the candidate set under an applicable policy snapshot identifier (or policy digest) and one or more integrity criteria to determine an admitted set of Checklist Atoms and supporting memory elements eligible for contextual influence. Checklist Atoms rendered redundant, contraindicated, stale, contradictory, or otherwise non-admissible are denied, suppressed, transformed into verification steps, and/or assigned reliance states requiring confirmation. The system deterministically parameter-binds eligible Checklist Atoms using admissible patient scoped ENGRAM memory elements to produce patient-specific questions or instruction steps rather than generic prompts, and assembles an included set of checklist content in deterministic ordering subject to recorded dependencies and governance rules. In various embodiments, downstream reliance on outputs dependent on checklist responses is blocked unless checklist reliance state requirements are satisfied and corresponding readiness artifacts verify successfully at an acceptance endpoint under a fail-closed policy. The audit trail records checklist eligibility outcomes, parameter binding inputs, ordering decisions, reliance states, and associated bundle identifiers to support deterministic replay and compliance review.

In one example, a task request seeks to evaluate medication options for a patient. The ENGRAM layer retrieves a candidate set of memory atoms corresponding to current medications, known allergies, prior adverse reactions, and relevant baseline conditions from the patient partitioned ENGRAM memory. The memory gate evaluates these candidates under the applicable policy snapshot identifier (or policy digest) and integrity criteria, denies or transforms any inadmissible atoms, and assembles a governed context bundle subject to a context capacity constraint. In some embodiments, an admitted set of memory atoms is larger than an included set of memory atoms incorporated into the governed context bundle due to the context capacity constraint, deterministic ordering rules, or compartmentalization rules. If required atom classes cannot be admitted, an omission event or insufficient-context state is recorded and execution is denied or limited, and/or reliance is denied or deferred, under a fail-closed policy. The reasoning model receives only the governed context bundle as patient scoped contextual input and produces output constrained by admitted context and steering indicators, if applicable.

In another example, a task request involves assessing changes in patient status relative to a longitudinal baseline. The ENGRAM layer retrieves a candidate set of memory atoms representing historical baselines and recent measurements. The memory gate evaluates temporal validity, provenance sufficiency, and contradiction indicators, admitting only those atoms that satisfy the applicable policy snapshot identifier (or policy digest) and integrity criteria. The governed context bundle includes both baseline and recent context in a deterministic ordering, enabling the reasoning model to operate over a bounded and policy-compliant representation of longitudinal change.

In a cross-institution scenario, a task request requires consideration of patient information originating from multiple institutions. Each institution maintains its own ENGRAM memory under local governance control. The ENGRAM layer evaluates a candidate set of external memory atoms or derived representations under a policy snapshot incorporating inter-institutional constraints. Where disclosure of raw data is not authorized, the memory gate generates abstracted or steering-only representations. The governed context bundle assembled for execution includes only content admitted under the applicable policy snapshot identifier (or policy digest), and audit records capture the source and governance conditions of admitted representations.

In another example, a healthcare organization accesses a third-party hosted reasoning model. The ENGRAM layer assembles a governed context bundle or steering-only bundle that includes policy-admitted facts and obfuscated steering indicators derived from sensitive attributes. The third-party model receives only the governed bundle and is prevented from accessing underlying patient records. Execution of the third-party model is conditioned on presentation of a governed execution package including the governed context bundle and a gate produced governance artifact bound to the bundle identifier and the applicable policy snapshot identifier (or policy digest). The audit trail records the bundle identifier, applicable policy snapshot identifier (or policy digest), and model identifier to support later verification of governed execution. Tool calls, secondary retrieval, and context expansion are permitted only through governed connectors that require presentation of gate produced governance artifacts. Invocation requests lacking a valid gating token, bundle identifier, and applicable policy snapshot identifier (or policy digest) are rejected prior to releasing any governed context bundle, thereby preventing third-party execution using ungoverned patient scoped context.

In one embodiment, ENGRAM memory is constructed from data sources spanning multiple institutions, systems, or repositories. The ENGRAM builder may perform patient identity resolution using one or more identifiers, demographic attributes, encounter identifiers, device identifiers, or other linkage features to associate source records with a patient partition. In one embodiment, when a candidate set of memory atoms is retrieved from a remote institution or external repository, a source-institution memory gate is executed prior to exporting any memory atom or derived representation, such that export is limited to information that satisfies the remote applicable policy snapshot identifier (or policy digest) and minimum-necessary criteria. In one embodiment, exported information comprises a redacted, abstracted, or steering-only representation when raw data export is prohibited.

These examples demonstrate that the ENGRAM layer governs contextual memory and model input construction consistently across diverse workflows while enforcing non-bypassable pre-inference gating, bounded context assembly, and deterministic replay. The examples do not limit the invention to any particular clinical task, model architecture, or deployment environment.

Optional Integration with External Governance Components

In some embodiments, the ENGRAM layer operates in coordination with additional governance, arbitration, or effectuation-control components described in related applications or systems. Such integrations are optional and are described to illustrate how the governed contextual memory mechanisms disclosed herein may be incorporated into a broader governance architecture. The present invention does not require such integration and is fully operable independently of any particular downstream governance component.

In embodiments including such integration, governed context bundles, steering profiles, and associated governance artifacts produced by the ENGRAM layer may be provided to downstream components configured to perform additional control functions. In such embodiments, downstream components consume only governed context artifacts and governance identifiers produced by the ENGRAM layer, and do not receive patient scoped memory atoms except as included within a governed context bundle assembled from admitted content. These functions may include, without limitation, deterministic arbitration among multiple reasoning outputs, construction of evidence packs for regulatory or compliance purposes, render-token or output gating, or effectuation gating at downstream acceptance endpoints. In such embodiments, the ENGRAM layer functions as the contextual-memory governance module responsible for pre-inference admission, bounded context assembly, and deterministic replay, while downstream components consume ENGRAM outputs only through interfaces that require verification of the bundle identifier and applicable policy snapshot identifier (or policy digest) and, where applicable, verification of a gate produced governance artifact at a constrained execution interface, without weakening the non-bypassable enforcement model described herein.

Importantly, integration with prior or related work does not relax or modify the pre-inference gating, fail-closed behavior, or determinism enforced by the ENGRAM layer. Any downstream governance or effectuation-control mechanisms operate on outputs and artifacts generated by the ENGRAM layer and do not introduce alternative pathways for contextual information to influence reasoning or reliance without passing through the memory gate and governed context bundle assembly pipeline. Downstream components are not authorized to admit additional patient scoped contextual content for inference and do not perform admission decisions that substitute for the memory gate. Where verification of such governance artifacts fails, downstream components enforce fail-closed denial or deferral of reliance events rather than accepting ungoverned outputs.

This description of optional integration is provided for enablement and architectural clarity and does not limit the scope of the invention or require use of any particular external system, governance framework, or effectuation-control mechanism.

DETAILED DESCRIPTION OF THE FIGURES

FIG. 1—System Architecture

FIG. 1 illustrates an example system architecture in which an ENGRAM contextual memory governance system operates as a pre-inference control plane governing how patient scoped contextual information is admitted, assembled, and provided to one or more reasoning models or agents. The illustrated architecture depicts governance of contextual information prior to computation and, in some embodiments, conditioning of downstream reliance on model output using governance artifacts produced by the ENGRAM layer. As illustrated by the inset of FIG. 1, patient-related data sources 110—including EMR systems, third-party pipelines, or governance engines—feed the ENGRAM builder 120 and ENGRAM store 130 upstream of the memory gate 160, and prior to any governed execution component (e.g., reasoning model, agent, or orchestration component) execution.

ENGRAM contextual representations, including memory atoms, are prepared upstream and governed prior to inference; reasoning models and agents do not generate, modify, or authorize ENGRAM memory atoms.

As shown in FIG. 1, an ENGRAM governance system 100 is operatively coupled to one or more patient-related data sources 110. The patient-related data sources 110 may include, without limitation, clinical, operational, administrative, or device-derived systems such as an electronic medical record system, laboratory or pharmacy systems, imaging systems, clinician documentation systems, device telemetry systems, or other patient-associated data repositories. The ENGRAM governance system 100 does not require that patient scoped contextual information be produced by any particular upstream system and may interface with data originating from heterogeneous pipelines.

In the illustrated embodiment, patient scoped contextual information may be prepared upstream by any of: (i) an electronic medical record or clinical system vendor pipeline; (ii) a third-party extractor, normalizer, or aggregation service; and/or (iii) a governance or preparation engine. Regardless of origin, such contextual information is treated by the ENGRAM governance system 100 as candidate input subject to governance controls described herein, rather than as authorized model input.

The ENGRAM governance system 100 includes an ENGRAM builder 120 configured to generate, normalize, or ingest discrete contextual units referred to as memory atoms from patient-related data obtained from the data sources 110. The ENGRAM builder 120 produces memory atoms associated with a patient identity and stores them in an ENGRAM store 130. The ENGRAM store 130 maintains patient partitioned collections of memory atoms such that contextual information associated with one patient identity is isolated from contextual information associated with other patient identities.

A retrieval engine 150 is configured to receive a task request 600 associated with a patient identity and to select, from the ENGRAM store 130, a candidate set of memory atoms responsive to the task request. The retrieval engine 150 performs candidate selection without authorizing disclosure, admission, or use of the memory atoms for computation.

The candidate set of memory atoms selected by the retrieval engine 150 is provided to a non-bypassable memory gate 160. The memory gate 160 operates prior to execution of a governed execution component and evaluates each candidate memory atom under an applicable policy snapshot identifier (or policy digest) and one or more integrity criteria. The memory gate 160 determines an admissibility state for each evaluated memory atom and produces governance artifacts identifying which memory atoms, if any, may be used for computation and in what form.

Memory atoms admitted by the memory gate 160 are provided to a governed context bundle assembler 180. The governed context bundle assembler 180 assembles a governed context bundle using only the admitted set of memory atoms, subject to deterministic ordering rules and one or more context capacity constraints, and selects an included set of memory atoms from the admitted set for placement into the governed context bundle, the governed context bundle being identified by a bundle identifier and bound to the applicable policy snapshot identifier (or policy digest).

Execution of a governed execution component 206 is mediated by an execution interface 200. In some embodiments, the memory gate 160 issues an execution governance artifact 170 directly to the execution interface 200, the execution governance artifact 170 evidencing successful completion of memory gate evaluation and being verifiable independent of the transmission path of the governed context bundle, while execution remains conditioned on use of a governed context bundle assembled from the admitted set of memory atoms. The execution interface 200 conditions execution of the governed execution component 206 on presentation of the governed context bundle or an execution governance artifact (170) produced by the memory gate 160, such that execution using patient scoped contextual information other than the governed context bundle is prevented. In this manner, the ENGRAM governance system 100 enforces a trap-before-run execution model in which governed context assembly is a precondition of computation. The governed execution component 206 consumes governed context bundles produced by the ENGRAM governance system and does not generate, update, or modify ENGRAM memory atoms.

In various embodiments, non-bypassable enforcement is implemented at one or more enforcement locations including: (i) a model access gateway or execution interface that rejects invocation unless accompanied by a valid bundle identifier or gate produced governance artifact; (ii) one or more governed connectors that require presentation of a gate token bound to an applicable policy snapshot identifier for tool access or context expansion; and (iii) one or more acceptance endpoints that block reliance events unless a readiness artifact verifies as bound to the governed context bundle and the applicable policy snapshot identifier.

In some embodiments, the governed context bundle produced by the ENGRAM layer is used as, or incorporated into, a deterministically constructed evidence pack supplied to a reasoning model and to one or more downstream arbitration, verification, or rendering components. In such embodiments, governance identifiers generated by the ENGRAM layer, including at least a bundle identifier and an applicable policy snapshot identifier, are bound to downstream verification or rendering tokens such that output is eligible for rendering, export, or reliance only when traceable to a governed context bundle admitted under recorded governance conditions. These embodiments enable downstream truth-enforcement mechanisms to verify that outputs originate exclusively from admissible, policy-compliant contextual inputs, without requiring the ENGRAM layer to implement or assume any particular arbitration or rendering logic.

In some embodiments, output generated by the governed execution component 206 is provided to a governed connector 210 positioned upstream of an acceptance endpoint 212. The governed connector 210 conditions acceptance of a reliance event at the acceptance endpoint 212 on presentation of a readiness artifact bound to the governed context bundle and the applicable policy snapshot identifier (or policy digest). When the readiness artifact is absent, invalid, or inconsistent, the governed connector 210 denies or defers the reliance event, thereby enforcing a reliance boundary distinct from execution conditioning.

The ENGRAM governance system 100 further includes an audit subsystem 220 configured to record governance records produced during retrieval, gating, context assembly, execution conditioning, and, where applicable, reliance conditioning. The governance records include identifiers of the admitted set of memory atoms, the applicable policy snapshot identifier (or policy digest), bundle identifiers, and related governance artifacts sufficient to enable deterministic reconstruction and verification of governed context usage for the task request.

REFERENCE NUMERALS

100—ENGRAM GOVERNANCE SYSTEM
110—PATIENT-RELATED DATA SOURCES
120—ENGRAM BUILDER
130—ENGRAM STORE
150—RETRIEVAL ENGINE
600—TASK REQUEST
160—MEMORY GATE
170—EXECUTION GOVERNANCE ARTIFACT
180—GOVERNED CONTEXT BUNDLE ASSEMBLER
200—EXECUTION INTERFACE
206—GOVERNED EXECUTION COMPONENT
210—GOVERNED CONNECTOR
212—ACCEPTANCE ENDPOINT
220—AUDIT SUBSYSTEM

FIG. 2—Memory Atom Structure

FIG. 2 illustrates an example structure of a memory atom as maintained within the ENGRAM contextual memory governance system. The memory atom represents a discrete, patient scoped machine-addressable unit of contextual information that may be selected into a candidate set of memory atoms for evaluation and, if admitted, included in a governed context bundle.

As shown in FIG. 2, a memory atom 300 comprises a contextual content portion 302 associated with a patient identity. The contextual content portion 302 may represent, without limitation, a factual datum, baseline parameter, constraint, summary, derived feature, or other contextual information suitable for use by a governed execution component when admitted by the memory gate. Memory atoms may represent summaries or abstracted contextual content, and may serve as source material from which steering representations are derived.

The memory atom 300 further includes provenance metadata 304 associated with the contextual content portion 302. The provenance metadata 304 identifies the source, acquisition pathway, and integrity-related attributes of the contextual content, enabling evaluation of provenance sufficiency during memory gate operation. Provenance metadata may include, without limitation, source identifiers, attestation indicators, trust classifications, or acquisition timestamps.

Temporal validity metadata 306 is associated with the memory atom 300 and specifies temporal attributes governing the validity of the contextual content portion 302. Temporal validity metadata 306 may include an effective time, expiration time, decay rule, or version indicator, enabling determination of freshness and applicability of the memory atom during retrieval and admissibility evaluation.

In some embodiments, the memory atom 300 includes one or more policy or governance attributes 308. The policy or governance attributes 308 may include policy tags, consent indicators, sensitivity classifications, or obligation tags used by the memory gate to evaluate admissibility, transformation, or post-admission handling requirements. Such attributes are evaluated under an applicable policy snapshot identifier (or policy digest) during memory gate operation.

In some embodiments, the memory atom 300 includes integrity-related indicators 310. The integrity-related indicators 310 may include quality scores, contradiction indicators, taint flags, or poisoning indicators identifying potential exposure to untrusted input or adversarial manipulation. Such indicators are evaluated by the memory gate as part of integrity criteria prior to admission.

In some embodiments, the memory atom 300 includes a version identifier 312. The version identifier 312 distinguishes different temporal or derived versions of contextual content and supports append-only lineage, audit, and deterministic replay. Updates to contextual content may be represented as new memory atom versions rather than overwriting prior versions.

The illustrated structure of the memory atom 300 is provided as a non-limiting example. Implementations may include additional fields, omit fields, or represent the illustrated attributes in different data structures, provided that the memory atom maintains association between contextual content and sufficient metadata to support governed retrieval, admissibility evaluation, and replay as described herein.

REFERENCE NUMERALS

300—MEMORY ATOM
302—CONTEXTUAL CONTENT PORTION
304—PROVENANCE METADATA
306—TEMPORAL VALIDITY METADATA
308—POLICY OR GOVERNANCE ATTRIBUTES
310—INTEGRITY-RELATED INDICATORS
312—VERSION IDENTIFIER

Figure 3:
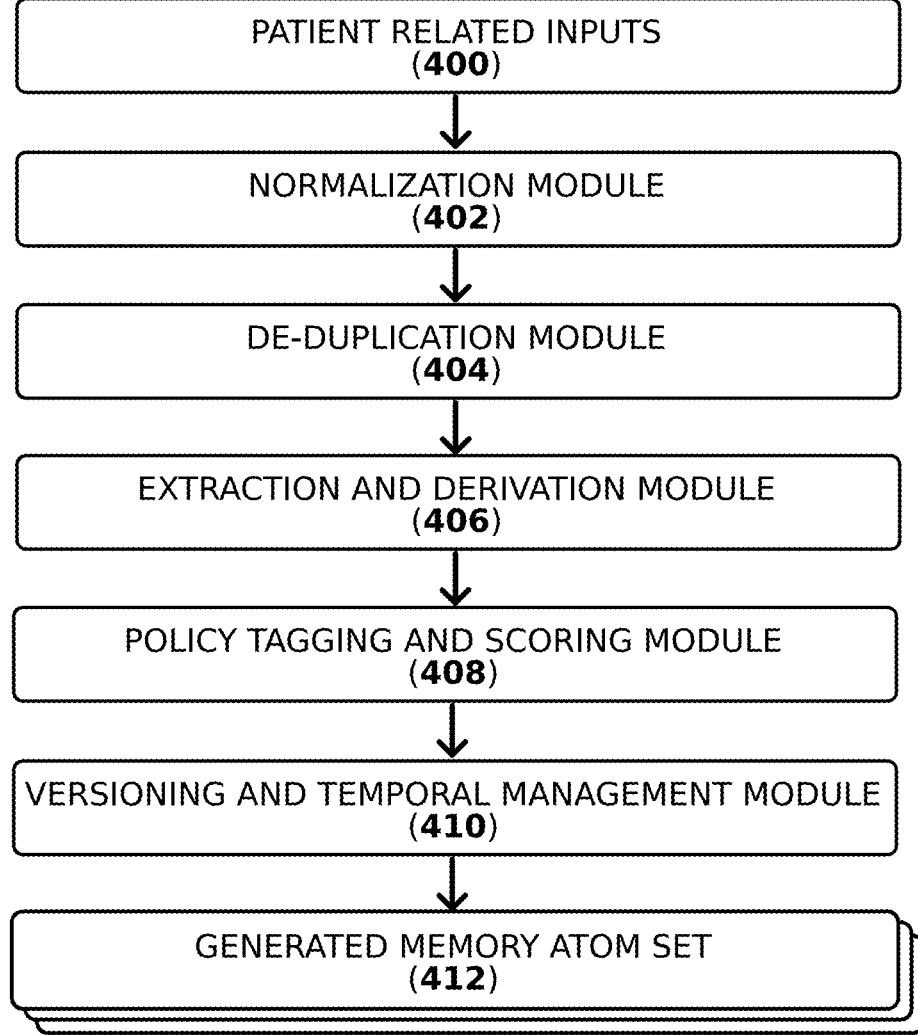
FIG. 3 illustrates an example ENGRAM builder pipeline for generating patient scoped memory atoms from heterogeneous clinical and operational data sources.

FIG. 3—ENGRAM Builder Pipeline

FIG. 3 illustrates an example ENGRAM builder pipeline for generating patient scoped memory atoms from heterogeneous clinical and operational data sources. The ENGRAM builder pipeline produces discrete memory atoms annotated with metadata suitable for governed storage, governed retrieval, subsequent memory gate admissibility evaluation, and deterministic replay as described herein.

As shown in FIG. 3, patient-related inputs 400 are received from one or more source systems and may include structured data, semi-structured data, unstructured text, or multimodal signals. The inputs 400 are processed by a normalization module 402 that applies identifier normalization, timestamp normalization, coding scheme normalization, and patient association mapping operations to the received inputs, thereby producing normalized representations suitable for storage and processing as patient scoped content derived from heterogeneous sources.

The normalized inputs are processed by a de-duplication module 404 configured to detect duplicate or overlapping representations and to reduce redundant content prior to memory atom formation. In some embodiments, the de-duplication module 404 further identifies conflicts among overlapping sources and emits contradiction indicators or conflict markers suitable for later integrity evaluation.

An extraction and derivation module 406 processes the de-duplicated inputs to generate memory atom content. In various embodiments, the extraction and derivation module 406 maps source fields into one or more memory atom schemas, extracts salient constraints, baselines, summaries, or modality-derived features, and generates derived contextual representations as memory atom content. The extraction and derivation module 406 may further associate memory atom content with provenance metadata and temporal validity metadata suitable for later policy and integrity evaluation.

A governance metadata tagging module 408 associates governance-related attributes with the memory atoms for later evaluation by the memory gate under an applicable policy snapshot identifier (or policy digest). In various embodiments, the policy tagging and scoring module 408 assigns policy tags, sensitivity classifications, consent indicators, or quality indicators to memory atoms based on source characteristics, data types, and organizational governance rules. Such governance-related attributes are recorded as metadata and are evaluated by the memory gate under an applicable policy snapshot identifier (or policy digest) when the memory atom is considered for use in a task.

A versioning and temporal management module 410 assigns version identifiers, effective times, and temporal validity attributes to memory atoms. In some embodiments, updates to contextual content are stored as new memory atom versions rather than overwriting prior versions, thereby preserving append-only lineage and enabling deterministic reconstruction of contexts corresponding to historical task executions.

The ENGRAM builder pipeline outputs a plurality of memory atoms in generated memory atom set 412 for storage in the ENGRAM store. The ENGRAM builder pipeline is described as a non-limiting example, and implementations may vary in module boundaries, ordering, or internal processing, provided that the pipeline produces patient-associated memory atoms annotated with metadata sufficient to support governed retrieval, admissibility evaluation, and replay.

REFERENCE NUMERALS

400—PATIENT-RELATED INPUTS
402—NORMALIZATION MODULE
404—DE-DUPLICATION MODULE
406—EXTRACTION AND DERIVATION MODULE
408—POLICY TAGGING AND SCORING MODULE
410—VERSIONING AND TEMPORAL MANAGE-
    MENT MODULE
412—GENERATED MEMORY ATOM SET

Figure 4:
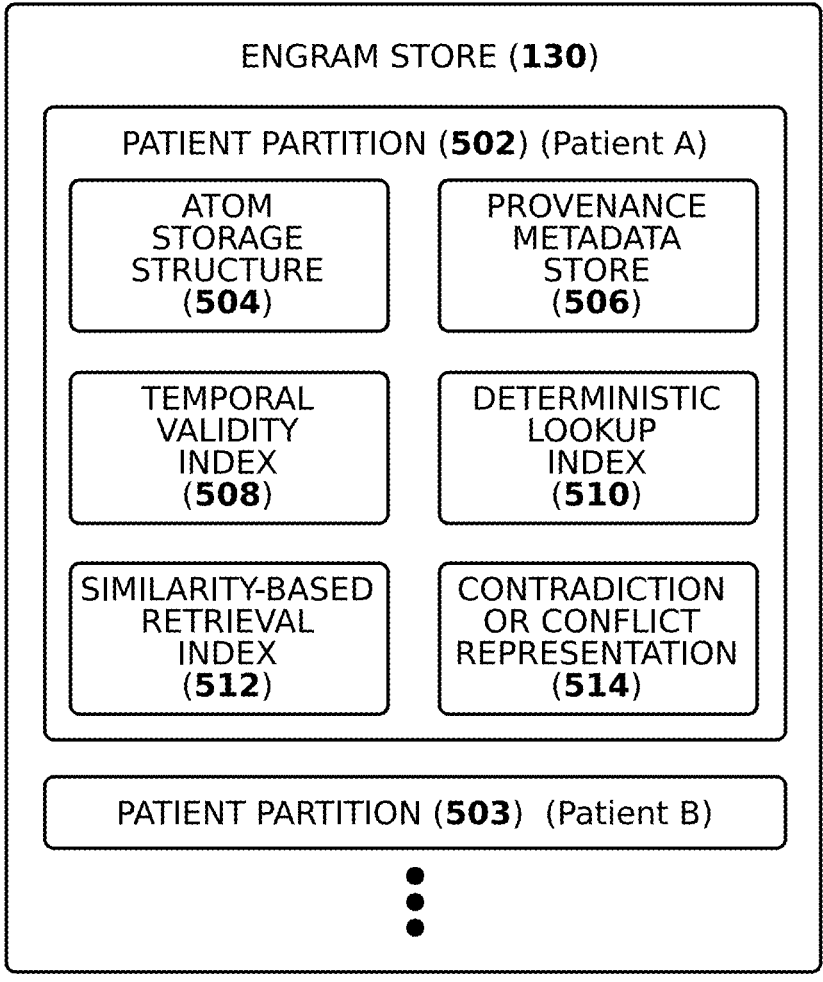
FIG. 4 illustrates an example ENGRAM store implementing patient partitioning and storage structures supporting governed retrieval of memory atoms.

FIG. 4—ENGRAM Store and Patient Partitioning

FIG. 4 illustrates an example ENGRAM store implementing patient partitioning and storage structures supporting governed retrieval of memory atoms. The ENGRAM store maintains patient scoped contextual memory in a manner that enforces isolation between patient identities and supports admissibility evaluation by the memory gate, audit, and deterministic replay.

Patient partitions 502 and 503 are shown as non-limiting examples of distinct patient identities maintained in isolation within the ENGRAM store 130.

As shown in FIG. 4, an ENGRAM store 130 maintains a plurality of patient partitions, including partitions 502 and 503, each patient partition being associated with a corresponding patient identity. Memory atoms associated with a given patient identity are stored within the corresponding patient partition 502 or 503 such that retrieval and export operations are constrained to the target patient unless an explicit policy authorized operation permits broader access. Any such export remains subject to memory gate evaluation prior to any execution or reliance.

Within each patient partition 502, 503, the ENGRAM store 130 maintains one or more storage structures for memory atoms. In the illustrated embodiment, the storage structures include an atom storage structure 504 configured to store memory atoms and associated identifiers, and a provenance metadata store 506 configured to store provenance-related attributes associated with the memory atoms. The ENGRAM store 130 further maintains a temporal validity index 508 configured to support queries based on effective time, expiration time, or freshness criteria.

The ENGRAM store 130 may further include one or more retrieval-supporting indices. In the illustrated embodiment, the retrieval-supporting indices include a deterministic lookup index 510 configured to support retrieval of memory atoms based on identifiers or predefined inclusion rules, and a similarity-based retrieval index 512 configured to support ranking or selection of memory atoms based on semantic or modality-derived features. The illustrated indices are provided as non-limiting examples, and the ENGRAM store 130 is not limited to a particular database technology or retrieval implementation.

In some embodiments, the ENGRAM store 130 further maintains a contradiction or conflict representation 514 identifying conflicting or overlapping memory atoms, such representations being evaluated by the memory gate during admissibility determination rather than resolved at storage time. In some embodiments, the contradiction or conflict representation 514 comprises contradiction set objects referencing atom identifiers and contradiction metadata usable by the memory gate for policy-bound, deterministic contradiction resolution and replay. Such contradiction representations may be evaluated by the memory gate during admissibility determination and may influence transformation, weighting, or denial of memory atoms.

The ENGRAM store 130 provides stored memory atoms and associated metadata to a retrieval engine for candidate selection but does not itself authorize use of memory atoms for computation. Authorization to use memory atoms for execution is determined exclusively by the memory gate operating under an applicable policy snapshot identifier (or policy digest) and integrity criteria, as described herein.

REFERENCE NUMERALS

Figure 5:
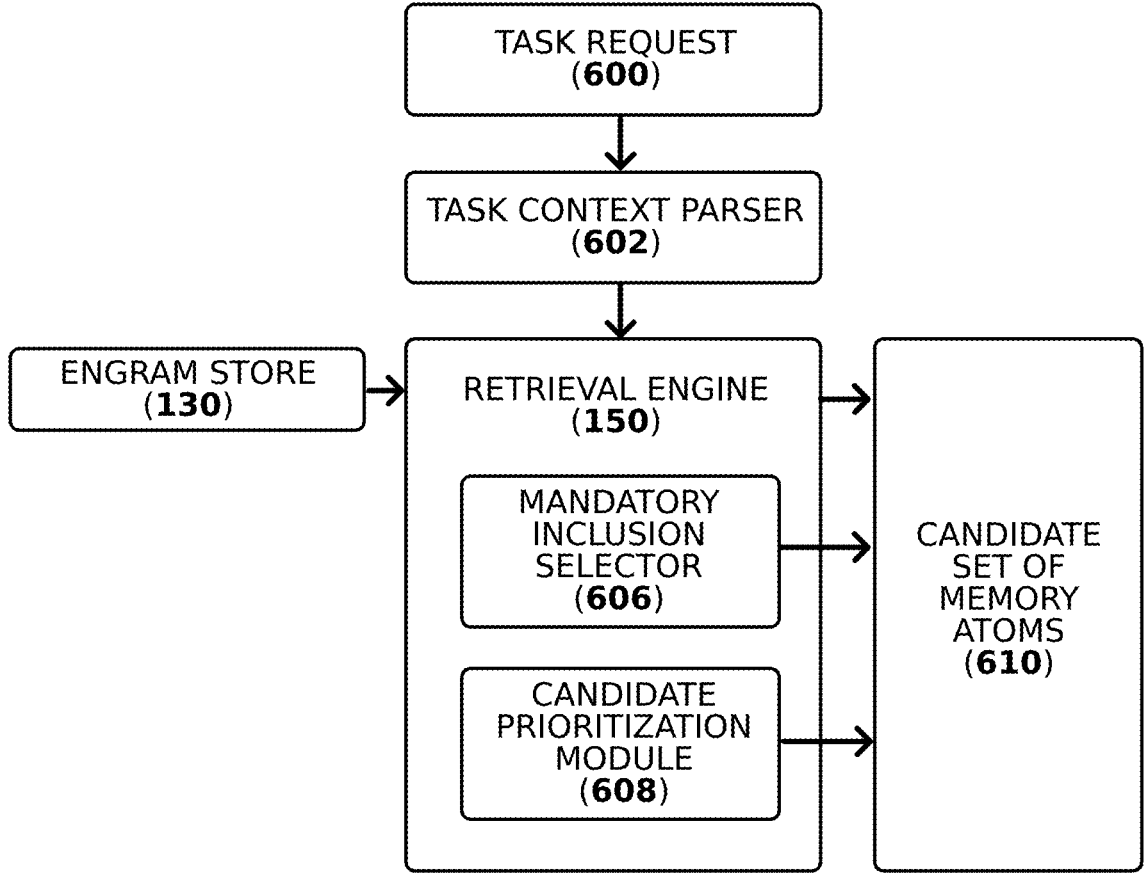
FIG. 5 illustrates an example retrieval engine selecting a candidate set of memory atoms responsive to a task request associated with a patient identity.

130—ENGRAM STORE
502—PATIENT PARTITION (Patient A)
503—PATIENT PARTITION (Patient B)
504—ATOM STORAGE STRUCTURE
506—PROVENANCE METADATA STORE
508—TEMPORAL VALIDITY INDEX
510—DETERMINISTIC LOOKUP INDEX
512—SIMILARITY-BASED RETRIEVAL INDEX
514—CONTRADICTION OR CONFLICT REPRESEN-
    TATION FIG. 5—Retrieval Engine and Candidate Selection FIG. 5 illustrates an example retrieval engine selecting a candidate set of memory atoms responsive to a task request associated with a patient identity. The retrieval engine performs candidate selection to identify potentially relevant contextual information without authorizing disclosure or use of such information for computation.

As shown in FIG. 5, a task request 600 is received by a task context parser 602. The task request 600 may identify a patient identity, a request type, a role or purpose-of-use context, and one or more task constraints, without itself enforcing policy or admissibility constraints. The task context parser 602 derives task context parameters from the task request, which may include task category identifiers, time scope parameters, or mandatory candidate class inclusion requirements associated with the task.

The derived task context parameters are provided to a retrieval engine 150. The retrieval engine 150 is configured to query an ENGRAM store 130 to identify a candidate set of memory atoms associated with the patient identity. In various embodiments, the retrieval engine 150 performs deterministic retrieval using predefined inclusion rules and identifiers and may further perform similarity-based retrieval using semantic or modality-derived features to rank additional memory atoms for inclusion in the candidate set of memory atoms.

In the illustrated embodiment, the retrieval engine 150 includes a mandatory inclusion selector 606 configured to select memory atoms belonging to designated mandatory classes for candidate evaluation, such as baseline constraints or other clinically material information required for safe task execution. The retrieval engine 150 further includes a candidate prioritization module 608 configured to rank additional candidate memory atoms based on relevance, recency, provenance class, or contradiction indicators.

In some embodiments, the retrieval engine 150 prioritizes or demotes candidate atoms based on contradiction set membership or stale/inconsistent status metadata, while deferring admissibility and resolution decisions to the memory gate.

The output of the retrieval engine 150 is a candidate set of memory atoms 610 comprising memory atoms selected as potentially relevant to the task request 600. The candidate set of memory atoms 610 is provided to the memory gate for admissibility evaluation. The retrieval engine 150 does not itself perform policy evaluation, integrity evaluation, or admissibility determination, and does not authorize use of the candidate set of memory atoms for execution.

REFERENCE NUMERALS

600—TASK REQUEST
602—TASK CONTEXT PARSER
150—RETRIEVAL ENGINE
606—MANDATORY INCLUSION SELECTOR
608—CANDIDATE PRIORITIZATION MODULE
610—CANDIDATE SET OF MEMORY ATOMS
130—ENGRAM STORE
FIG. 6—Memory Gate with Trap-Before-Run Enforcement FIG. 6 illustrates a non-bypassable, fail-closed memory gate enforcing admissibility evaluation of candidate set of memory atoms and conditioning execution of a governed execution component on gate produced governance artifacts. The illustrated memory gate operates as a precondition of execution and functions as an execution control mechanism rather than an advisory filter.

As shown in FIG. 6, a candidate set of memory atoms 610 produced by a retrieval engine is provided to a memory gate 160. The memory gate 160 receives, as inputs, an applicable policy snapshot identifier (or policy digest) 162 and one or more integrity criteria 164 defining admissibility requirements for the task request. The memory gate 160 evaluates each memory atom in the candidate set of memory atoms 610 under the applicable policy snapshot identifier (or policy digest) 162 and the integrity criteria 164.

For each evaluated memory atom, the memory gate 160 produces an admissibility determination 166. Admissibility determinations may include, without limitation, admission of the memory atom in data-bearing form, denial of the memory atom, admission in redacted form, admission in abstracted form, or admission with attenuated influence via an associated weighting parameter. Memory atoms for which admissibility cannot be established are denied or transformed to non-data-bearing representations under a fail-closed default.

The memory gate 160 outputs an admitted set of memory atoms 168, together with any associated transformations, weights, or governance attributes. The admitted set of memory atoms 168 is provided to a governed context bundle assembler 180 for construction of a governed context bundle. Memory atoms not included in the admitted set of memory atoms 168 are not accessible to the reasoning system.

In addition to determining admissibility, the memory gate 160 produces one or more execution governance artifacts 170 bound to the applicable policy snapshot identifier (or policy digest) 162 and the admitted set of memory atoms 168. The execution governance artifacts 170 include identifiers or tokens indicating successful completion of memory gate evaluation for execution authorization, distinct from reliance readiness artifacts used to condition downstream effectuation.

Execution of a governed execution component 206 is mediated by an execution interface 200 operatively coupled to the memory gate 160. In various embodiments, the execution interface rejects invocation requests unless accompanied by a gate produced governance artifact bound to at least the applicable policy snapshot identifier and a bundle identifier (or to identifiers of the admitted set of memory atoms from which the bundle identifier is derived). The execution interface 200 conditions execution of the governed execution component 206 on presentation of a valid execution/reliance governance artifact 170 produced by the memory gate 160. When a valid execution governance artifact is absent, invalid, or inconsistent with the admitted set of memory atoms 168 or the applicable policy snapshot identifier (or policy digest) 162, the execution interface 200 prevents execution of the governed execution component 206 using patient scoped contextual information by rejecting invocation requests that do not present a valid execution governance artifact produced by the memory gate.

By enforcing execution conditioning at the execution interface 200, the memory gate 160 implements a trap-before-run enforcement model in which admissibility evaluation and governed context assembly are mandatory preconditions of computation. In this manner, the memory gate 160 converts contextual memory from an advisory input into an enforced execution prerequisite and prevents bypass of governance controls by direct model invocation or ungoverned context access.

REFERENCE NUMERALS

160—MEMORY GATE
162—APPLICABLE POLICY SNAPSHOT IDENTI-
    FIER
164—INTEGRITY CRITERIA
166—ADMISSIBILITY DETERMINATION
168—ADMITTED SET OF MEMORY ATOMS
170—EXECUTION GOVERNANCE ARTIFACT
180—GOVERNED CONTEXT BUNDLE ASSEM-
    BLER
200—EXECUTION INTERFACE
206—GOVERNED EXECUTION COMPONENT
610—CANDIDATE SET OF MEMORY ATOMS
FIG. 7—Two-Phase Memory Gate Evaluation FIG. 7 illustrates an example two-phase evaluation performed by the memory gate in which admissibility determination and reliance readiness determination are logically separated while remaining part of a single, non-bypassable governance mechanism. The illustrated phases represent sequential evaluation stages applied to the same candidate set of memory atoms under a single applicable policy snapshot identifier and do not represent independent authorization components or separate gating subsystems.

As shown in FIG. 7, a candidate set of memory atoms 610 is evaluated by a memory gate 160 during an admissibility phase 702. During the admissibility phase 702, the memory gate 160 evaluates each candidate memory atom under the applicable policy snapshot identifier and one or more integrity criteria, including provenance verification, temporal validity evaluation, source trust classification, conflict detection, and completeness evaluation. The admissibility phase 702 determines whether each candidate memory atom may be used to generate output by a governed execution component, and further determines whether the atom is admitted in data-bearing form, admitted in a transformed form including redaction, abstraction, or attenuation, or denied.

The admissibility phase 702 produces an admitted set of memory atoms 168 comprising only memory atoms for which admissibility is established. Candidate memory atoms for which admissibility cannot be established are denied or transformed to non-data-bearing representations. When one or more designated mandatory classes of memory atoms cannot be admitted under the applicable policy snapshot identifier or integrity criteria, the memory gate 160 may generate an omission event or designate an insufficient-context state, as described herein, resulting in denial of execution of the governed execution component rather than proceeding with incomplete or unverified context.

Following admissibility evaluation and prior to issuance of any reliance authorization, the admitted set of memory atoms 168 is further evaluated by the memory gate 160 during a reliance readiness phase 704. During the reliance readiness phase 704, the memory gate 160 evaluates whether output generated using the admitted set of memory atoms 168 is eligible to be relied upon for downstream effectuation or state-changing actions. reliance readiness evaluation may apply stricter or additional criteria than admissibility evaluation, including higher provenance sufficiency thresholds, contradiction resolution requirements, mandatory atom class satisfaction, or task-specific safety predicates.

When reliance readiness criteria are satisfied, the memory gate 160 issues a readiness artifact 706 bound to the applicable policy snapshot identifier and to a governed context bundle derived from the admitted set of memory atoms 168. The readiness artifact 706 is a machine-verifiable governance artifact used to condition acceptance of reliance events at governed connectors or acceptance endpoints.

When reliance readiness criteria are not satisfied, the memory gate 160 withholds issuance of the readiness artifact 706 while permitting inference output generation under admissibility-only conditions, provided that execution is otherwise authorized. In such cases, output generated by the governed execution component is explicitly restricted from downstream reliance, effectuation, or state-changing actions until reliance readiness predicates are satisfied or additional evidence is obtained.

Both the admissibility phase 702 and the reliance readiness phase 704 are evaluated deterministically by the memory gate 160. Outcomes of both phases, including admissibility determinations, transformations, omission events, insufficient-context states, and reliance readiness outcomes, are recorded as part of the governance record and cryptographically bound to bundle identifiers and applicable policy snapshot identifiers to support audit, deterministic replay, and external verification.

REFERENCE NUMERALS

160—MEMORY GATE
610—CANDIDATE SET OF MEMORY ATOMS
702—ADMISSIBILITY PHASE
704—RELIANCE READINESS PHASE
706—READINESS ARTIFACT
168—ADMITTED SET OF MEMORY ATOMS
FIG. 8—Governed Context Bundle Assembly FIG. 8 illustrates assembly of a governed context bundle from memory atoms admitted by the memory gate, including enforcement of context capacity constraints, deterministic ordering, context compartmentalization, and generation of a bundle identifier that cryptographically binds bundle composition to governance inputs. The governed context bundle functions as a bounded, machine-verifiable artifact required for execution of a governed execution component.

As shown in FIG. 8, an admitted set of memory atoms 168 produced by the memory gate is provided to a governed context bundle assembler 180. The governed context bundle assembler 180 receives, as inputs, one or more context assembly rules 802 defining ordering, compartment priority, and inclusion criteria, as well as a context capacity constraint 804 defining a maximum allowable size of the governed context bundle.

The governed context bundle assembler 180 assigns the admitted set of memory atoms 168 to one or more context compartments 806. In the illustrated embodiment, the context compartments 806 include a mandatory constraint compartment 808 containing memory atom classes required for safe task execution, an optional contextual compartment 810 containing supplementary admitted memory atoms, and a steering-only compartment 812 containing abstracted or obfuscated steering representations produced by the memory gate, the steering representations being governed artifacts distinct from memory atoms and not treated as data-bearing contextual units. Assignment of memory atoms to context compartments is determined by governance attributes and admissibility outcomes produced by the memory gate.

The governed context bundle assembler 180 applies a deterministic ordering rule 814 to admitted set of memory atoms within and across the context compartments 806. Under application of the deterministic ordering rule 814, the ordering of admitted set of memory atoms is computed based on identifiers of the admitted set of memory atoms, compartment assignments, weighting parameters produced by the memory gate, the applicable policy snapshot identifier, and the recorded assembly rule set, such that identical inputs yield identical governed context bundle composition and ordering across executions.

The governed context bundle assembler 180 further enforces the context capacity constraint 804 by computing bundle size using a canonical serialization format and an associated tokenizer scheme identity 816. When insufficient capacity exists to include all admitted memory atoms, the governed context bundle assembler 180 applies deterministic selection rules based on compartment priority and weighting parameters rather than truncation or nondeterministic omission. When required content cannot be included due to capacity constraints, an omission event is recorded rather than silently proceeding with an incomplete context.

The output of the governed context bundle assembler 180 is a governed context bundle 190 identified by a bundle identifier 191. In various embodiments, the bundle identifier 191 is computed as a cryptographic digest over an ordered set of admitted memory atom identifiers together with governance-binding inputs including at least the applicable policy snapshot identifier, a task request identifier, and a recorded temporal validity window associated with the task request. The governed context bundle 190 is provided to an execution interface and, in some embodiments, to downstream governance components as a required artifact for execution and reliance conditioning.

REFERENCE NUMERALS

168—ADMITTED SET OF MEMORY ATOMS
180—GOVERNED CONTEXT BUNDLE ASSEMBLER
190—GOVERNED CONTEXT BUNDLE
191—BUNDLE IDENTIFIER
802—CONTEXT ASSEMBLY RULES
804—CONTEXT CAPACITY CONSTRAINT
806—CONTEXT COMPARTMENTS
808—MANDATORY CONSTRAINT COMPARTMENT
810—OPTIONAL CONTEXTUAL COMPARTMENT
812—STEERING-ONLY COMPARTMENT
814—DETERMINISTIC ORDERING RULE
816—TOKENIZER SCHEME IDENTITY

FIG. 9—Audit Trail, Evidence Bundle, and Deterministic Replay

FIG. 9 illustrates an audit trail, evidence bundle, and deterministic replay mechanism enabling reconstruction and verification of governed context usage for a task request. The illustrated audit and replay mechanisms record governance artifacts produced during memory gate evaluation and governed context bundle assembly and provide a tamper-evident, machine-verifiable record of what contextual information was permitted to influence execution and, where applicable, reliance.

As shown in FIG. 9, governance records 900 are generated by the ENGRAM governance system as part of the same pre-inference governance pipeline that enforces non-bypassable memory gating and context bundle assembly. The governance records 900 comprise append-only records cryptographically bound to governance identifiers and are maintained as a tamper-evident audit chain such that post-hoc alteration of governance decisions or artifacts is detectable during verification or replay.

The governance records 900 identify, without limitation, a task request identifier, candidate memory atom identifiers evaluated by the memory gate, per-atom admissibility determinations, transformation outcomes including redaction, abstraction, or attenuation, identifiers of memory atoms admitted by the memory gate, and identifiers of an included set of memory atoms placed into the governed context bundle. The governance records 900 further include the applicable policy snapshot identifier, integrity criteria identifiers, and execution boundary identifiers associated with the task request.

The governance records 900 are associated with an evidence bundle 902. The evidence bundle 902 is a machine-readable artifact that binds together governance-relevant identifiers, including identifiers of the admitted set of memory atoms, identifiers of the included set of memory atoms, and deterministic ordering rule identifiers and inputs sufficient to reproduce ordering under deterministic replay.

In various embodiments, the bundle identifier is computed as a cryptographic hash over an ordered list of identifiers of the included set of memory atoms and recorded governance inputs. The evidence bundle 902 further includes, or references, cryptographic integrity protections such as hash digests, signatures, or hash-chaining sufficient to detect substitution, omission, or modification of governance artifacts.

In the illustrated embodiment, the governance records 900 include a policy evaluation trace 904 identifying policy rule identifiers evaluated during memory gate operation and outcomes thereof. The policy evaluation trace 904 enables verification that admissibility determinations, transformations, omission events, insufficient-context states, reliance readiness outcomes, and execution conditioning decisions were produced by application of the recorded applicable policy snapshot identifier rather than by discretionary override or post-hoc modification.

The governance records 900 further include a dependency graph 906 establishing provenance closure for all contextual representations included in the governed context bundle. The dependency graph 906 links derived, abstracted, or steering representations to source memory atoms evaluated by the memory gate and identifies transformation steps applied prior to admission. The dependency graph 906 thereby establishes that all contextual inputs influencing execution originate from memory atoms evaluated under the applicable policy snapshot identifier and integrity criteria.

To support deterministic replay, the evidence bundle 902 and associated governance records 900 reference canonical replay inputs 908. The canonical replay inputs 908 include the canonical serialization format identifier, tokenizer scheme identity, deterministic ordering rule identifiers, context capacity computation parameters, and the applicable policy snapshot identifier (and, in some embodiments, a corresponding policy digest), such that reapplication of the recorded governance inputs yields the same governed context bundle composition and ordering. Deterministic replay is performed by reapplying recorded admissibility outcomes, transformations, ordering rules, and canonical serialization parameters to reconstruct the governed context bundle in the same composition, ordering, and size as originally produced. If verification of any recorded identifier, digest, signature, or hash-chain link fails, replay is treated as invalid and is rejected under a fail-closed policy.

As used herein, deterministic replay refers to deterministic reconstruction and verification of the governed context bundle and associated governance records and does not require or imply reproduction of output generated by a governed execution component. Replay verifies what contextual information was permitted for execution and under what governance conditions, independent of any non-deterministic behavior of the governed execution component.

The audit trail and evidence bundle illustrated in FIG. 9 support internal review, compliance verification, incident investigation, and external verification by authorized third parties. By recording sufficient governance artifacts to support tamper-evident, deterministic replay, the ENGRAM governance system provides a defensible and verifiable basis for establishing how contextual memory governed execution and reliance for a given task request.

FIG. 9A illustrates a non-limiting example of a tamper-evident audit chain used to record governance records. Each governance record includes a cryptographic hash referencing a prior governance record, thereby forming an append-only hash chain. In such embodiments, modification or removal of any governance record is detectable during verification or deterministic replay due to mismatch of recorded hash values. The hash-chained structure binds bundle identifiers, applicable policy snapshot identifiers, and ordering metadata into a verifiable sequence without requiring storage of underlying patient data.

REFERENCE NUMERALS

900—GOVERNANCE RECORDS
902—EVIDENCE BUNDLE
904—POLICY EVALUATION TRACE
906—DEPENDENCY GRAPH
908—CANONICAL REPLAY INPUTS

Figure 10:
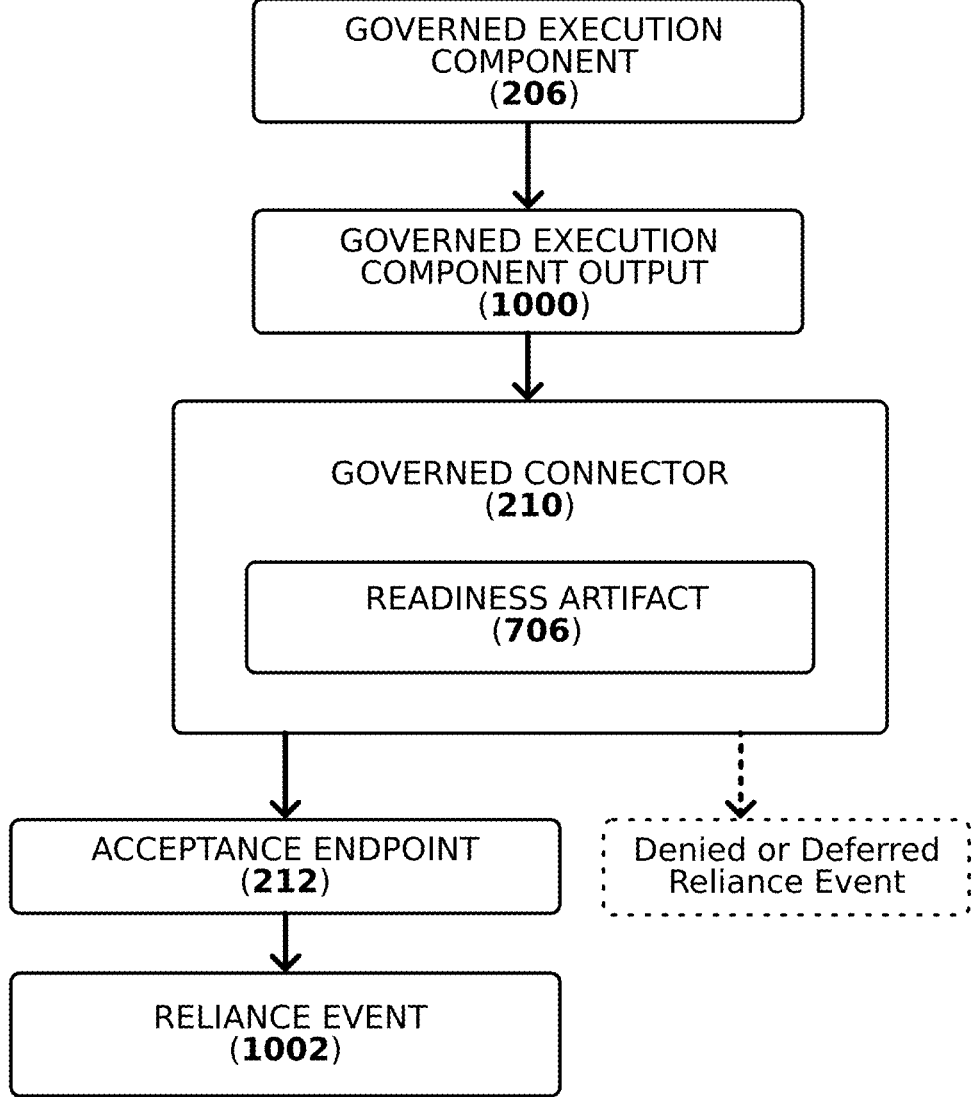
FIG. 10 illustrates a reliance boundary in which acceptance of a reliance event at an acceptance endpoint is conditioned on presentation of a readiness artifact bound to a governed execution package.

FIG. 10—Reliance Boundary and Acceptance Endpoint Gating

FIG. 10 illustrates a reliance boundary in which acceptance of a reliance event associated with output generated by a governed execution component is conditioned on presentation and verification of a readiness artifact bound to a governed context bundle and an applicable policy snapshot identifier. The reliance boundary enforces governance at the point where downstream systems would otherwise accept, commit, or effectuate a state-changing action based on model or agent output.

As shown in FIG. 10, governed execution component output 1000 generated by a governed execution component 206 is provided to a governed connector 210 positioned upstream of an acceptance endpoint 212. The acceptance endpoint 212 may comprise, without limitation, an interface for committing, finalizing, signing, dispatching, or writing output into a system of record, workflow system, or external service.

The governed connector 210 is configured to require presentation of a readiness artifact 706 associated with the governed execution component output 1000. In various embodiments, the governed connector denies or defers the reliance event at the acceptance endpoint unless the readiness artifact verifies as being cryptographically bound to at least (i) a bundle identifier and (ii) an applicable policy snapshot identifier. The readiness artifact 706 is a machine-verifiable governance artifact derived from governance records produced by the memory gate and is bound to at least a bundle identifier identifying the governed context bundle used during execution and an applicable policy snapshot identifier under which admissibility and reliance readiness were evaluated. In various embodiments, the readiness artifact 706 further includes an allowed-action scope, validity window, and cryptographic verification material. The governed connector 210 applies fail-closed behavior when the readiness artifact is absent, invalid, expired, revoked, or inconsistent.

Prior to permitting acceptance of a reliance event, the governed connector 210 verifies the readiness artifact 706 by validating its binding to the bundle identifier and applicable policy snapshot identifier and by confirming satisfaction of recorded reliance readiness predicates. Verification may include signature validation, digest comparison, expiration checks, and endpoint-scope evaluation.

When the readiness artifact 706 is present and valid, the governed connector 210 permits acceptance of a reliance event 1002 at the acceptance endpoint 212. When the readiness artifact 706 is absent, invalid, expired, or inconsistent with the bundle identifier or applicable policy snapshot identifier, the governed connector 210 denies or defers the reliance event 1002, thereby preventing downstream reliance on output generated under non-compliant or insufficient governance conditions.

In some embodiments, the governed connector 210 treats manual incorporation of the governed execution component output 1000 into a downstream system as a reliance event when a user initiates a state-changing operation at the acceptance endpoint 212. In such embodiments, reliance enforcement applies regardless of whether output is transmitted automatically, copied, transcribed, or incorporated through user action. Metadata associated with the reliance event 1002, the acceptance endpoint 212, and the verified readiness artifact 706 may be recorded as part of the audit trail to support later reconstruction and verification.

By enforcing reliance conditioning at the governed connector 210, the ENGRAM governance system applies acceptance checks that permit downstream state-changing actions only when output is associated with an admissible governed context bundle and satisfies recorded reliance readiness predicates. Under this enforcement model, inference execution and downstream reliance are governed as distinct control stages, and reliance events that lack valid governance artifacts are denied or deferred rather than accepted through ungoverned pathways.

Downstream Verification, Arbitration, and Rendering (Optional).

In certain embodiments, the governed context bundle produced by the memory gate and the governed context bundle assembler is treated as an evidence-bound input artifact for downstream verification, arbitration, or rendering functions, when present. By way of non-limiting example, the governed context bundle may be provided as, or incorporated into, a deterministically constructed evidence pack supplied to a reasoning model and to a downstream arbitration, verification, or rendering component that evaluates candidate outputs against the governed context bundle and associated governance identifiers. In such embodiments, output rendering, display, export, and/or acceptance events are conditioned on verification of a cryptographically verifiable token bound to at least the bundle identifier and the applicable policy snapshot identifier, thereby enforcing that only outputs traceable to admitted and governed context artifacts are eligible for presentation or downstream reliance.

Verification of the readiness artifact is performed by a machine-executed validation process and does not rely on human judgment or discretionary approval.

In one embodiment, a downstream render or verification token includes, or cryptographically binds to, at least the bundle identifier (or an evidence pack identifier derived therefrom), the applicable policy snapshot identifier, and a validity window, such that rendering, display, or acceptance is rejectable when the token is absent, expired, or inconsistent with the recorded governance record.

REFERENCE NUMERALS

1000—GOVERNED EXECUTION COMPONENT OUTPUT
1002—RELIANCE EVENT
206—GOVERNED EXECUTION COMPONENT
210—GOVERNED CONNECTOR
212—ACCEPTANCE ENDPOINT
706—READINESS ARTIFACT

FIG. 11—Memory-Reasoning-Reliance Boundary

FIG. 11 illustrates a conceptual separation between governed contextual memory, non-deterministic reasoning, and downstream reliance conditioning within the disclosed ENGRAM governance architecture. The figure emphasizes that ENGRAM governance constrains what contextual information may be recalled and exposed, while reasoning models generate outputs using governed context, and downstream systems condition whether such outputs may be relied upon, each operating under distinct technical controls.

As shown in FIG. 11, patient-related data sources 110 are processed by ENGRAM builder 120. The ENGRAM builder 120 may receive inputs from, without limitation, electronic medical record systems, third-party extraction or normalization services, or governance or validation engines. The ENGRAM builder 120 is configured to generate or update contextual representations but is not configured to perform inference or output generation.

The prepared contextual representations are stored in a patient partitioned ENGRAM store 130, which maintains governed, machine-addressable memory atoms associated with a patient identity. The ENGRAM store 130 functions as a longitudinal contextual substrate and does not itself perform reasoning or decision-making.

A memory gate 160 evaluates candidate contextual representations retrieved from the ENGRAM store 130 under an applicable policy snapshot and integrity criteria prior to any reasoning-model execution. The memory gate 160 determines admissibility and transformation of contextual representations and produces governance artifacts required for execution. The memory gate operates as a non-bypassable, fail-closed control.

Only contextual representations admitted by the memory gate 160 are assembled into a governed context bundle 190. The governed context bundle 190 is a bounded, deterministic, and replayable machine artifact and represents the sole patient scoped contextual input permitted to be consumed by a reasoning system for a task.

The governed context bundle 190 is supplied to a governed execution component 206. The governed execution component 206 performs non-deterministic inference over the governed context bundle 190 to generate a governed execution component output 1000. The governed execution component 206 does not generate, modify, or persist ENGRAM memory representations and does not have access to patient scoped contextual information outside the governed context bundle 190.

In embodiments involving downstream reliance control, the governed execution component output 1000 is provided to the governed connector 210 positioned upstream of the acceptance endpoint 212. The governed connector 210 conditions acceptance of a reliance event 1002 on verification of a readiness artifact bound to the governed context bundle 190 and the applicable policy snapshot identifier.

In some embodiments, reliance conditioning via the governed connector 210 and acceptance endpoint 212 is omitted, and the system operates with execution conditioning alone.

FIG. 11 illustrates that ENGRAM memory governs what may be remembered and exposed, reasoning models govern how outputs are generated, and reliance mechanisms govern whether outputs may be accepted or acted upon, thereby forming a complete, verifiable, and non-bypassable governance loop without requiring determinism of reasoning outputs.

REFERENCE NUMERALS

110—PATIENT-RELATED DATA SOURCES
120—ENGRAM BUILDER
130—ENGRAM STORE
160—MEMORY GATE
190—GOVERNED CONTEXT BUNDLE

206—GOVERNED EXECUTION COMPONENT
1000—GOVERNED EXECUTION COMPONENT OUTPUT
210—GOVERNED CONNECTOR
212—ACCEPTANCE ENDPOINT
1002—RELIANCE EVENT

Figure 12:
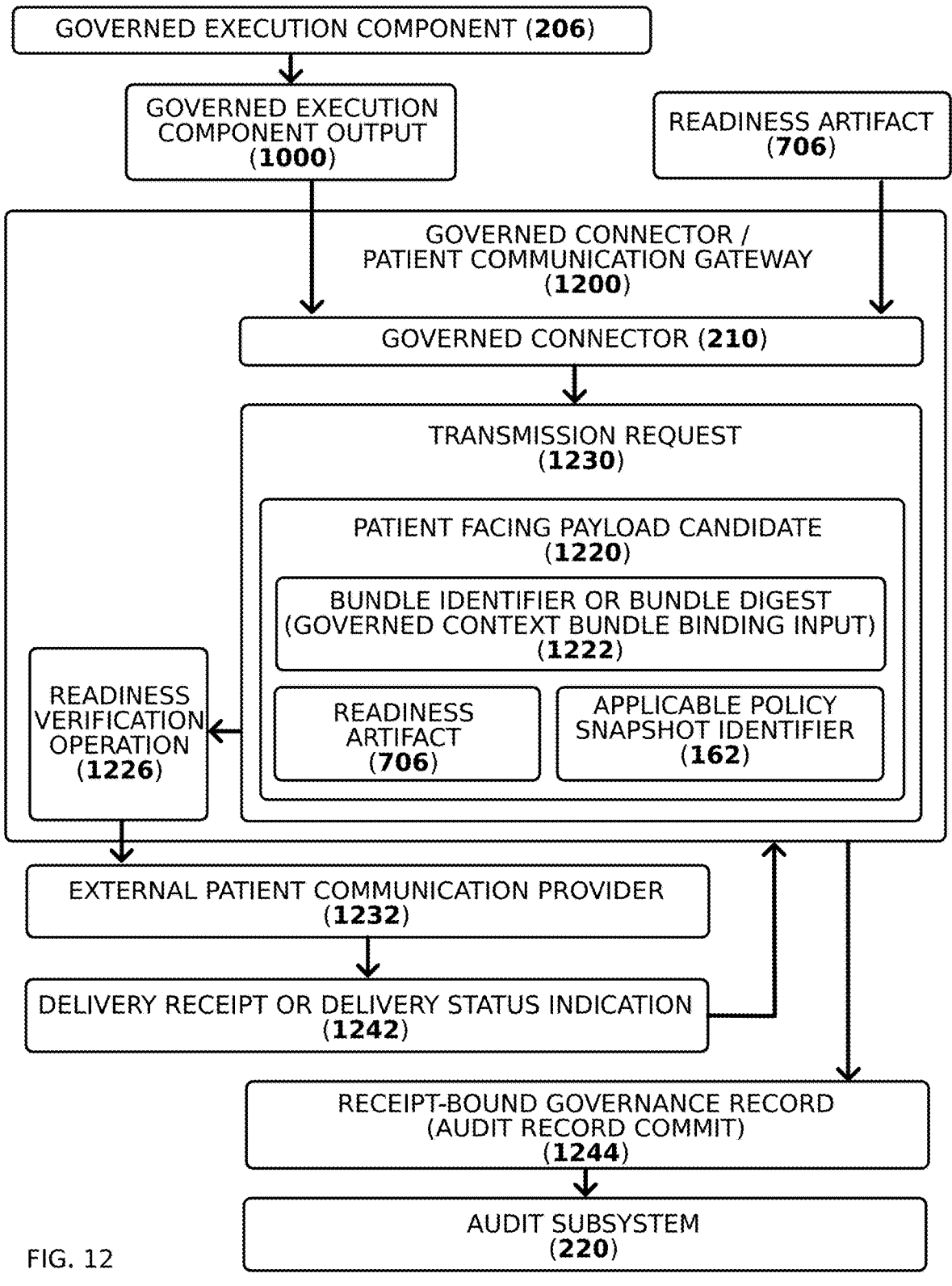
FIG. 12 illustrates a governed connector operating as a patient communication gateway that enforces fail-closed readiness verification prior to patient facing transmission of a model or agent generated artifact and records a receipt-bound governance record associated with a delivery receipt or delivery status indication.

FIG. 12—Patient Communication as a Governed Connector (Reliance Boundary for Patient Facing Transmission)

FIG. 12 illustrates a non-limiting embodiment in which a governed connector operates as a patient communication gateway and enforces fail-closed readiness verification prior to permitting patient facing transmission of a model or agent generated artifact. The embodiment further records a receipt-bound governance record upon confirmation of delivery or delivery status, thereby providing audit-grade traceability for patient facing communications that incorporate model or agent output.

As shown in FIG. 12, a governed execution component 206 produces governed execution component output 1000 responsive to a task request and based on a governed context bundle assembled under an applicable policy snapshot identifier (or policy digest) 162. The governed execution component output 1000 may comprise, without limitation, a draft message, instruction, summary, reminder, or other communication artifact intended for patient facing delivery.

The governed execution component output 1000 is provided to a governed connector/patient communication gateway 1200. In the illustrated embodiment, the governed connector/patient communication gateway 1200 comprises a governed connector 210 configured to mediate patient facing transmission pathways, including without limitation an email delivery gateway, an SMS or text messaging gateway, a voice or telephony gateway, a secure chat gateway, a patient portal messaging gateway, or a document release or publication service. The governed connector/patient communication gateway 1200 functions as a reliance boundary positioned at or upstream of a patient facing dispatch operation.

Upon receiving the governed execution component output 1000, the governed connector/patient communication gateway 1200 forms, extracts, or receives a patient facing payload candidate 1220 corresponding to the patient facing content proposed for transmission. In various embodiments, the patient facing payload candidate 1220 comprises message body content, one or more attachments, structured notification fields, or a publication object.

In operation, the governed connector/patient communication gateway 1200 receives, associates, or derives governance-binding inputs comprising a bundle identifier or bundle digest 1222 and the applicable policy snapshot identifier (or policy digest) 162. The bundle identifier or bundle digest 1222 corresponds to the governed context bundle that was permitted to influence generation of the governed execution component output 1000. The applicable policy snapshot identifier (or policy digest) 162 corresponds to the policy constraints applied during memory gate evaluation and reliance readiness evaluation.

The governed connector/patient communication gateway 1200 is configured to require presentation of a readiness artifact 706 as a condition of permitting patient facing transmission. The readiness artifact 706 is a machine-verifiable governance artifact bound to the bundle identifier or bundle digest 1222 and the applicable policy snapshot identifier (or policy digest) 162 and evidences that the governed execution component output 1000 was generated through the governed execution pathway described herein.

Prior to initiating patient facing transmission, the governed connector/patient communication gateway 1200 performs a readiness verification operation 1226. The readiness verification operation 1226 comprises machine-executed validation that the readiness artifact 706 cryptographically matches, or is bound to, (i) the bundle identifier or bundle digest 1222 corresponding to the governed context bundle used for generation of the governed execution component output 1000 and (ii) the applicable policy snapshot identifier (or policy digest) 162. When readiness verification fails, the governed connector/patient communication gateway 1200 enforces fail-closed behavior by denying or deferring patient facing transmission rather than permitting dispatch of the patient facing payload candidate 1220.

When readiness verification operation 1226 succeeds, the governed connector/patient communication gateway 1200 issues or forwards a transmission request 1230 to an external patient communication provider 1232. The external patient communication provider 1232 may comprise, without limitation, an email service provider, SMS gateway provider, telephony carrier or voice delivery service, secure messaging provider, patient portal service, or document publication service.

In response to the transmission request 1230, the external patient communication provider 1232 returns a delivery receipt or delivery status indication 1242. The delivery receipt or delivery status indication 1242 may indicate, without limitation, accepted-for-delivery status, delivered status, failed delivery status, queued status, or other delivery outcome state.

The governed connector/patient communication gateway 1200 commits, to an audit subsystem 220, a receipt-bound governance record 1244 corresponding to the delivery receipt or delivery status indication 1242. The receipt-bound governance record 1244 is recorded as an audit record commit and is associated with at least the bundle identifier or bundle digest 1222, the readiness artifact 706, and the applicable policy snapshot identifier (or policy digest) 162, thereby enabling later verification that the patient facing transmission was permitted only after readiness verification and was traceable to governed context and policy constraints.

In various embodiments, the receipt-bound governance record 1244 further records one or more identifiers or metadata fields sufficient to support compliance review, incident investigation, and deterministic replay of the governed context artifacts associated with the patient facing communication, without requiring determinism of the governed execution component output itself.

Accordingly, FIG. 12 illustrates that patient facing communication channels are governed connectors that enforce a non-bypassable reliance boundary by requiring readiness artifacts bound to governed context bundle identifiers or bundle digests and applicable policy snapshot identifiers (or policy digests), and by recording receipt-bound governance records in an audit subsystem, thereby preventing ungoverned patient facing transmission of model or agent generated artifacts and providing audit-grade traceability for regulated patient communications.

REFERENCE NUMERALS

206—GOVERNED EXECUTION COMPONENT
210—GOVERNED CONNECTOR
220—AUDIT SUBSYSTEM
1200—GOVERNED CONNECTOR/PATIENT COMMUNICATION GATEWAY

1000—GOVERNED EXECUTION COMPONENT OUTPUT
1220—PATIENT FACING PAYLOAD CANDIDATE
1222—BUNDLE IDENTIFIER OR BUNDLE DIGEST (GOVERNED CONTEXT BUNDLE BINDING INPUT)
706—READINESS ARTIFACT
1226—READINESS VERIFICATION OPERATION
1230—TRANSMISSION REQUEST
1232—EXTERNAL PATIENT COMMUNICATION PROVIDER
1242—DELIVERY RECEIPT OR DELIVERY STATUS INDICATION
1244—RECEIPT-BOUND GOVERNANCE RECORD (AUDIT RECORD COMMIT)
162—APPLICABLE POLICY SNAPSHOT IDENTIFIER (OR POLICY DIGEST)

The invention claimed is:

1. A computer-implemented method for governing use of patient scoped contextual information in execution of a governed execution component, the method comprising: retrieving, from a patient partitioned contextual memory storing memory atoms associated with a patient identity, a candidate set of memory atoms responsive to a task request associated with the patient identity; evaluating, by a non-bypassable memory-gating operation and prior to execution of the governed execution component, each memory atom in the candidate set under an applicable policy snapshot identifier and one or more integrity criteria; determining, by the memory-gating operation for each evaluated memory atom, an admissibility state comprising at least one of admission, denial, redaction, abstraction, or attenuation, and denying admission of, or admitting only in a non-data-bearing transformed form, each memory atom for which admissibility cannot be established; applying a completeness evaluation as part of the one or more integrity criteria by determining whether a completeness criterion for the task request is satisfied by confirming availability, within an admitted set of memory atoms determined by the memory-gating operation, of at least one admissible memory atom from each of one or more designated mandatory atom classes, and, responsive to determining that the completeness criterion is not satisfied, recording an integrity exception event comprising an omission event and denying or deferring execution of the governed execution component under a fail-closed policy; assembling, prior to execution of the governed execution component, a governed context bundle comprising an included set of memory atoms selected from the admitted set of memory atoms, the governed context bundle being associated with a bundle identifier bound to the applicable policy snapshot identifier; generating an execution governance artifact associated with the memory-gating operation and bound to the bundle identifier; conditioning execution of the governed execution component by invoking the governed execution component through a constrained execution interface that requires presentation of a governed execution package comprising the governed context bundle and the execution governance artifact, provides only the governed context bundle as patient scoped contextual input to the governed execution component, and programmatically rejects execution requests lacking the governed execution package or failing cryptographic or credential-based validation at the constrained execution interface; recording a governance record identifying at least the bundle identifier, the applicable policy snapshot identifier, and identifiers of the included set of memory atoms; and conditioning acceptance of a reliance event associated with output generated by the governed execution component on presentation of a readiness artifact bound to the bundle identifier and the applicable policy snapshot identifier.

2. The method of claim 1, wherein the constrained execution interface enforces non-bypassable execution by restricting invocation of the governed execution component to a credential-scoped network endpoint that denies direct access to the governed execution component absent presentation of the governed execution package.

3. The method of claim 1, wherein programmatically rejecting execution requests comprises validating a cryptographic binding between the execution governance artifact, the bundle identifier, and the applicable policy snapshot identifier.

4. The method of claim 1, wherein the completeness criterion corresponds to a completeness evaluation requiring inclusion of at least one memory atom from each of a predefined set of mandatory atom classes comprising at least one of contraindication data, medication data, or baseline condition data.

5. The method of claim 1, further comprising generating an insufficient-context state when the completeness criterion is not satisfied, and suppressing output generation or restricting downstream reliance based on the insufficient-context state.

6. The method of claim 1, wherein the governed context bundle is assembled using a deterministic ordering rule and a canonical serialization format recorded as governance metadata to enable deterministic replay.

7. The method of claim 1, wherein the bundle identifier is computed as a cryptographic hash over at least the included set of memory atoms and the applicable policy snapshot identifier.

8. The method of claim 1, wherein the readiness artifact comprises at least one of a signed bundle identifier, a signed policy snapshot identifier, or a signed evidence bundle digest, and is verified prior to acceptance of the reliance event.

9. The method of claim 1, wherein evaluating each memory atom under the one or more integrity criteria comprises performing at least one of provenance verification, temporal validity evaluation, or contradiction detection.

10. The method of claim 1, wherein admitting a memory atom in a non-data-bearing transformed form comprises generating an abstracted representation that constrains downstream execution without exposing underlying patient data.

\* \* \* \* \*